US007260322B2

(12) United States Patent
Ide et al.

(10) Patent No.: US 7,260,322 B2
(45) Date of Patent: Aug. 21, 2007

(54) CHANGEABLE-LENS CAMERA, CAMERA SYSTEM, AND FOCUS DETECTION DEVICE

(75) Inventors: Masataka Ide, Hachioji (JP); Hideyasu Takato, Hino (JP)

(73) Assignee: Olympus Corporation, Tokyo (JP)

( * ) Notice: Subject to any disclaimer, the term of this patent is extended or adjusted under 35 U.S.C. 154(b) by 301 days.

(21) Appl. No.: 11/037,102

(22) Filed: Jan. 18, 2005

(65) Prior Publication Data

US 2005/0158044 A1   Jul. 21, 2005

(30) Foreign Application Priority Data

Jan. 21, 2004 (JP) .............. 2004-013285
Jan. 22, 2004 (JP) .............. 2004-014303

(51) Int. Cl.
*G03B 17/14* (2006.01)
*G03B 3/00* (2006.01)

(52) U.S. Cl. .............. 396/71; 396/91

(58) Field of Classification Search .............. 396/71, 396/72, 79, 81, 91–93, 98, 529, 530
See application file for complete search history.

(56) References Cited

U.S. PATENT DOCUMENTS 5,172,154 A * 12/1992 Katagishi et al. ............ 396/71

FOREIGN PATENT DOCUMENTS

| JP | 3-73847 | 11/1991 |
| JP | 3345890 | 9/2002 |
| JP | 9-211306 | 8/2003 |
| JP | 2003-241064 | 8/2003 |

* cited by examiner

*Primary Examiner*—W. B. Perkey
*Assistant Examiner*—Rishi S. Suthar
(74) *Attorney, Agent, or Firm*—Straub and Pokotylo; John C. Pokotylo

(57) ABSTRACT

A camera system according to this invention comprises an interchangeable lens unit, an intermediate adapter, and a camera body unit. An AF sensor detects the defocus amount of the interchangeable lens unit. The interchangeable lens unit incorporates a data storage section. The data storage section stores first AF correction data and second AF correction data. The first AF correction data is determined by the optical characteristic of the interchangeable lens and associated with the type of the light source illuminating the object of photography. The second AF correction data is determined by the optical characteristic of a system composed of the interchangeable lens and the intermediate adapter and associated with the type of the light source illuminating the object of photography.

11 Claims, 31 Drawing Sheets

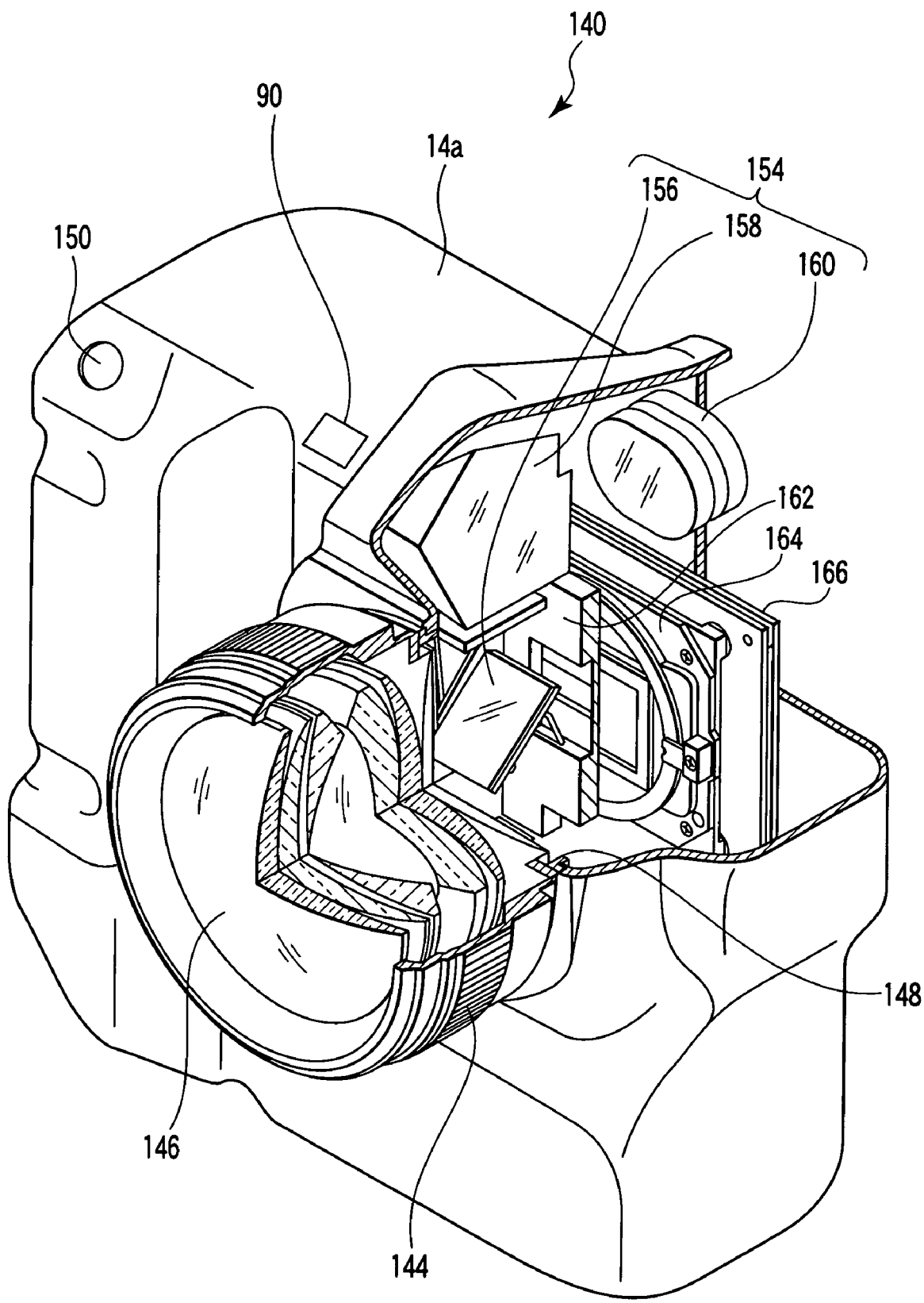
F I G. 2 3

CHANGEABLE-LENS CAMERA, CAMERA SYSTEM, AND FOCUS DETECTION DEVICE

CROSS-REFERENCE TO RELATED APPLICATIONS

This application is based upon and claims the benefit of priority from prior Japanese Patent Applications No. 2004-013285, filed Jan. 21, 2004; and No. 2004-014303, filed Jan. 22, 2004, the entire contents of both of which are incorporated herein by reference.

BACKGROUND OF THE INVENTION

1. Field of the Invention

The present invention relates to a changeable-lens camera and camera system having an autofocus (AF) detection device of a through-the-lens TTL phase difference system, particularly to a technique of correcting AF in accordance with chromatic aberration of a photographic lens or the like. The present invention relates to a focus detection device, particularly to a focus detection device of a camera, in which the focal point is corrected in accordance with the source of light impinging on a photographic lens in order to reduce the influence of the chromatic aberration of the photographic lens or the like.

2. Description of the Related Art

In a camera on which a through-the-lens (TTL) phase difference autofocus (AF) device is mounted, even when the focus of a photographic lens is adjusted based on focus information detected by the AF device, an image is sometimes out of focus in a case where the image is photographed under illumination by different light sources. This is because a difference occurs between best image plane positions with respect to the respective light sources because of the chromatic aberration characteristic of the photographic lens.

To solve the problem, a technique is described in Jpn. Pat. KOKOKU Publication No. 3-73847 in which a correction amount (hereinafter referred to as AF correction data) of the best image plane position in accordance with the chromatic aberration characteristic is stored in the photographic lens beforehand, and the output of the AF device is corrected based on the AF correction data.

Additionally, in a changeable-lens camera, an intermediate adapter can be attached between the camera and an interchangeable lens to thereby change the focal length. As the intermediate adapter, for example, a teleconverter which increases the focal length or the like has been known.

When the intermediate adapter is attached to the camera, the chromatic aberration due to the intermediate adapter also influences the focal point in the same manner as that of the interchangeable lens. To solve the problem, a technique has been described in Jpn. Pat. No. 3345890 in which the above-described AF correction data is stored beforehand both in the interchangeable lens and the intermediate adapter, and combined to thereby correct the output of the AF device.

Moreover, a technique for detecting luminance of a subject and background light during photography to thereby perform correction at a distance measuring time has heretofore been developed. For example, in Jpn. Pat. Appln. KOKAI Publication No. 9-211306, a so-called phase difference AF system of an automatic focus adjustment device has been described which detects a focal state of a measurement object from the positional relationship between a pair of formed images in a pair of light receiving element rows and which adjusts the focus of the photographic lens in accordance with the detection result.

In general, in a camera or the like adopting this AF system, a subject image is formed by light transmitted through the photographic lens or the like. However, it is well known that a phenomenon is seen in which the focused position of the subject image at this time differs with the wavelength of the light source impinging on the photographic lens or the like.

For example, when photography is performed indoors, the subject is sometimes illuminated using an artificial light source such as a tungsten lamp or a flood lamp. In this case, the focused position of the subject image is sometimes shifted by the influence of an opposite characteristic of the photographic lens or the like, that is, by chromatic aberration or the like. As a countermeasure for the above-described problem, in Jpn. Pat. Appln. KOKAI Publication No. 2003-241064, a focus detection device has been described in which chromatic aberration correction data for a specific wavelength with respect to a reference wavelength is memorized in the interchangeable lens, and correction data is calculated based on the major color of the subject light, measured by colorimetry means for measuring the color of the subject light, to thereby correct the focus.

The device described in this Jpn. Pat. Appln. KOKAI Publication No. 2003-241064 performs complex calculation based on the chromatic aberration correction data for the specific wavelength with respect to the reference wavelength, and the major color of the subject light measured by the colorimetry means for measuring the color of the subject light to thereby calculate a correction value.

BRIEF SUMMARY OF THE INVENTION

Therefore, an object of the present invention is to provide a changeable-lens camera and a camera system in which high-precision AF is possible in a case where an interchangeable lens is attached to the changeable-lens camera having an AF device of a TTL phase difference system via an intermediate adapter.

Moreover, an object of the present invention is to provide a focus detection device in which a correction method is simplified to thereby miniaturize a memory and a processing circuit, so that costs of an interchangeable lens, camera and the like are reduced, and high-precision defocus correction is possible.

According to a first characteristic of the present invention, there is provided a camera system including a camera body and an interchangeable lens attachable/detachable with respect to the camera body, comprising:

an intermediate adapter detachably attachable between the interchangeable lens and the camera body and capable of changing a focal length of the interchangeable lens;

focus detection means, disposed in the camera body, for detecting a defocus amount of the interchangeable lens; and storage means, disposed in the interchangeable lens, for storing AF correction data which corrects the defocus amount of the interchangeable lens detected by the focus detection means, wherein the AF correction data stored in the storage means includes: first AF correction data determined by an optical characteristic of the interchangeable lens and constituted in accordance with a type of a light source to illuminate a subject; and second AF correction data determined by an optical characteristic of the interchangeable lens combined with the intermediate adapter and constituted in accordance with the type of the light source to illuminate the subject.

According to a second characteristic of the present invention, there is provided a changeable-lens camera including a camera body and an interchangeable lens attachable/detachable with respect to the camera body, comprising:

an intermediate adapter detachably attachable between the camera body and the interchangeable lens and capable of changing a focal length of the interchangeable lens;

focus detection means, disposed in the camera body, for detecting a defocus amount of the interchangeable lens;

judgment means for judging whether or not the intermediate adapter is attached between the camera body and the interchangeable lens;

reading means for reading first AF correction data determined by an optical characteristic of the interchangeable lens and constituted in accordance with a type of a light source which illuminates a subject, and second AF correction data determined by an optical characteristic of the interchangeable lens combined with the intermediate adapter and constituted in accordance with the light source which illuminates the subject;

light source detection means for detecting the light source which illuminates the subject; and correction means for selecting the first AF correction data in a case where the judgment means judges that the intermediate adapter is not attached, and selecting the second AF correction data in a case where it is judged that the intermediate adapter is attached to thereby correct an output of the focus detection means in accordance with an output of the light source detection means.

According to a third characteristic of the present invention, there is provided a focus detection device comprising:

a photographic lens;

light source detection means for detecting a light source which illuminates a subject, and outputting a signal in accordance with the light source;

correction value storage means for storing a correction value which corrects a defocus in accordance with a type of the light source; and control means for controlling a focus of the photographic lens based on an output of the signal detected by the light source detection means and the correction value stored in the correction value storage means.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 23 is a perspective view schematically showing an inner constitution of a partially cut digital camera according to a third embodiment of the present invention;

DETAILED DESCRIPTION OF THE INVENTION

Embodiments of the present invention will be described hereinafter with reference to the drawings.

First Embodiment

Figure 1:
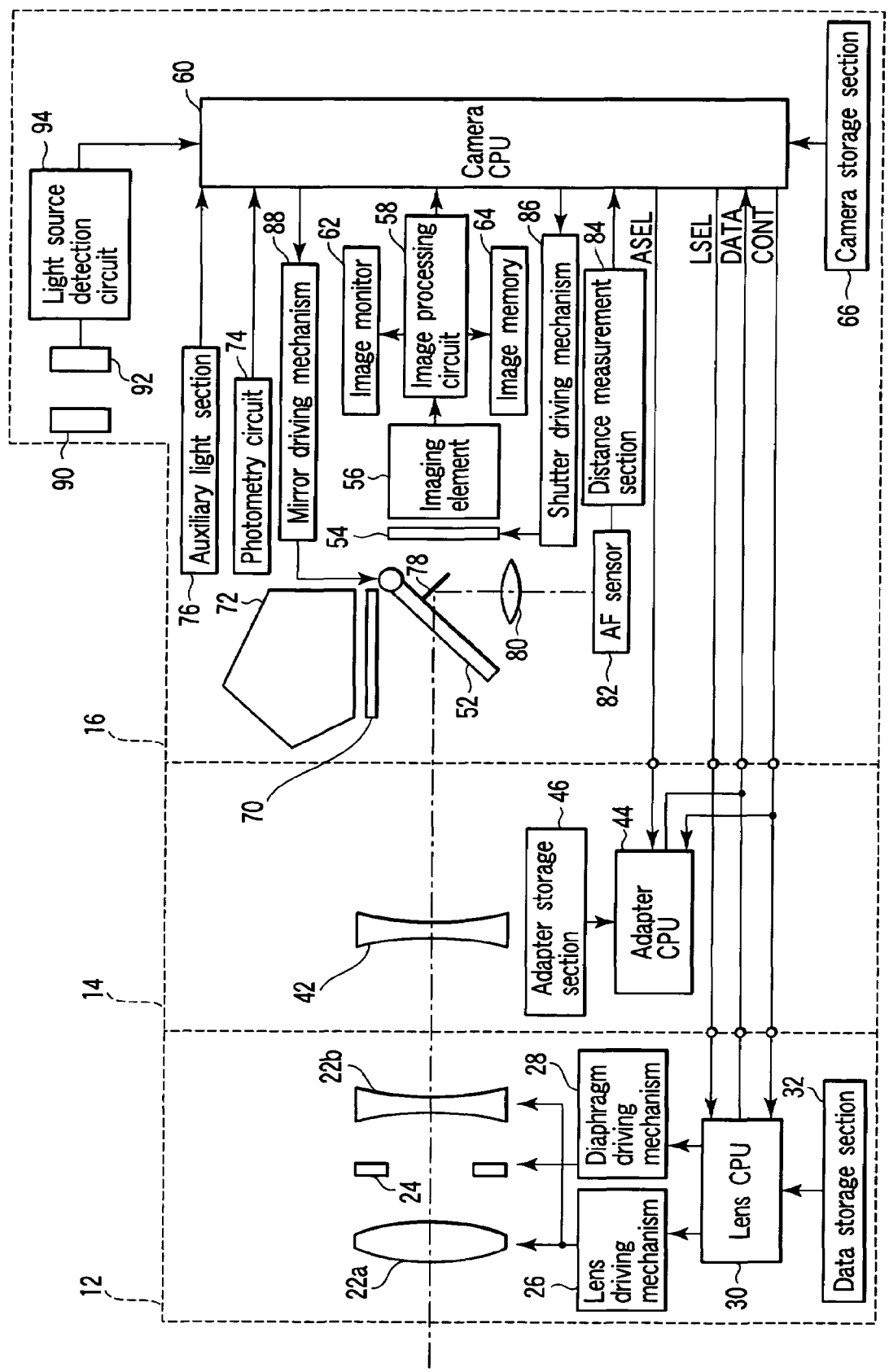
FIG. 1 is a block diagram showing a basic constitution of a camera system of the present invention.

FIG. 1 is a block diagram showing a basic constitution of a camera system of the present invention.

In FIG. 1, the present camera system comprises an interchangeable lens unit 12, an intermediate adapter 14, and a camera body unit 16. Moreover, the interchangeable lens unit 12, intermediate adapter 14, and camera body unit 16 are constituted in such a manner as to be mutually attachable/detachable by a mount mechanism (not shown).

The interchangeable lens unit 12 comprises photographic lenses 22a and 22b, a diaphragm 24, a lens driving mechanism 26, a diaphragm driving mechanism 28, a lens CPU 30, and a data storage section 32.

The lens CPU 30 generally controls the interchangeable lens unit 12. That is, a control signal is output to the lens driving mechanism 26, and positions of the photographic lenses 22a and 22b are moved forwards/backwards for a focusing operation. A control signal is output to the diaphragm driving mechanism 28 to thereby change a focusing position of the diaphragm 24 for exposure control. Furthermore, the lens CPU 30 receives various information by transmission/reception of the signal with respect to the camera body unit 16.

The data storage section 32 is storage means (first storage means, first storage section) to store information inherent in the lenses (e.g., lens focal length, release F value, AF correction data, etc.). The information inherent in these lenses is read by the lens CPU 30 and a camera CPU 60 described later which are reading means.

The intermediate adapter 14 comprises a teleconversion lens 42, an adapter CPU 44, and an adapter storage section (second storage means, second storage section) 46.

The teleconversion lens 42 changes the focal length of the above-described interchangeable lens unit 12. A magnification of the lens can be enlarged, for example, twice by this teleconversion lens 42.

The adapter storage section 46 stores information inherent in the intermediate adapter 14 (e.g., lens type, AF correction data, etc.). The adapter CPU 44 transmits/receives a signal with respect to the above-described camera body unit 16 to transmit information inherent in the intermediate adapter for AF correction.

The camera body unit 16 comprises a quick return mirror 52, a shutter 54, an imaging element 56, an image processing circuit 58, a camera CPU 60, an image monitor 62, an image memory 64, a camera storage section 66, a focusing screen 70, a pentaprism 72, a photometry circuit 74, an auxiliary light section 76, a sub-mirror 78, an AF lens 80, an AF sensor 82, a distance measurement section 84, a shutter driving mechanism 86, a mirror driving mechanism 88, a diffusion plate 90, a light source sensor 92, and a light source detection circuit 94.

A middle portion of the quick return mirror 52 is a half mirror, and the sub-mirror 78 is attached to a rear portion of the half mirror. Therefore, at a non-photography operation time, a subject image is reflected to the pentaprism 72, transmitted through the portion of the half mirror, reflected by the sub-mirror 78, and guided into the AF sensor 82.

The imaging element 56 converts a light image of the subject into image data which is an electric signal using, for example, CCD. The camera CPU 60 generally controls the operation of the present camera system, further controls the image processing circuit 58, and subjects the image data to various image processes. Information necessary for the operation of the camera CPU 60 is stored in the camera storage section 66.

Moreover, the camera CPU 60 acquires lens characteristic information of the photographic lenses 22a and 22b, and information inherent in the intermediate adapter for the AF correction by communication with the lens CPU 30 in the interchangeable lens unit 12, and the adapter CPU 44 in the intermediate adapter 14. The camera CPU 60 constitutes reading means, selection means, correction means, and judgment means (adapter judgment means, adapter attachment judgment means).

A signal line for transmitting/receiving the information of the camera CPU 60 is provided with "ASEL", "LSEL", "DATA", "CONT". The "ASEL" is a line to select information communication with respect to the intermediate adapter 14. The "LSEL" is a line to select the information communication with respect to the interchangeable lens unit 12. The "DATA" is a common line for communication of lens inherent information or the like. Furthermore, the "CONT" is a control signal line for communication of a control command (e.g., lens information request, diaphragm driving instruction, etc.).

The image monitor 62 comprises a liquid crystal monitor or the like, and displays image data. The image memory 64 records the image data of a recording medium such as Smart Media (registered trademark).

The focusing screen 70 focuses a subject light image reflected upwards by the quick return mirror 52.

The photometry circuit 74 receives a part of the subject light image from the pentaprism 72 by a photoelectric conversion element (not shown) to thereby measure luminance of the subject. The camera CPU 60 calculates exposure conditions based on measurement data of the photometry circuit 74.

Figure 3:
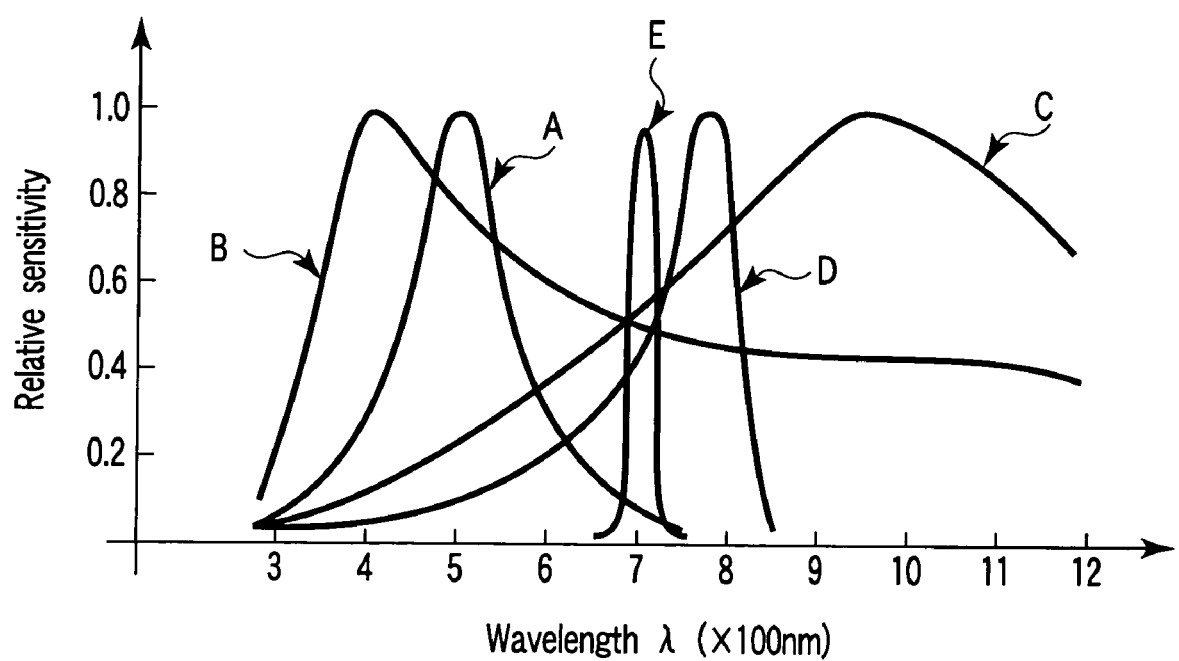
FIG. 3 is a schematic diagram showing spectroscopy characteristics of various illuminative light sources which illuminate a subject.

The auxiliary light section 76 projects known auxiliary light, and is controlled by the camera CPU 60. When the subject has low luminance, the auxiliary light by the auxiliary light section 76 is emitted from a red light emitting diode (not shown) in the auxiliary light section 76 to thereby illuminate the subject in synchronization with an integration operation of the AF sensor 82. A spectroscopy characteristic of the red light emitting diode is shown in FIG. 3 (details will be described later).

The sub-mirror 78 is foldably attached to the quick return mirror 52. When the quick return mirror 52 is disposed on an optical axis of the photographic lenses 22a and 22b, the sub-mirror 78 guides a light beam passing through a part of the quick return mirror 52 toward the AF sensor 82.

The AF sensor 82 is focus detection means for receiving the subject light image divided into two by the sub-mirror 78 via the AF lens 80. The distance measurement section 84 calculates a lens driving amount for the focusing based on an output of the AF sensor 82. This AF distance measurement mechanism is by a so-called TTL phase difference system, and the light beam for use in detecting the focus corresponds to that in a case where the diaphragm of the photographic lens is focused to about F8.

Figure 2:
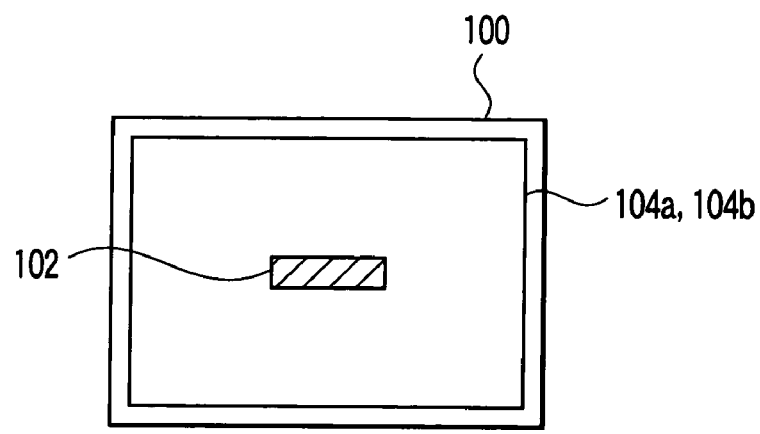
FIG. 2 is a diagram schematically showing detection areas of an AF sensor 82 and a light source sensor 92 constituting a part of a focus detection device in the camera system of a first embodiment of the present invention, and a relationship of these detection areas with respect to a photographic screen (photographic field angle) 100.

FIG. 2 schematically shows a detection area of the AF sensor 82 constituting a part of the focus detection device in the camera system of the present embodiment, and a detection area of the light source sensor 92 which is light source detection means, and a relationship of these detection areas with respect to a photographic screen (photographic field angle) 100.

In FIG. 2, a region 102 (region shown by slant lines in FIG. 2) shows the detection area of the AF sensor 82. Similarly, regions 104a, 104b show detection areas of the light source sensor 92.

Next, an influence on distance measurement results by the AF sensor 82 and the distance measurement section 84 will be described depending on the type of the light source which illuminates the subject.

First, a wavelength characteristic of the light source will be described.

FIG. 3 is a schematic diagram showing spectroscopy characteristics of various illuminative light sources which illuminate a subject. As the illuminative light sources, characteristic curves of A; a fluorescent lamp, B; daylight, C; an incandescent lamp, D; a blue flood lamp, and E; auxiliary light are shown.

As shown in FIG. 3, the spectroscopy characteristic of the fluorescent lamp are in a range of the vicinity of about 300 nm to that of about 800 nm using the vicinity of about 500 nm as a vertex. The spectroscopy characteristic of the incandescent lamp is in a region in the vicinity of a long wavelength from the vicinity of about 300 nm using the vicinity of about 1000 nm as a vertex. The spectroscopy characteristic of the blue flood lamp has a rapid sensitivity in the vicinity of about 800 nm, and in a region from the vicinity of about 300 nm to that of about 850 nm. The spectroscopy characteristic of general natural light (daylight) extends over the comparatively total range from the region close to the long wavelength from the vicinity of about 300 nm. Moreover, the spectroscopy characteristic of the auxiliary light has a steep sensitivity in the vicinity of about 700 nm.

Figure 4:
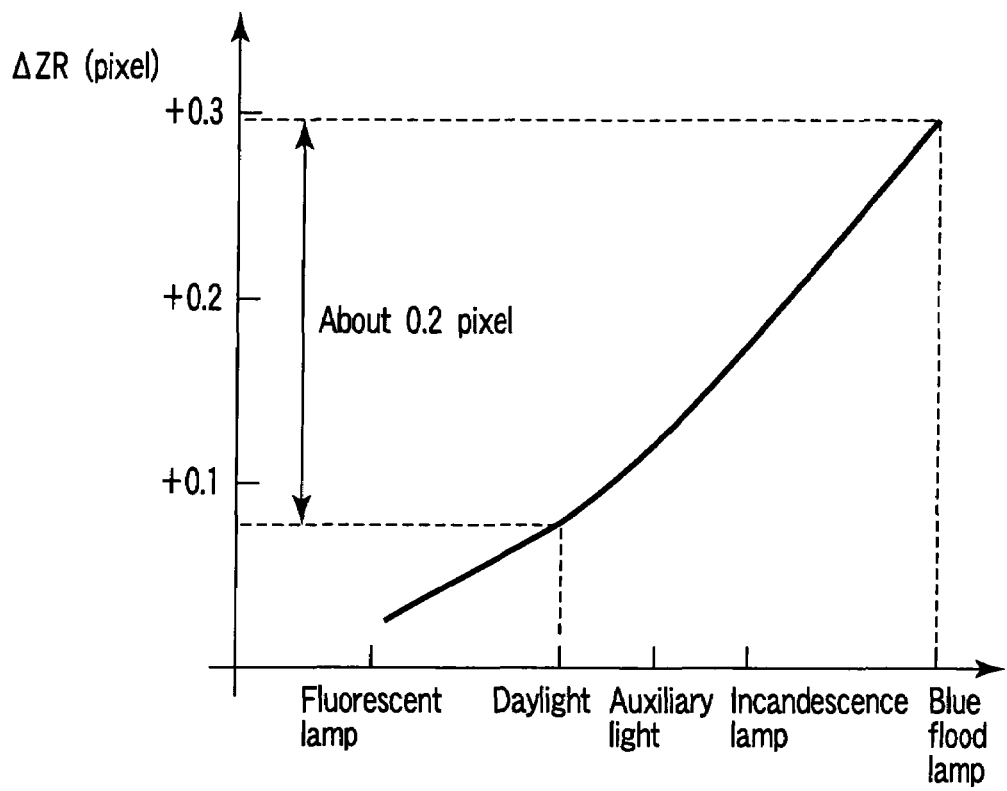
FIG. 4 is a diagram showing a state in which a shift is generated in an interval between two images formed by a light receiving section of the AF sensor 82 by a type of the light source for illuminating the subject.

FIG. 4 is a diagram showing a state in which a shift is generated in an interval between two images formed by a light receiving section of the AF sensor 82 by a type of the light source for illuminating the subject.

For example, assuming that the interval between two images is formed into an image in a focused state in the daylight, the same subject is illuminated and photographed by the blue flood lamp as follows. That is, as shown in FIG. 4, it is seen that a shift for about +0.2 pixel is generated on a light receiving surface of the AF sensor 82 as compared with the focused state under the daylight. This is because a wavelength component of an AF detection light beam differs, then an optical function of the photographic lens or AF optical system differs, and therefore the above-described shift is generated. Since details are described in Jpn. Pat. No. 2666274, description thereof is omitted here.

It is to be noted that the about +0.2 pixel corresponds, for example, to +0.1 mm when converted into a focus position. A distance measurement sensor has a line sensor, and the pixel is meant.

When the shift is caused in the focal point by this illuminative light source, a so-called defocused picture is produced, and this raises a problem. Therefore, in the present invention, the type of the light source is judged by the light source sensor 92, and accordingly the above-described problem is solved using AF correction value or correction coefficient stored in the data storage section 32 in the interchangeable lens unit 12, the adapter storage section 46 in the intermediate adapter 14 or the like.

The above-described light source sensor 92 is light source detection means comprising an outside light type sensor in the present embodiment, and detects the subject light which has not passed through the interchangeable lens unit 12 via the diffusion plate 90. This light source sensor 92 comprises a visible light sensor 116 and an infrared light sensor 114 (see FIG. 7, details will be described later), and is constituted in such a manner that the subject light enters the sensor via the diffusion plate 90. Therefore, a view field of the sensor is identical, and has a large field angle.

The visible light sensor 116 technically has visible and near-infrared spectral sensitivities, but an infrared cut filter 118 (see FIG. 7, details will be described later) is inserted between the visible light sensor 116 and the diffusion plate 90, and finally only visible light is received. The light source sensor 92 compresses a light current in accordance with the sensor having each spectral sensitivity, converts the current into a voltage, and outputs the voltage. The output of the light source detection sensor is digitalized by the light source detection circuit 94, and brightness of a whole subject region is detectable in accordance with the spectral sensitivity of each sensor.

Next, a principle to detect the type of the light source will be described.

Figure 5:
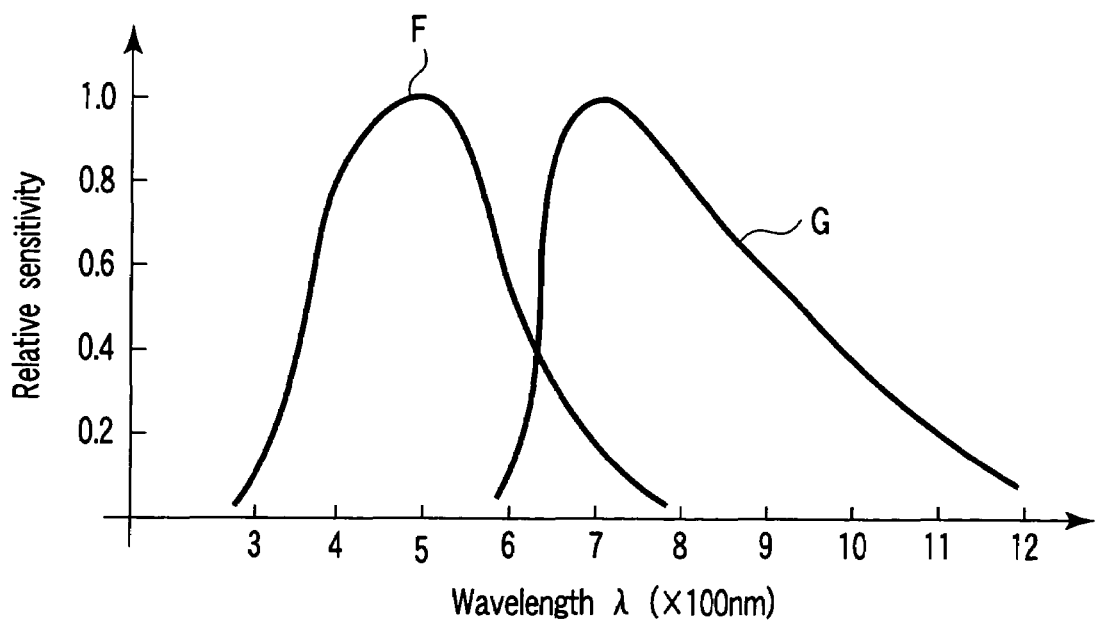
FIG. 5 is a diagram showing spectral sensitivity characteristics of a visible light sensor 116 and an infrared light sensor 114 in the camera system of the first embodiment which measures illuminative light for illuminating the subject.

FIG. 5 is a diagram showing spectral sensitivity characteristics of the visible light sensor 116 and the infrared light sensor 114 described later in the camera system of the present embodiment which measures illuminative light for illuminating the subject.

The spectral sensitivity characteristic of the visible light sensor 116 in the camera system of the present embodiment has a spectral sensitivity characteristic in the vicinity of a short wavelength region in which the vicinity of about 500 nm is a vertex (peak; maximum value), and has a sensitivity in a visible light region as shown by F of FIG. 5. The spectral sensitivity characteristic of the infrared light sensor 114 in the same camera has a spectral sensitivity characteristic to a long wavelength region around 1000 nm assuming the vicinity of about 600 nm as the vertex as shown by G of FIG. 5.

It is to be noted that photometry by the visible light sensor 116 will be hereinafter referred to as visible photometry, and photometry by the infrared light sensor 114 will be referred to as infrared photometry.

Figure 6:
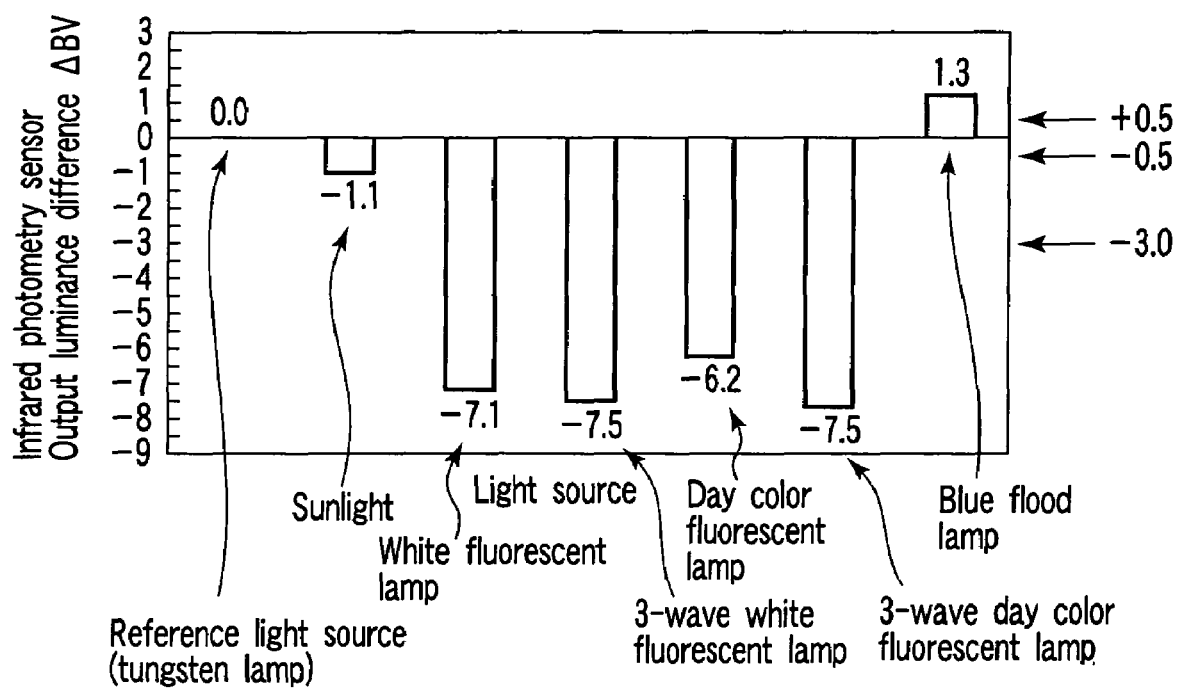
FIG. 6 is a diagram showing a difference ($\Delta$BV) between infrared photometry and visible photometry by the light source, standardized using a tungsten lamp as a reference, and showing a method of judging the light source in the present embodiment.

FIG. 6 is a diagram showing a difference (ΔBV) between the infrared photometry and the visible photometry by the above-described light sources, standardized using a tungsten lamp (incandescent lamp) as a reference, and showing a method of judging the light source in the present embodiment.

In FIG. 6, it is assumed that the reference light source is a tungsten lamp. Therefore, the luminance difference ΔBV is 0.0 in the tungsten lamp, −1.1 in sunlight, −7.1 in a white fluorescent lamp, −7.5 in 3-wave day white fluorescent lamp, −6.2 in a day white fluorescent lamp, −7.5 in a 3-wave daylight fluorescent lamp, and +1.3 in a blue flood lamp. Here, "standardized by the tungsten lamp" indicates a value obtained by subtracting a luminance difference in the case of irradiation of the camera with the tungsten lamp from the luminance difference in the irradiation of the camera with each light source light.

Here, for example, in a case where threshold values are disposed in positions of luminance differences −3 and +0.5, when the luminance difference ΔBV exceeds −3, the fluorescent lamp is judged. When the difference exceeds +0.5, the blue flood lamp can be judged.

Figure 7:
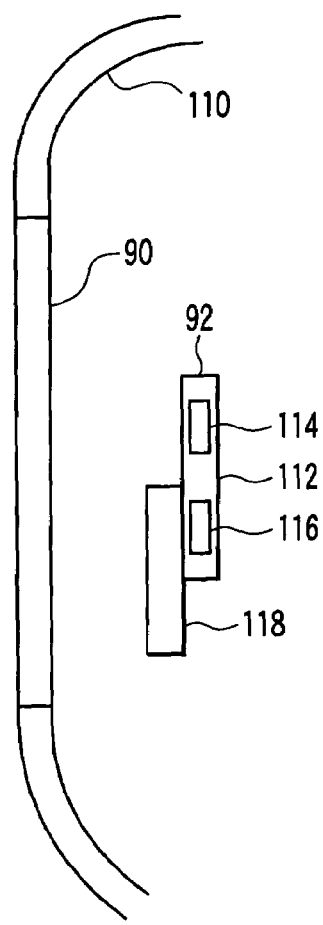
FIG. 7 is a diagram showing arrangement of the light source sensor 92.
Figure 8:
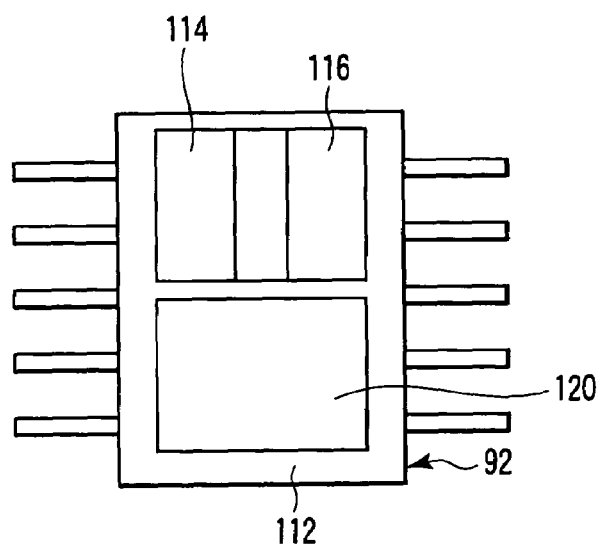
FIG. 8 is a plan view showing a constitution of the light source sensor 92.

FIG. 7 is a diagram showing arrangement of the light source sensor 92, and FIG. 8 is a plan view showing a constitution of the light source sensor 92.

The light source sensor 92 is disposed inside a camera exterior 110 of the camera body unit 16, and behind the diffusion plate 90. Moreover, the light source sensor 92 has a constitution in which the infrared light sensor 114, the visible infrared sensor (SPD) 116, and a control IC 120 for controlling these sensors are mounted on a clear mold 112. The infrared cut filter 118 is disposed on a front surface portion of the visible infrared sensor 116, that is, on a side facing the diffusion plate 90. Since the infrared light is cut by this infrared cut filter 118, the visible infrared light sensor 116 is a visible light sensor having a spectral sensitivity close to visible light.

In the present embodiment, the sensor having the spectral sensitivity in the infrared visible region is combined with the infrared cut filter in order to perform the visible photometry. In this constitution, a micro amount of light which enters the sensor without being infrared-cut is generated depending on the position of the infrared cut filter. Moreover, since this amount differs with an assembly error of the camera or the like, an absolute amount of the luminance difference between the visible light and the infrared light in the irradiation of the camera with each light source light differs.

However, the value obtained by standardizing the luminance difference based on the reference light source (tungsten light in the present embodiment) is constant regardless of a camera individual difference. Therefore, the light source can be stably judged based on the principle shown in FIG. 6.

Next, an operation of the camera system constituted in this manner will be described.

When a photographer presses a release button (not shown) of the camera body unit 16 by one stage, the camera CPU 60 calculates a diaphragm value for obtaining appropriate exposure based on data of subject luminance measured by the photometry circuit 74, and the result is transmitted to the lens CPU 30. The lens CPU 30 outputs a signal to the diaphragm driving mechanism 28 in such a manner as to obtain a desired diaphragm.

Moreover, the camera CPU 60 performs a process such as AF correction based on a detection result of the distance measurement section 84, lens information of the interchangeable lens unit 12 received beforehand, and lens information of the intermediate adapter 14. Accordingly, driving amounts of the photographic lenses 22a and 22b for the focusing are calculated, and transmitted to the lens CPU 30. In the lens CPU 30, a control signal for moving the photographic lenses 22a and 22b to the focal point is output to the lens driving mechanism 26 based on this driving amount.

Moreover, when the photographer presses the release button (not shown) of the camera body unit 16 by two stages, the quick return mirror 52 is retracted outside a photography light path by the camera CPU 60. Thereafter, the shutter 54 is operated, the light image of the subject is guided to the imaging element 56, and image data obtained from the imaging element 56 is subjected to image processing.

Next, a variation of the constitution of the camera system in the first embodiment will be described.

The camera system according to the present invention includes the constitution (constitution including the above-described interchangeable lens unit 12, intermediate adapter 14, and camera body unit 16) shown in FIG. 1, and can be constituted as three variations described hereinafter.

It is to be noted that in the following description of embodiments and variations, the constitution is basically similar to that shown in FIGS. 1 to 8, therefore the same parts are denoted with the same reference numerals, drawing and description are omitted, and only different parts will be described.

Figure 9:
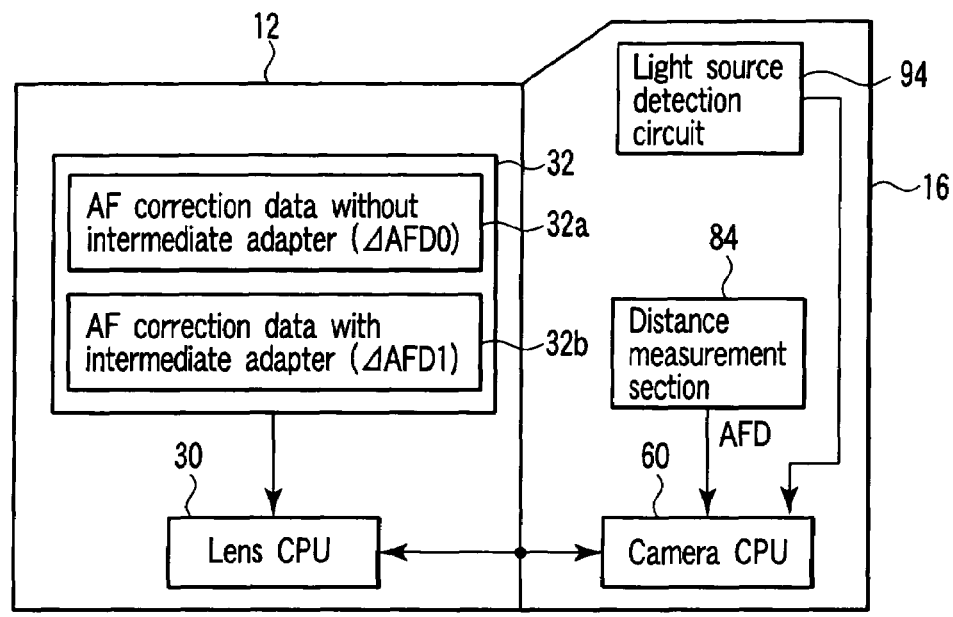
FIG. 9 is a diagram showing a constitution of a first variation of the camera system according to the present invention.

FIG. 9 is a diagram showing a constitution of a first variation of the camera system according to the present invention. In the first variation, the camera system comprises an interchangeable lens unit 12 and a camera body unit 16.

In a data storage section 32, AF correction data (ΔAFD0) 32a in a case where there is not any intermediate adapter 14, and AF correction data (ΔAFD1) 32b in a case where the intermediate adapter 14 is disposed are stored as the AF correction data.

Moreover, a camera CPU 60 corrects, for example, a distance measurement output (AFD) by a TTL phase difference system from a distance measurement section 84 using the AF correction data, and transmits a focus adjustment driving amount of the photographic lens to a lens CPU 30.

Here, a constitution of the AF correction data will be described.

Table 1 shows the constitution of the AF correction data ΔAFD0 stored beforehand in the data storage section 32 in the interchangeable lens unit 12.

TABLE 1

| | AF correction data | | | | |
|---|---|---|---|---|---|
| ΔAFD0 | Fluo. lamp | Day- light | Incan. lamp | Blue flood lamp | Aux. light |
| Focal length 1 | $fluo_{01}$ | $sun_{01}$ | $infr_{01}$ | $bruf_{01}$ | $hojo_{01}$ |
| Focal length 2 | $fluo_{02}$ | $sun_{02}$ | $infr_{02}$ | $bruf_{02}$ | $hojo_{02}$ |
| Focal length 3 | $fluo_{03}$ | $sun_{03}$ | $infr_{03}$ | $bruf_{03}$ | $hojo_{03}$ |
| . | . | . | . | . | . |
| . | . | . | . | . | . |
| . | . | . | . | . | . |
| Focal length n | $fluo_{0n}$ | $sun_{0n}$ | $infr_{0n}$ | $bruf_{0n}$ | $hojo_{0n}$ |

The respective AF correction data are stored in accordance with focal lengths 1 to n of the interchangeable lens unit 12 and further the type of the light source. As these AF correction data, for example, $fluo_{0n}$ for a fluorescent lamp, $sun_{0n}$ for daylight, $infr_{0n}$ for an incandescent lamp, $bruf_{0n}$ for a blue flood lamp, and $hojo_{0n}$ for auxiliary light are stored. These data are read from the data storage section 32, and stored in the camera storage section 66 of the camera body unit 16 by communication of the camera CPU 60 in the camera body unit 16 with the lens CPU 30 in the interchangeable lens unit 12.

Similarly, the AF correction data $\Delta AFD1$ is also stored in the data storage section 32 in the interchangeable lens unit 12. Table 2 shows a constitution of the AF correction data $\Delta AFD1$ stored beforehand in the data storage section 32 in the interchangeable lens unit 12.

TABLE 2

| | AF correction data | | | | |
|---|---|---|---|---|---|
| $\Delta AFD1$ | Fluo. lamp | Day-light | Incan. lamp | Blue flood lamp | Aux. light |
| Focal length 1 | $fluo_{11}$ | $sun_{11}$ | $infr_{11}$ | $bruf_{11}$ | $hojo_{11}$ |
| Focal length 2 | $fluo_{12}$ | $sun_{12}$ | $infr_{12}$ | $bruf_{12}$ | $hojo_{12}$ |
| Focal length 3 | $fluo_{13}$ | $sun_{13}$ | $infr_{13}$ | $bruf_{13}$ | $hojo_{13}$ |
| . | . | . | . | . | . |
| . | . | . | . | . | . |
| . | . | . | . | . | . |
| Focal length n | $fluo_{1n}$ | $sun_{1n}$ | $infr_{1n}$ | $bruf_{1n}$ | $hojo_{1n}$ |

The data constitution is the same as that of the AF correction data $\Delta AFD0$ of Table 1 described above.

Figure 11:
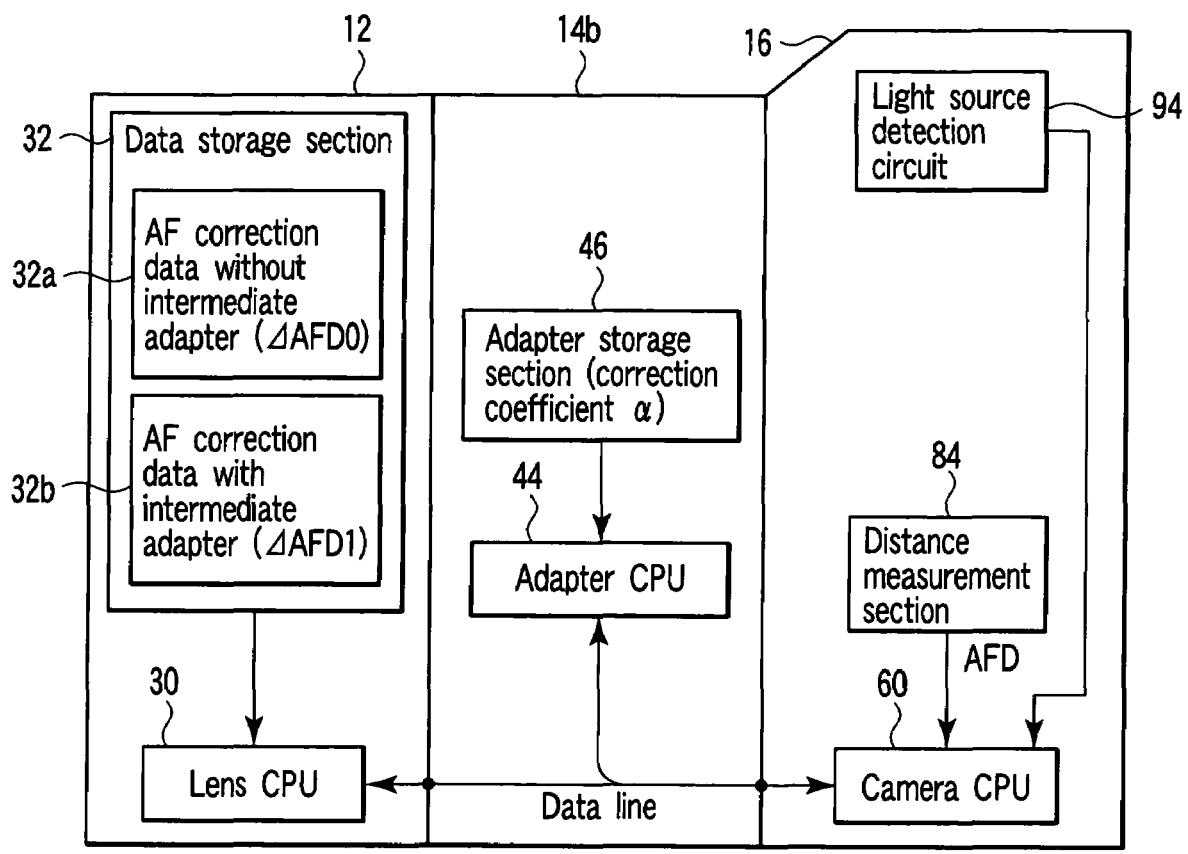
FIG. 11 is a diagram showing a constitution of a third variation of the camera system according to the present invention.

Moreover, a correction coefficient $\alpha$ stored in the adapter storage section 46 in an intermediate adapter (B type) 14$b$ shown in FIG. 11 is constituted as shown in Table 3.

TABLE 3

| | Correction coefficient | | | | |
|---|---|---|---|---|---|
| $\alpha$ | Fluo. lamp | Day-light | Incan. lamp | Blue flood lamp | Aux. light |
| Focal length 1 | $\alpha_{f1}$ | $\alpha_{s1}$ | $\alpha_{i1}$ | $\alpha_{b1}$ | $\alpha_{h1}$ |
| Focal length 2 | $\alpha_{f2}$ | $\alpha_{s2}$ | $\alpha_{i2}$ | $\alpha_{b2}$ | $\alpha_{h2}$ |
| Focal length 3 | $\alpha_{f3}$ | $\alpha_{s3}$ | $\alpha_{i3}$ | $\alpha_{b3}$ | $\alpha_{h3}$ |
| . | . | . | . | . | . |
| . | . | . | . | . | . |
| . | . | . | . | . | . |
| Focal length n | $\alpha_{fn}$ | $\alpha_{sn}$ | $\alpha_{in}$ | $\alpha_{bn}$ | $\alpha_{hn}$ |

It is to be noted that only data of a portion corresponding to focal length 1 is stored in a case where the interchangeable lens unit 12 does not comprise a zoom lens.

Figure 10:
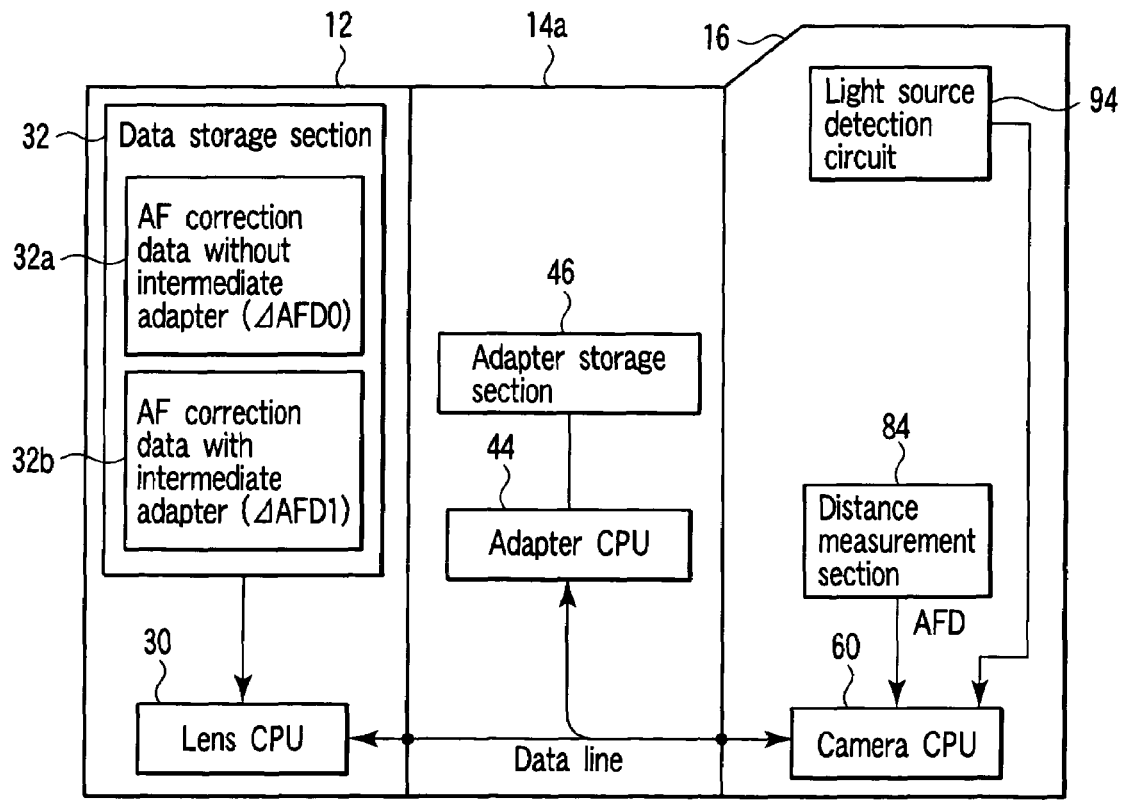
FIG. 10 is a diagram showing a constitution of a second variation of the camera system according to the present invention.

FIG. 10 is a diagram showing a constitution of a second variation of the camera system according to the present invention. In the second variation, the camera system comprises an interchangeable lens unit 12, an A-type intermediate adapter 14$a$, and a camera body unit 16. Here, the A-type intermediate adapter 14$a$ means an initial version of the intermediate adapter.

In a data storage section 32, AF correction data ($\Delta AFD0$) 32$a$ in a case where there is not any intermediate adapter 14, and AF correction data ($\Delta AFD1$) 32$b$ in a case where the A-type intermediate adapter 14$a$ is disposed are stored as the AF correction data. The A-type intermediate adapter 14$a$ is provided with an adapter CPU 44, but an adapter storage section 46 does not have to be especially disposed. If disposed, any data concerning the AF correction is not stored.

Moreover, a camera CPU 60 corrects, for example, a distance measurement output (AFD) by a TTL phase difference system from a distance measurement section 84 using the AF correction data, and transmits a focus adjustment driving amount of the photographic lens to a lens CPU 30.

FIG. 11 is a diagram showing a constitution of a third variation of the camera system according to the present invention. In the third variation, the camera system comprises an interchangeable lens unit 12, a B-type intermediate adapter 14$b$, and a camera body unit 16. Here, the B-type intermediate adapter 14$b$ means a version-up product obtained by improving the A-type intermediate adapter 14$a$.

In a data storage section 32, AF correction data ($\Delta AFD0$) 32$a$ in a case where there is not any intermediate adapter 14, and AF correction data ($\Delta AFD1$) 32$b$ in a case where the B-type intermediate adapter 14$b$ is disposed are stored as the AF correction data. The B-type intermediate adapter 14$b$ is provided with an adapter CPU 44 and an adapter storage section 46, and a correction coefficient $\Delta$ for converting the AF correction data for the A-type intermediate adapter 14$a$ into that for the B-type intermediate adapter 14$b$ is stored.

Moreover, a camera CPU 60 corrects, for example, a distance measurement output (AFD) by a TTL phase difference system from a distance measurement section 84 using the AF correction data, and transmits a focus adjustment driving amount of the photographic lens to a lens CPU 30.

Next, an AF correction operation of the camera system will be described.

The operation relating to the AF correction of the camera system is roughly divided into two as follows:

(1) an operation by the camera CPU 60 in the camera body unit 16 to acquire the lens information from the interchangeable lens unit 12 and the intermediate adapter 14; and (2) an operation by the camera CPU 60 in the camera body unit 16 to calculate a defocus correction amount for the focusing.

These operations will be described hereinafter. It is to be noted that the camera CPU 60 has a processing function capable of handing the above-described three constitutional variations (see FIGS. 9 to 11).

Figure 12:
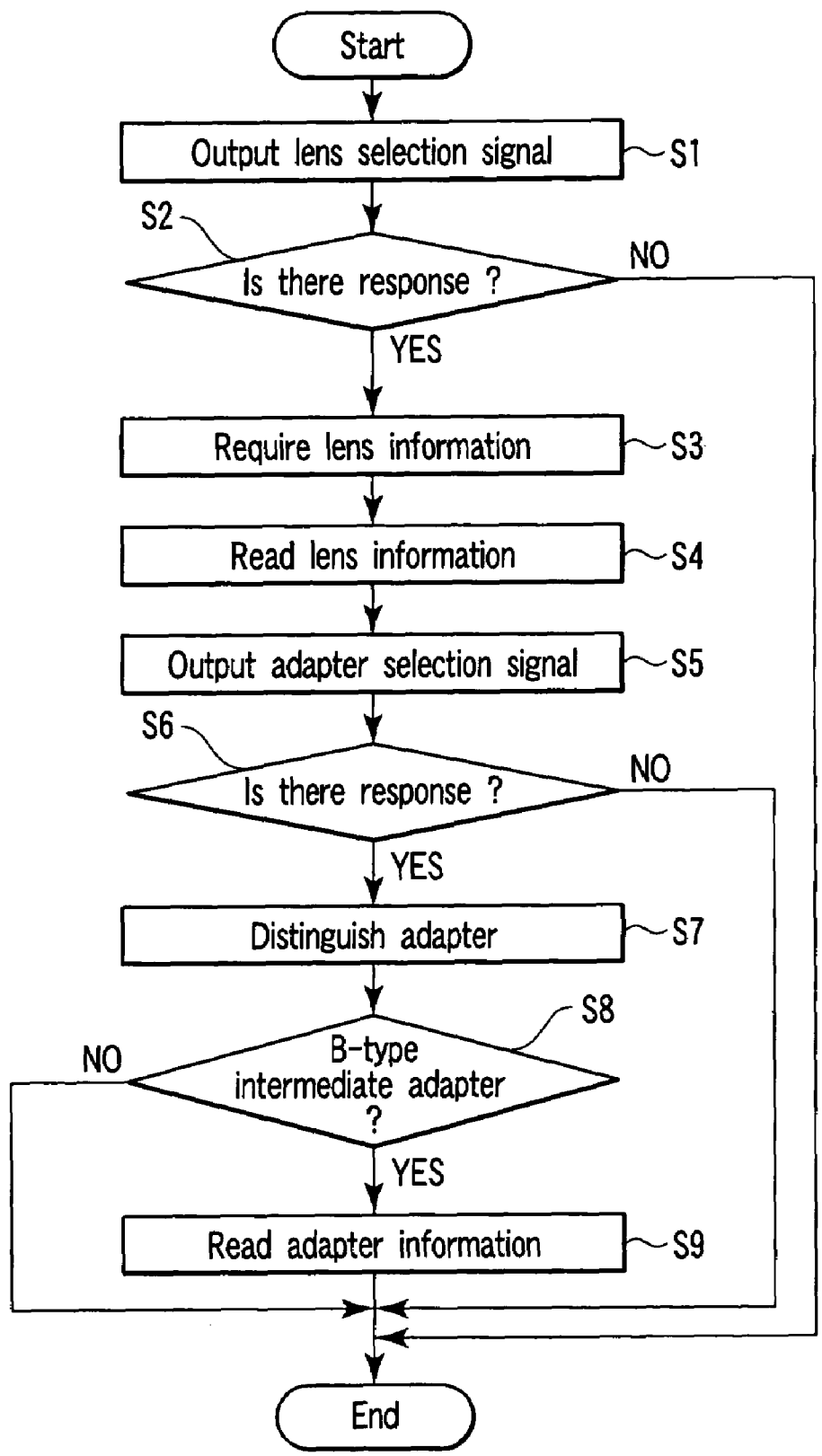
FIG. 12 is a schematic flowchart showing a procedure in which a camera CPU 60 acquires lens information.

FIG. 12 is a schematic flowchart showing a procedure in which the camera CPU 60 acquires the lens information.

This flowchart is started, when a power supply of the camera body unit 16 is turned on, or when the interchangeable lens unit 12 and intermediate adapter 14 are attached.

First, in step S1, a lens selection signal is output from the camera CPU 60 in order to receive the lens information from the interchangeable lens unit 12. That is, a signal level of "LSEL" line changes to a high level (High) from a low level (Low). Next, in step S2, it is judged whether or not there is a response from the interchangeable lens unit 12.

Here, a response signal indicating a communicatable (ready) state is returned by the lens CPU 30 in a state in which the communication is possible. When there is not any response from the interchangeable lens unit 12, the process of the camera CPU 60 ends. On the other hand, when there is a response from the interchangeable lens unit 12, the process shifts to step S3 to require the lens information by the camera CPU 60. That is, a lens information request command is set to "CONT" line.

In the lens CPU 30, the data storage section 32 is searched to thereby extract the lens information in response to this request signal. The extracted lens information is transmitted to the camera CPU 60 from the lens CPU 30. The transmitted lens information is, for example, lens type, release FNo, focal length, focus lens point, AF correction data (ΔAFD0, ΔAFD1) and the like.

Moreover, in step S4, these transmitted lens information are read by the camera CPU 60, and stored in the camera storage section 66. Subsequently, in step S5, an adapter selection signal is output by the camera CPU 60 in order to receive adapter information from the intermediate adapter 14. That is, the signal level of "ASEL" line changes to High from Low.

Moreover, in step S6, it is judged whether or not there is a response from the intermediate adapter 14. Here, in a state in which communication is possible, a response signal indicating a communicatable (ready) state is returned to the camera CPU 60 from the adapter CPU 44.

When there is not any response from the intermediate adapter 14, the camera system has a constitution shown in FIG. 9, and the process by the camera CPU 60 ends. On the other hand, when there is a response from the intermediate adapter 14, the response is checked by the camera CPU 60, and the type of the intermediate adapter to be attached to the camera body unit 16 is distinguished.

Next, the process shifts to step S8 to judge whether or not the type of the intermediate adapter to be attached to the camera body unit 16 is a B-type intermediate adapter. Here, when the adapter is not the B-type intermediate adapter, that is, when the adapter is an A-type intermediate adapter, the camera system is constituted as shown in FIG. 10. Therefore, since lens correction data (ΔAFD1) is already acquired by the camera CPU 60, the process ends.

On the other hand, when the type of the intermediate adapter to be attached is the B-type intermediate adapter in step S8, the camera system is constituted as shown in FIG. 11, and the adapter information is required by the camera CPU 60. That is, an adapter information request command is set to "CONT" line. The adapter storage section 46 is searched by the adapter CPU 44 to extract the adapter information in response to the request signal. Moreover, the extracted adapter information is transmitted to the camera CPU 60. The transmitted adapter information is, for example, the above-described correction coefficient α or the like.

In step S9, these transmitted adapter information are read by the camera CPU 60, and stored in the camera storage section 66.

By the above-described procedure, the AF correction data for the above-described constituted variations 1 to 3 are acquired by the camera CPU 60, and the data is stored in the camera storage section 66.

Figure 13:
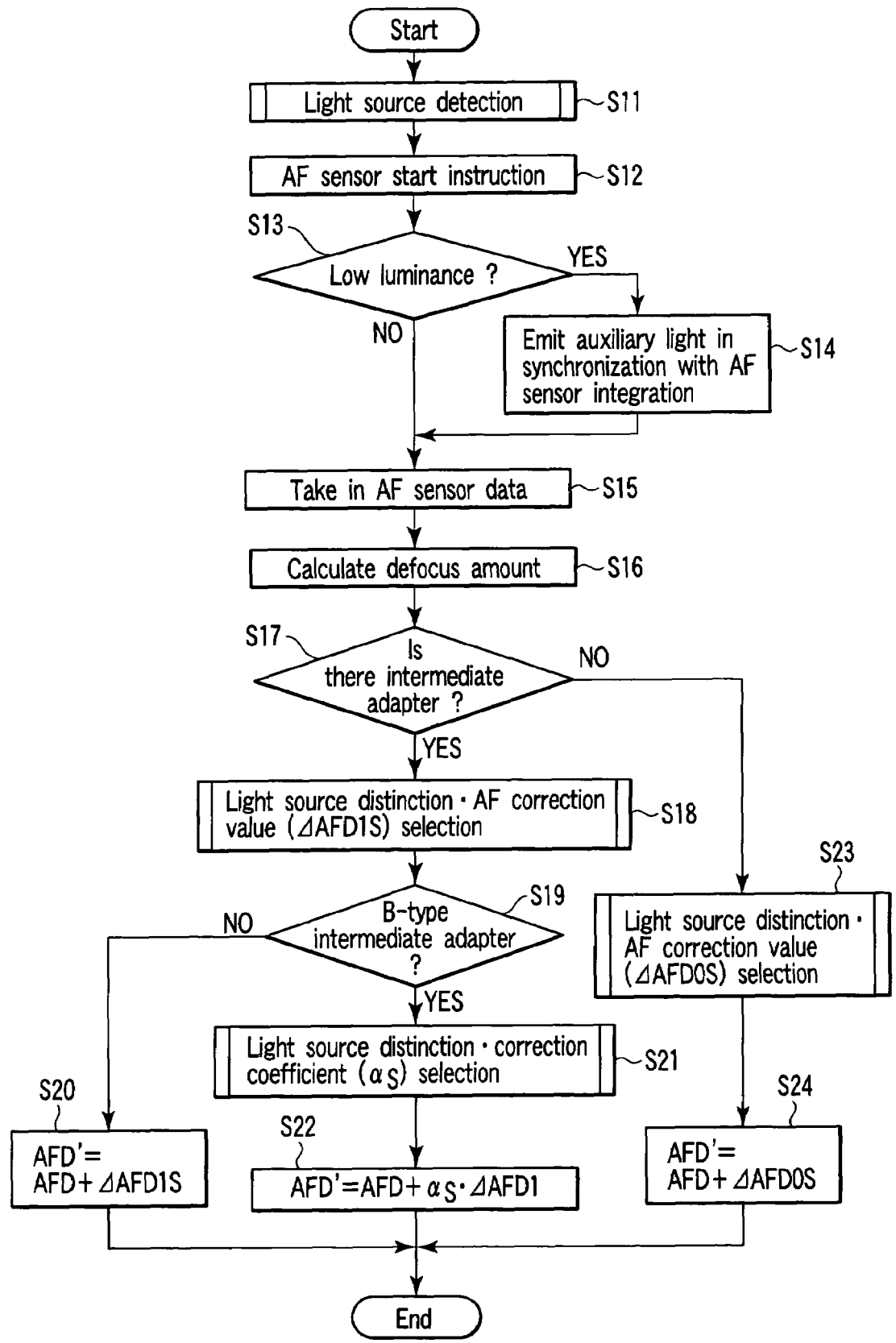
FIG. 13 is a schematic flowchart showing a procedure in which correction calculation of a defocus amount for focusing is performed by the camera CPU 60.

FIG. 13 is a schematic flowchart showing a procedure in which correction calculation of a defocus amount for focusing is performed by the camera CPU 60. This flowchart shows an AF operation for preparing for the photography, executed when the photographer presses the release button (not shown) of the camera body unit 16.

First, in step S11, the light source sensor 92 is operated by the camera CPU 60, and subroutine "light source detection" is executed.

Figure 14:
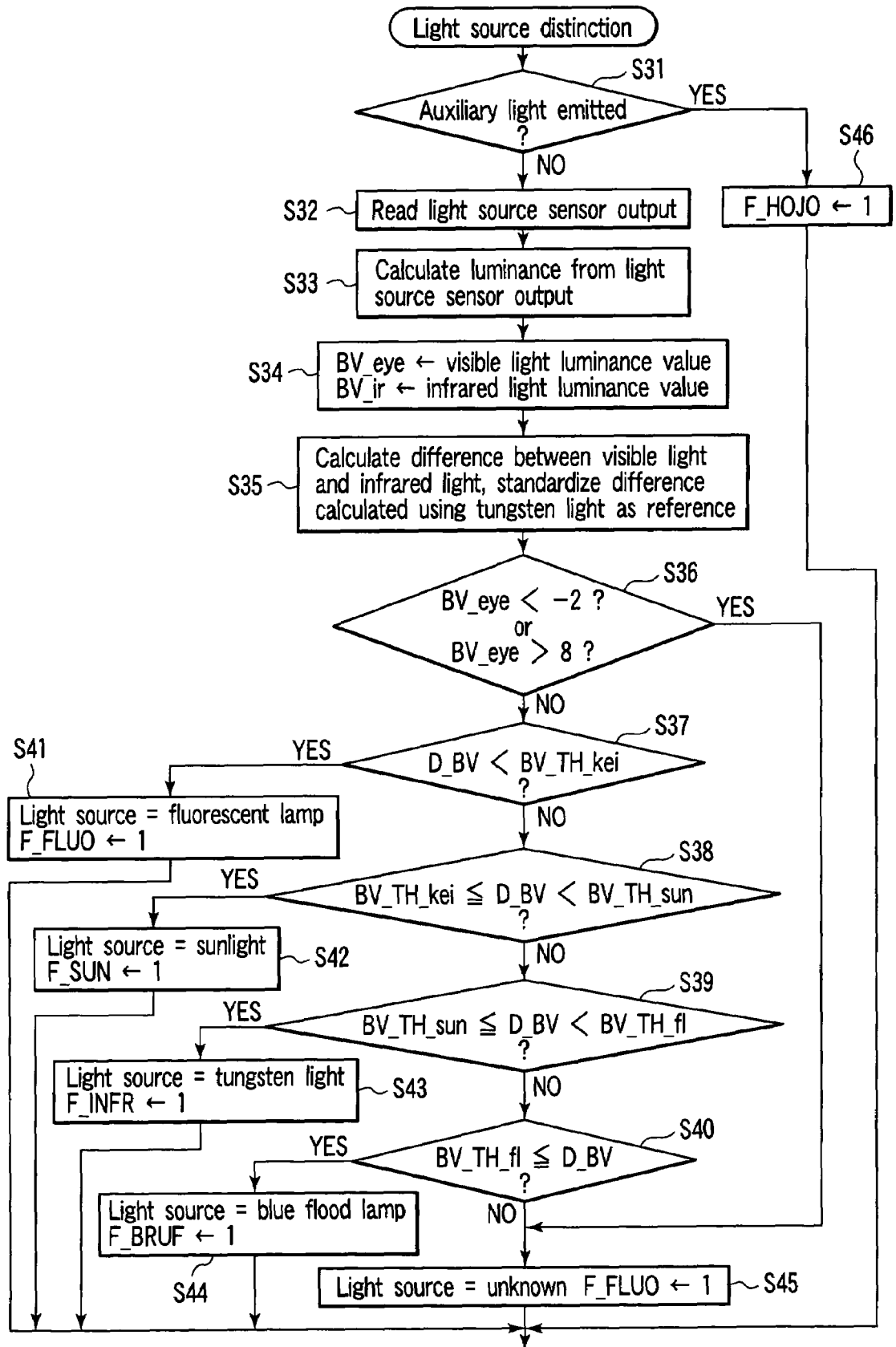
FIG. 14 is a flowchart showing a detailed operation of a subroutine "light source detection" of step S11 in the flowchart of FIG. 13.

Here, a detailed operation of the subroutine "light source detection" of step S11 in the flowchart of FIG. 13 will be described with reference to a flowchart of FIG. 14.

When entering this routine, first, flags F_FLUO, F_SUN, F_INFR, F_BRUF, F_HOJO indicating types of light sources (not shown) are cleared. Next, in step S31, it is judged whether or not the auxiliary light has been emitted at an integration operation time of the AF sensor 82. Here, when the auxiliary light is emitted, the process shifts to step S46 to set 1 to flag [F_HOJO]. Thereafter, the process comes out of the present routine.

On the other hand, when the auxiliary light is not emitted in step S31, the process shifts to step S32, and an output of the light source sensor 92 is read. Next, luminance of the light source is calculated from the output of the light source sensor 92 in step S33. Furthermore, in step S34, luminance values of the visible light and infrared light are calculated, respectively.

A difference between visible light (BV_eye) and infrared light (BV_ir) is calculated in accordance with the following equation in step S35:

$$D\_BV \leftarrow BV\_ir - BV\_eye;$$

$$D\_BV \leftarrow D\_BV - DBV\_REF,$$

where DBV_REF is a luminance difference between the visible light and the infrared light at the time of irradiation of reference tungsten light (incandescent lamp). This difference is obtained as a value which differs with individual cameras, and stored as an adjusted value in the camera CPU 60.

Thus, the difference calculated using the tungsten light (incandescent lamp) as a reference is standardized.

Next, it is judged in step S36 whether or not the above-described luminance value of the visible light is a usable value. This is because light source detection precision of the light source sensor deteriorates in a case where the luminance is excessively bright or dark, and therefore an output of light source detection is not very reliable. In this case, it is judged in step S36 whether the luminance value of the visible light is smaller than −2 or larger than 8.

Here, when the luminance value of the visible light is smaller than −2 or larger than 8, the process shifts to step S45, and it is assumed that the light source is unknown. On the other hand, when the luminance value is −2 or more and 8 or less, the process shifts to step S37.

In step S37, the luminance difference D_BV calculated in step S35 is compared with a threshold value BV_TH_kei of the fluorescent lamp. Here, when the luminance difference D_BV is smaller than the threshold value BV_TH_kei of the fluorescent lamp, the process shifts to step S41. When the difference is larger, the process shifts to step S38.

It is judged in step S38 whether or not the luminance difference D_BV calculated in step S35 is between the threshold value BV_TH_kei of the fluorescent lamp and a threshold value BV_TH_sun of the sunlight. Here, when the luminance difference D_BV is in a range of both the threshold values, the process shifts to step S42. When the difference is out of the range, the process shifts to step S39.

Moreover, it is judged in step S39 whether or not the luminance difference D_BV calculated in step S35 is between the threshold value BV_TH_sun of the sunlight and a threshold value BV_TH_fl of the tungsten light. Here, when the luminance difference D_BV is in a range of both the threshold values, the process shifts to step S43. When the difference is out of the range of both the threshold values, the process shifts to step S40.

In step S40, the luminance difference D_BV calculated in step S35 is compared with the threshold value BV_TH_fl of the tungsten light. Here, when the luminance difference D_BV is larger than the threshold value BV_TH_fl of the tungsten light, the process shifts to step S44. When the difference is smaller, the process shifts to step S45.

As to the above-described threshold values of the respective light sources, as shown in Table 4, for example, the threshold value BV_TH_kei of the fluorescent lamp is set to −3, the threshold value BV_TH_sun of the sunlight is set to −0.5, and the threshold value BV_TH_fl of the tungsten light is set to +0.5.

TABLE 4

| Name | Light source threshold value (ΔBV) |
|---|---|
| BV_TH_kei | −3 |
| BV_TH_sun | −0.5 |
| BV_TH_fl | +0.5 |

Moreover, in step S41, the fluorescent lamp is regarded as the light source (1 is set to flag [F_FLUO]). Similarly, in step S42, the sunlight is regarded as the light source, and in step S43, the tungsten light is regarded as the light source. Furthermore, in step S44, the blue flood lamp is regarded as the light source. In step S46, as described above, it is assumed that the light source is unknown. When the light source is unknown, the correction value of the fluorescent lamp which is a reference light source in adjusting a defocus correction value in the lens is used, and therefore flag [F_FLUO] is set.

When the light source is detected in this manner, the process comes out of the present routine.

Turning back to the flowchart of FIG. 13, in step S12, an instruction to start an operation is output to the AF sensor 82 by the camera CPU 60. Moreover, in the subsequent step S13, it is judged from an output of the photometry circuit 74 whether or not the subject has a low luminance. As a result, when the subject has the low luminance, the process shifts to step S14, and the auxiliary light section 76 emits the light in synchronization with the integration operation of the AF sensor 82. It is to be noted that when the subject does not have the low luminance in step S13, step S14 is skipped.

In step S15, AF sensor data is taken from the AF sensor 82. Next, in step S16, a defocus number on the sensor is obtained from the AF sensor data by the distance measurement section 84. Furthermore, the defocus amounts (AFD) of the photographic lenses 22a and 22b are calculated from this pitch number.

Next, it is judged in step S17 whether or not the intermediate adapter 14 is connected. Here, when the intermediate adapter 14 is not connected, the camera system has a constitution shown in FIG. 9. Therefore, the process shifts to step S23, the type of the light source is distinguished from the AF correction data (ΔAFD0) 32a in a case where the intermediate adapter 14 is not connected based on light source detection results with respect to the defocus amount (AFD) from the distance measurement section 84, and the data ΔAFD0S is selected.

Figure 15:
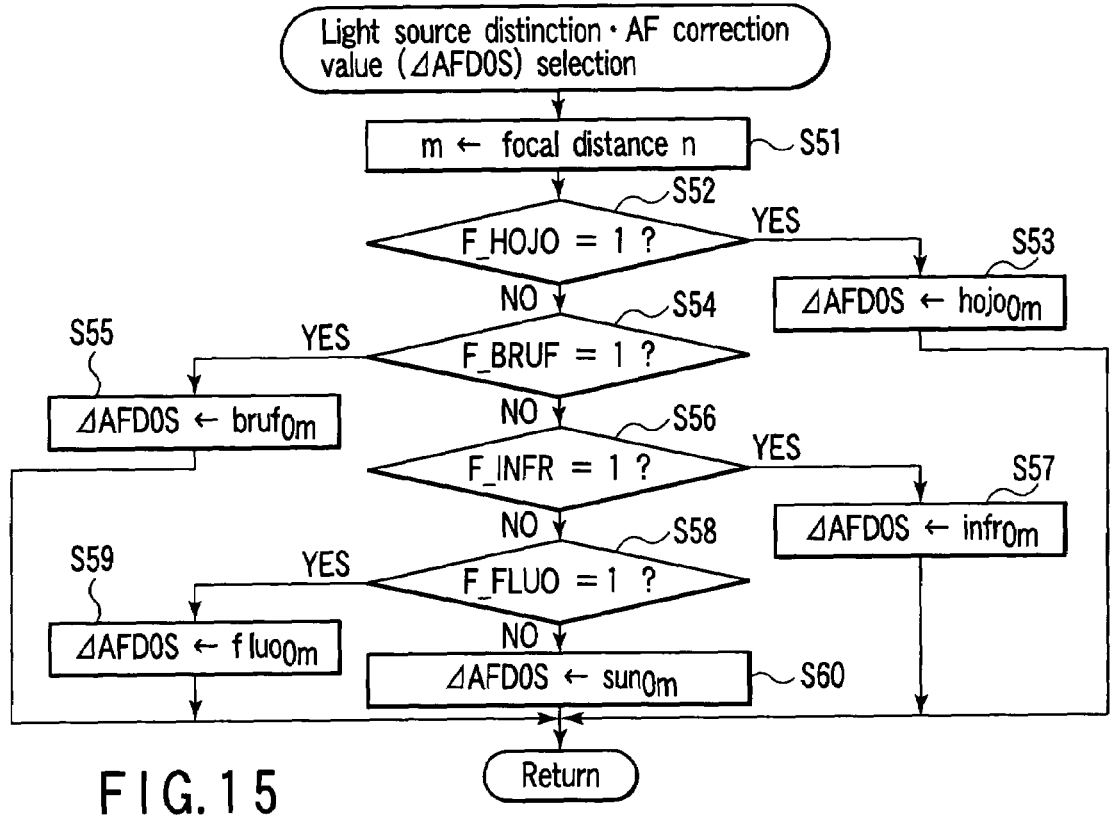
FIG. 15 is a flowchart showing an operation of a subroutine "light source distinction, AF correction value ($\Delta$AFD0S) selection" of step S23 in the flowchart of FIG. 13.

Here, an operation of a subroutine "light source distinction, AF correction value (ΔAFD0S) selection" of step S23 in the flowchart of FIG. 13 will be described with reference to a flowchart of FIG. 15.

When entering the present subroutine, first in step S51, focal length information n transmitted from the lens CPU 30 is input into m. Next, it is judged in step S52 whether or not flag [F_HOJO] indicating the auxiliary light has been set. Here, when the flag [F_HOJO] is set, the process shifts to step S53. In this step S53, hojo0m is selected and input into the AF correction value ΔAFD0S based on Table 1 described above. Thereafter, the process comes out of the present routine.

When the flag [F_HOJO] is not set in step S52, the process shifts to step S54. Moreover, it is judged in step S54 whether or not flag [F_BRUF] indicating the blue flood lamp has been set. Here, when the flag [F_BRUF] is set, the process shifts to step S55. In this step S55, bruf0m is selected and input into the AF correction value ΔAFD0S based on Table 1 described above. Thereafter, the process comes out of the present routine.

On the other hand, when the flag [F_BRUF] is not set in step S54, the process shifts to step S56. Moreover, it is judged in step S56 whether or not flag [F_INFR] indicating the incandescent lamp has been set. Here, when the flag [F_INFR] is set, the process shifts to step S57. In this step S57, infr0m is selected and input into the AF correction value ΔAFD0S based on Table 1 described above. Thereafter, the process comes out of the present routine.

When the flag [F_INFR] is not set in step S56, the process shifts to step S58. Moreover, it is judged in step S58 whether or not flag [F_FLUO] indicating the fluorescent lamp has been set. Here, when the flag [F_FLUO] is set, the process shifts to step S59. In this step S59, fluo0m is selected and input into the AF correction value ΔAFD0S based on Table 1 described above. Thereafter, the process comes out of the present routine.

When the flag [F_FLUO] is not set in step S58, the process shifts to step S60, and sun0m is selected and input into the AF correction value ΔAFD0S based on Table 1 described above. Thereafter, the process comes out of the present routine.

Turning back to the flowchart of FIG. 13, in step S24, ΔAFD0S is added to the defocus amount (AFD), and a correction defocus amount (AFD') is calculated.

When the intermediate adapter 14 is connected in step S17, the process shifts to step S18, the AF correction data (ΔAFD1) 32b in a case where the intermediate adapter 14 is disposed is extracted from the camera storage section 66, further the light source is distinguished, and data ΔAFD1S is selected.

Figure 16:
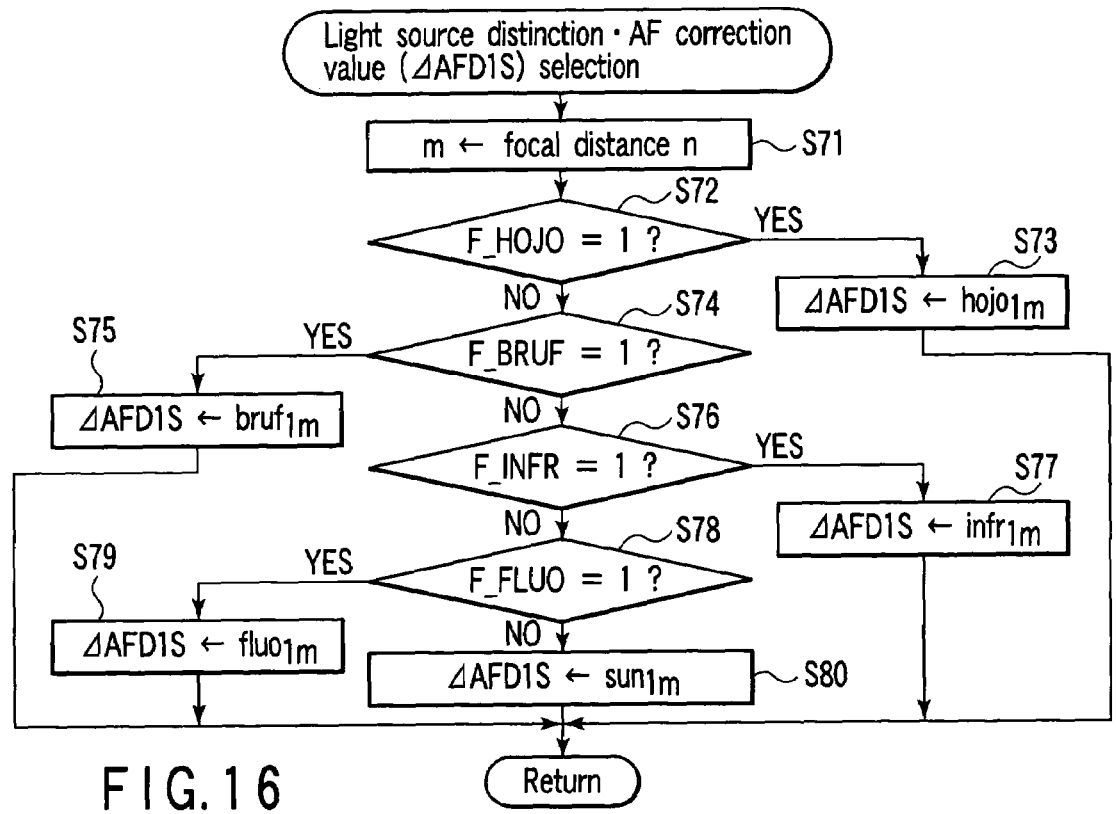
FIG. 16 is a flowchart showing an operation of a subroutine "light source distinction, AF correction value ($\Delta$AFD01) selection" of step S18 in the flowchart of FIG. 13.

Here, an operation of a subroutine "light source distinction, AF correction value (ΔAFD1S) selection" of step S18 in the flowchart of FIG. 13 will be described with reference to a flowchart of FIG. 16.

When entering the present subroutine, first in step S71, focal length information n transmitted from the lens CPU 30 is input into m. Next, it is judged in step S72 whether or not flag [F_HOJO] indicating the auxiliary light has been set. Here, when the flag [F_HOJO] is set, the process shifts to step S73. In this step S73, hojo1m is selected and input into the AF correction value ΔAFD1S based on Table 2 described above. Thereafter, the process comes out of the present routine.

When the flag [F_HOJO] is not set in step S72, the process shifts to step S74. Moreover, it is judged in step S74 whether or not flag [F_BRUF] indicating the blue flood lamp has been set. Here, when the flag [F_BRUF] is set, the process shifts to step S75. In this step S75, bruf1m is selected and input into the AF correction value ΔAFD1S based on Table 2 described above. Thereafter, the process comes out of the present routine.

On the other hand, when the flag [F_BRUF] is not set in step S74, the process shifts to step S76. Moreover, it is judged in step S76 whether or not flag [F_INFR] indicating the incandescent lamp has been set. Here, when the flag [F_INFR] is set, the process shifts to step S77. In this step S77, infr1m is selected and input into the AF correction value ΔAFD1S based on Table 2 described above. Thereafter, the process comes out of the present routine.

When the flag [F_INFR] is not set in step S76, the process shifts to step S78. Moreover, it is judged in step S78 whether or not flag [F_FLUO] indicating the fluorescent lamp has been set. Here, when the flag [F_FLUO] is set, the process shifts to step S79. In this step S79, fluo1m is selected and input into the AF correction value ΔAFD1S based on Table 2 described above. Thereafter, the process comes out of present routine.

Moreover, when the flag [F_FLUO] is not set in step S78, the process shifts to step S80, and sun1m is selected and input into the AF correction value ΔAFD1S based on Table 2 described above. Thereafter, the process comes out of the present routine.

Turning back to the flowchart of FIG. 13, in step S19, the camera storage section 66 is searched to thereby distinguish the type of the intermediate adapter, and it is checked whether or not the type of the intermediate adapter is a B-type intermediate adapter. Here, when the adapter is not the B-type intermediate adapter, that is, when the adapter is the A-type intermediate adapter, the camera system is constituted as shown in FIG. 10, and the camera CPU 60 has already acquired the AF correction data (ΔAFD1) 32b. Then, the process shifts to step S20, the AF correction data ΔAFD1) 32b in a case where the intermediate adapter 14 is disposed is added to the defocus amount (AFD) from the distance measurement section 84 in the camera CPU 60, and a correction defocus amount (AFD') is calculated. Thereafter, the process comes out of the present routine.

On the other hand, when the adapter is distinguished as the B-type intermediate adapter in step S19, the camera system is constituted as shown in FIG. 11. Therefore, the process shifts to step S21, a correction coefficient α is extracted from the camera storage section 66 by the camera CPU 60, the light source is distinguished, and the data is selected as $\alpha_S$.

Figure 17:
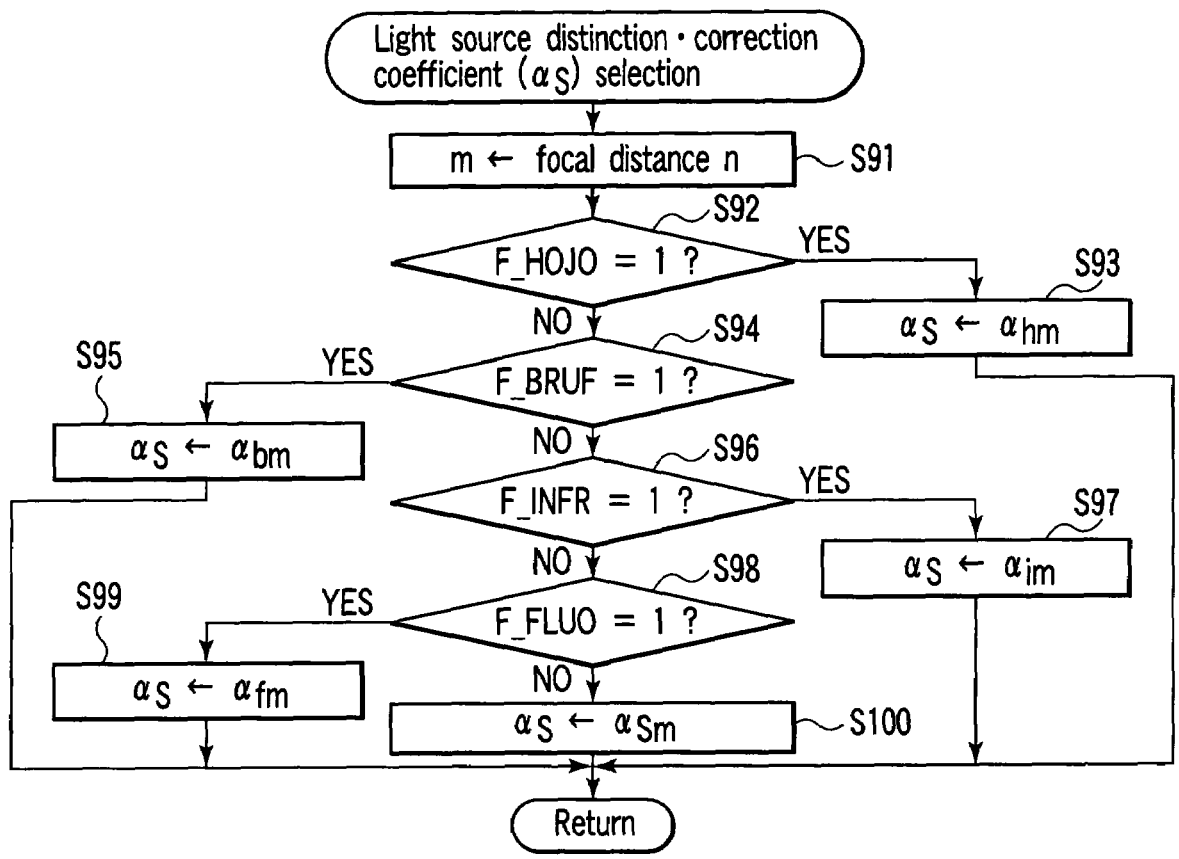
FIG. 17 is a flowchart showing an operation of a subroutine "light source distinction, correction coefficient ($\alpha_S$) selection" of step S21 in the flowchart of FIG. 13.

Here, an operation of a subroutine "light source distinction, correction coefficient ($\alpha_S$) selection" of step S21 in the flowchart of FIG. 13 will be described with reference to a flowchart of FIG. 17.

When entering the present subroutine, first in step S91, focal length information n transmitted from the lens CPU 30 is input into m. Next, it is judged in step S92 whether or not flag [F_HOJO] indicating the auxiliary light has been set. Here, when the flag [F_HOJO] is set, the process shifts to step S93. In this step S93, $\alpha_{hm}$ is selected and input into the correction coefficient $\alpha_S$ based on Table 3 described above. Thereafter, the process comes out of the present routine.

When the flag [F_HOJO] is not set in step S92, the process shifts to step S94. Moreover, it is judged in step S94 whether or not flag [F_BRUF] indicating the blue flood lamp has been set. Here, when the flag [F_BRUF] is set, the process shifts to step S95. In this step S95, $\alpha_{bm}$ is selected and input into the correction coefficient $\alpha_S$ based on Table 3 described above. Thereafter, the process comes out of the present routine.

On the other hand, when the flag [F_BRUF] is not set in step S94, the process shifts to step S96. Moreover, it is judged in step S96 whether or not flag [F_INFR] indicating the incandescent lamp has been set. Here, when the flag [F_INFR] is set, the process shifts to step S97. In this step S97, $\alpha_{im}$ is selected and input into the correction coefficient $\alpha_S$ based on Table 3 described above. Thereafter, the process comes out of the present routine.

When the flag [F_INFR] is not set in step S96, the process shifts to step S98. Moreover, it is judged in step S98 whether or not flag [F_FLUO] indicating the fluorescent lamp has been set. Here, when the flag [F_FLUO] is set, the process shifts to step S99. In this step S99, $\alpha_{fm}$ is selected and input into the correction coefficient $\alpha_S$ based on Table 3 described above. Thereafter, the process comes out of the present routine.

Moreover, when the flag [F_FLUO] is not set in step S98, the process shifts to step S100, and $\alpha_{sm}$ is selected and input into the correction coefficient $\alpha_S$ based on Table 3 described above. Thereafter, the process comes out of the present routine.

Turning back to the flowchart of FIG. 13, in step S22, a value obtained by multiplying the AF correction data (ΔAFD1) 32b in a case where the intermediate adapter 14 is disposed by the correction coefficient $\alpha_S$ is added to the defocus amount (AFD) from the distance measurement section 84, and a correction defocus amount (AFD') is calculated.

Moreover, the camera CPU 60 transmits the correction defocus amount (AFD') calculated in the above-described procedure to the lens CPU 30. The lens CPU 30 moves the photographic lenses 22a and 22b to thereby perform a focusing operation based on this value.

It is to be noted that in step S20, the AF correction data (ΔAFD1) 32b is multiplied by the correction coefficient $\alpha_S$ to thereby calculate the correction defocus amount (AFD'), but the present invention is not limited to this mode. For example, the correction coefficient $\alpha_S$ may be added (subtracted) with respect to the AF correction data (ΔAFD1) 32b, or the correction defocus amount (AFD') may be calculated using a function while the AF correction data (ΔAFD1) 32b and the correction coefficient $\alpha_S$ are parameters.

Furthermore, the camera CPU 60 acquires the AF correction data (ΔAFD1) 32b and the correction coefficient $\alpha_S$ from the interchangeable lens unit 12 and the intermediate adapter 14, but the camera CPU 60 may receive the information from an external apparatus (e.g., server) by communication means to thereby perform an AF correction operation.

Second Embodiment

Next, a second embodiment of the present invention will be described.

This second embodiment is an example in which further correction by a subject distance is added in accordance with a type of a light source.

It is known that a defocus amount generated by the light source differs with a position of a focus lens. This is also known to be attributed to changing of spherical aberration by the focus lens point, that is, a feed amount of the focus lens (see FIG. 18).

Since the focus lens point corresponds to a subject distance, both will be described hereinafter in the same meaning.

Table 5 below shows defocus correction data for the light source, stored in ΔAFD0 32a of a data storage section 32 in an interchangeable lens unit 12.

TABLE 5

|  | Subject distance L (focus lens point) | | | |
| --- | --- | --- | --- | --- |
|  | Infinite to 5 m | 5-2 m | 2-1 m | 1-0.5 m |
| Fluorescent lamp | $g_{1f0}$ | $g_{2f0}$ | $g_{3f0}$ | $g_{4f0}$ |
| Sunlight | $g_{1s0}$ | $g_{2s0}$ | $g_{3s0}$ | $g_{4s0}$ |

TABLE 5-continued

| | Subject distance L (focus lens point) | | | |
|---|---|---|---|---|
| | Infinite to 5 m | 5-2 m | 2-1 m | 1-0.5 m |
| Incandescent lamp | $g_{1i0}$ | $g_{2i0}$ | $g_{3i0}$ | $g_{4i0}$ |
| Blue flood lamp | $g_{1b0}$ | $g_{2b0}$ | $g_{3b0}$ | $g_{4b0}$ |
| Auxiliary light | $g_{1h0}$ | $g_{2h0}$ | $g_{3h0}$ | $g_{4h0}$ |

This focus lens has, for example, a closest photography distance of 0.5 m, 0.5 m to infinite subject distance is divided into four regions, and defocus correction data is held.

Figure 18:
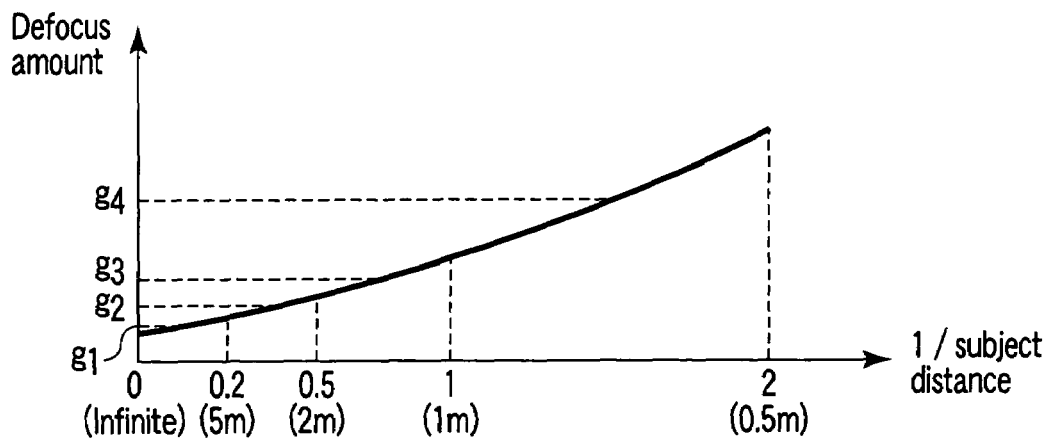
FIG. 18 is a diagram showing a characteristic of only one type of light source according to a second embodiment of the present invention.

FIG. 18 shows a characteristic of only one type of light source. A defocus amount of an average value in each region is set as correction data g.

Figure 19A:
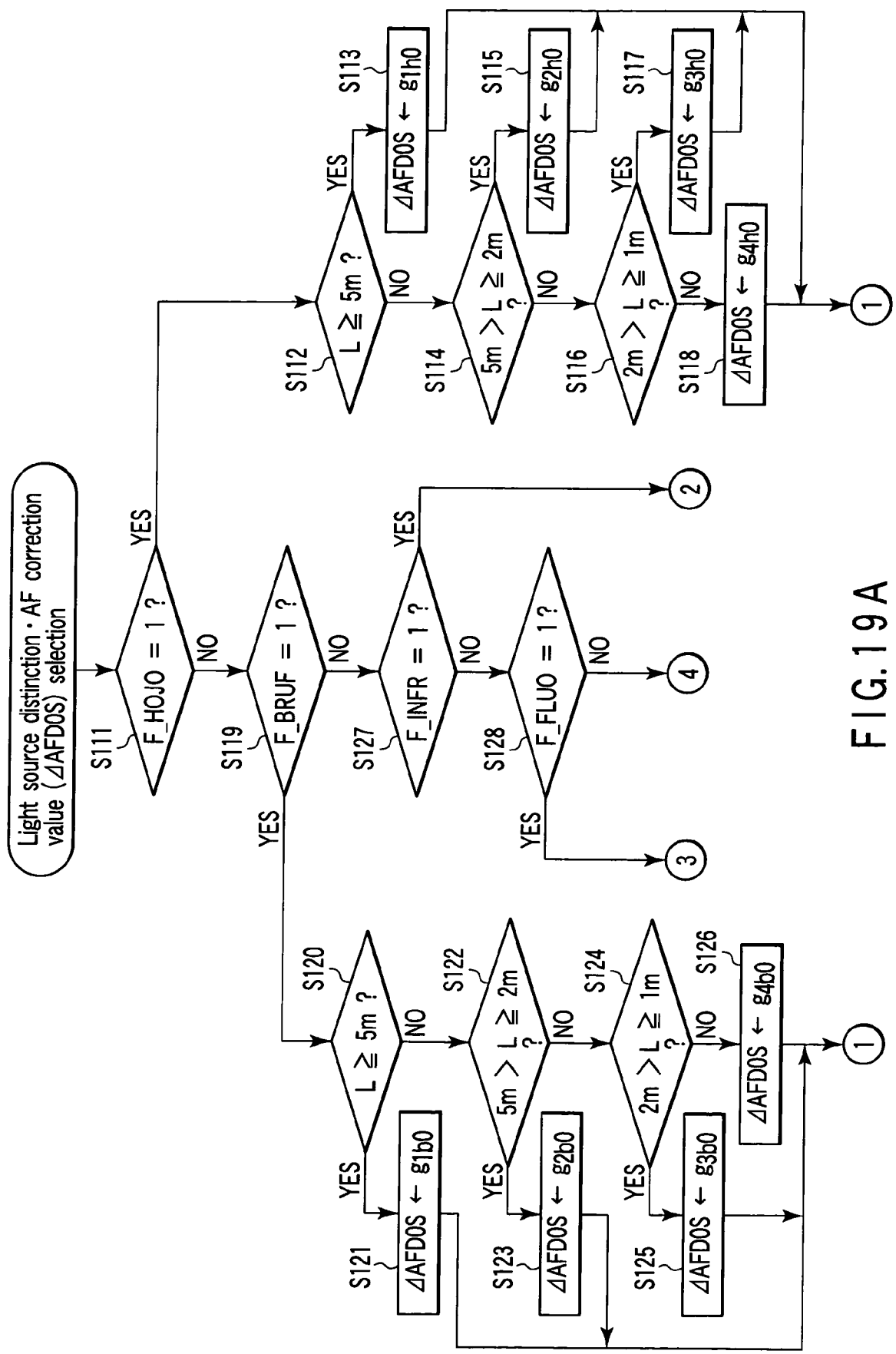
FIGS. 19A and 19B are flowcharts showing an operation of a subroutine "light source distinction•AF correction value ($\Delta$AFD0S) selection" of step S23 in the flowchart of FIG. 13 in the second embodiment of the present invention.
Figure 19B:
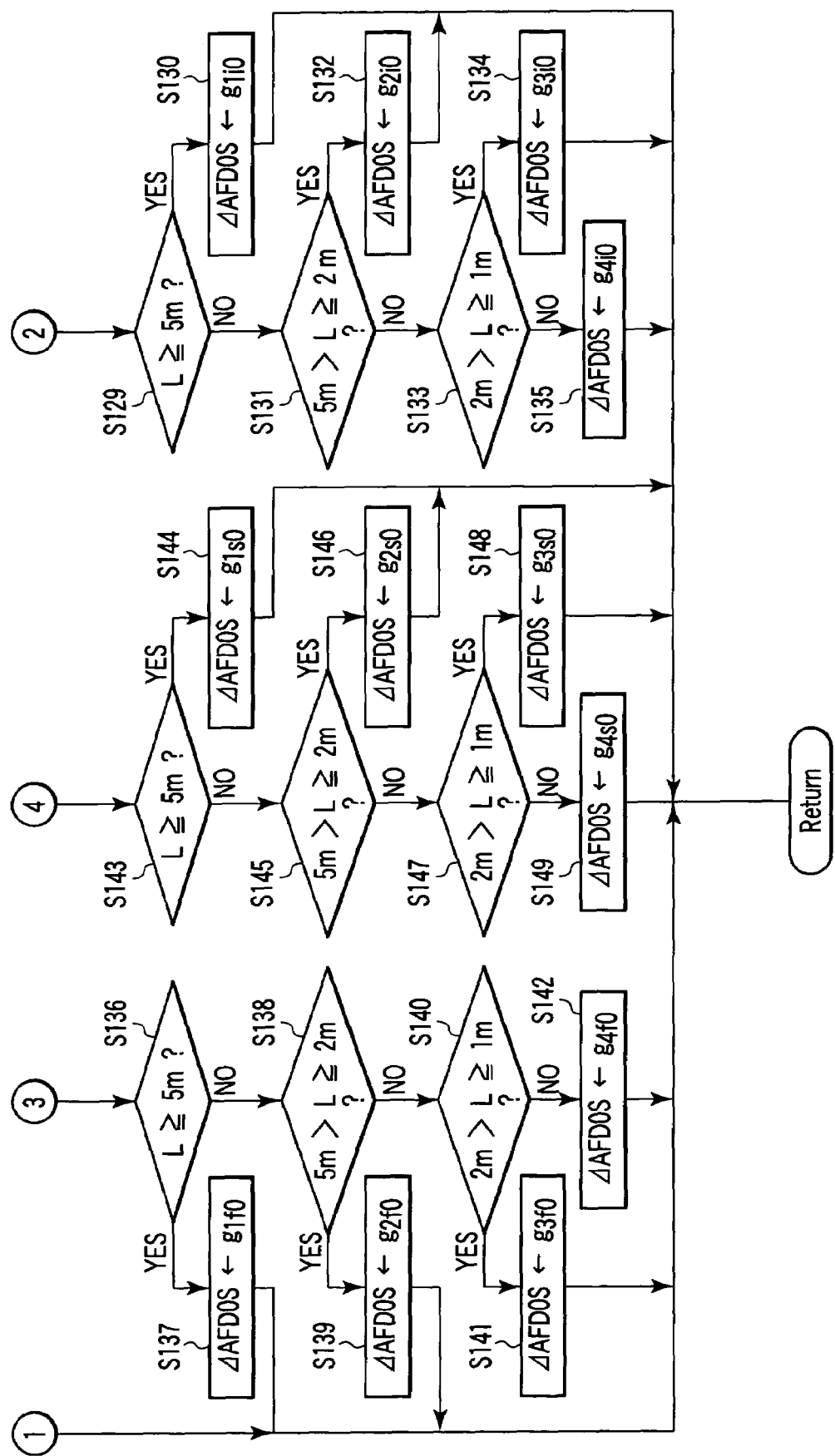

FIGS. 19A and 19B are flowcharts showing an operation of a subroutine "light source distinction•AF correction value (ΔAFD0S) selection" in which defocus is corrected using the defocus correction data of Table 5 described above in the second embodiment.

This operation will be described hereinafter.

It is to be noted that the focus lens point (=distance) is detected by a focus encoder (not shown) in a lens driving mechanism 26, and obtained by communication by a lens CPU 30.

When entering a subroutine "light source distinction•AF correction value selection" of step S23 in the flowchart of FIG. 13, first in step S111, flag [F_HOJO] is distinguished. Here, when flag [F_HOJO] is set, the process shifts to step S112 to judge whether or not a subject distance L is 5 m or more. As a result, when the focal length L is 5 m or more, the process shifts to step S113, and an aberration correction amount $g_{1h0}$ is input into ΔAFD0S which is AF correction data in accordance with correction data of Table 5 described above. Thereafter, the process comes out of the present subroutine.

On the other hand, when the subject distance L is less than 5 m in step S112, the process shifts to step S114, and it is judged whether or not the subject distance L is between 2 m and 5 m. Here, when the focal length L is between 2 m and 5 m, the process shifts to step S115, and aberration correction amount $g_{2h0}$ is input into AF correction data ΔAFD0S in accordance with the correction data of Table 5. Thereafter, the process comes out of the present subroutine.

Furthermore, when the subject distance L is less than 2 m in step S114, the process shifts to step S116, and it is judged whether or not the subject distance L is between 1 m and 2 m. Here, when the focal length L is between 1 m and 2 m, the process shifts to step S117, and aberration correction amount $g_{3h0}$ is input into the AF correction data ΔAFD0S in accordance with the correction data of Table 5. Thereafter, the process comes out of the present subroutine.

Additionally, when the subject distance L is less than 1 m in step S116, the process shifts to step S118, and an aberration correction amount $g_{4h0}$ is input into the AF correction data ΔAFD0S in accordance with the correction data of Table 5. Thereafter, the process comes out of the present subroutine.

On the other hand, when the flag [F_HOJO] is not set in step S111, the process shifts to step S119, and it is judged whether or not flag [F_BRUF] has been set. Here, when the flag [F_BRUF] is set, the process shifts to step S120.

It is judged in step S120 whether or not a subject distance L is 5 m or more. As a result, when the focal length L is 5 m or more, the process shifts to step S121, and an aberration correction amount $g_{1b0}$ is input into the AF correction data ΔAFD0S in accordance with the correction data of Table 5 described above. Thereafter, the process comes out of the present subroutine.

On the other hand, when the subject distance L is less than 5 m in step S120, the process shifts to step S122, and it is judged whether or not the subject distance L is between 2 m and 5 m. Here, when the focal length L is between 2 m and 5 m, the process shifts to step S123, and an aberration correction amount $g_{2b0}$ is input into the AF correction data ΔAFD0S in accordance with the correction data of Table 5. Thereafter, the process comes out of the present subroutine.

Furthermore, when the subject distance L is less than 2 m in step S122, the process shifts to step S124, and it is judged whether or not the subject distance L is between 1 m and 2 m. Here, when the focal length L is between 1 m and 2 m, the process shifts to step S125, and an aberration correction amount $g_{3b0}$ is input into the AF correction data ΔAFD0S in accordance with the correction data of Table 5. Thereafter, the process comes out of the present subroutine.

Additionally, when the subject distance L is less than 1 m in step S124, the process shifts to step S126, and an aberration correction amount $g_{4b0}$ is input into the AF correction data ΔAFD0S in accordance with the correction data of Table 5. Thereafter, the process comes out of the present subroutine.

On the other hand, when the flag [F_BRUF] is not set in step S119, the process shifts to step S127, and it is judged whether or not flag [F_INFR] has been set. Here, when the flag [F_INFR] is set, the process shifts to step S129.

It is judged in step S129 whether or not a subject distance L is 5 m or more. As a result, when the focal length L is 5 m or more, the process shifts to step S130, and an aberration correction amount $g_{1i0}$ is input into the AF correction data ΔAFD0S in accordance with the correction data of Table 5 described above. Thereafter, the process comes out of the present subroutine.

On the other hand, when the subject distance L is less than 5 m in step S129, the process shifts to step S131, and it is judged whether or not the subject distance L is between 2 m and 5 m. Here, when the focal length L is between 2 m and 5 m, the process shifts to step S132, and an aberration correction amount $g_{2i0}$ is input into the AF correction data ΔAFD0S in accordance with the correction data of Table 5. Thereafter, the process comes out of the present subroutine.

Furthermore, when the subject distance L is less than 2 m in step S131, the process shifts to step S133, and it is judged whether or not the subject distance L is between 1 m and 2 m. Here, when the focal length L is between 1 m and 2 m, the process shifts to step S134, and an aberration correction amount $g_{3i0}$ is input into the AF correction data ΔAFD0S in accordance with the correction data of Table 5. Thereafter, the process comes out of the present subroutine.

Additionally, when the subject distance L is less than 1 m in step S133, the process shifts to step S135, and an aberration correction amount $g_{4i0}$ is input into the AF correction data ΔAFD0S in accordance with the correction data of Table 5. Thereafter, the process comes out of the present subroutine.

Moreover, when the flag [F_INFR] is not set in step S127, the process shifts to step S128, and it is judged whether or not flag [F_FLUO] has been set. Here, when the flag [F_FLUO] is set, the process shifts to step S136.

It is judged in step S136 whether or not a subject distance L is 5 m or more. As a result, when the focal length L is 5 m or more, the process shifts to step S137, and an aberration correction amount $g_{1f0}$ is input into the AF correction data $\Delta$AFD0S in accordance with the correction data of Table 5 described above. Thereafter, the process comes out of the present subroutine.

On the other hand, when the subject distance L is less than 5 m in step S136, the process shifts to step S138, and it is judged whether or not the subject distance L is between 2 m and 5 m. Here, when the focal length L is between 2 m and 5 m, the process shifts to step S139, and an aberration correction amount $g_{2f0}$ is input into the AF correction data $\Delta$AFD0S in accordance with the correction data of Table 5. Thereafter, the process comes out of the present subroutine.

Furthermore, when the subject distance L is less than 2 m in step S138, the process shifts to step S140, and it is judged whether or not the subject distance L is between 1 m and 2 m. Here, when the focal length L is between 1 m and 2 m, the process shifts to step S141, and an aberration correction amount $g_{3f0}$ is input into the AF correction data $\Delta$AFD0S in accordance with the correction data of Table 5. Thereafter, the process comes out of the present subroutine.

Additionally, when the subject distance L is less than 1 m in step S140, the process shifts to step S142, and an aberration correction amount $g_{4f0}$ is input into the AF correction data $\Delta$AFD0S in accordance with the correction data of Table 5. Thereafter, the process comes out of the present subroutine.

On the other hand, when the flag [F_FLUO] is not set in step S128, the process shifts to step S143. In this case, since the light source is not any of the auxiliary light, blue flood lamp, incandescent lamp, and fluorescent lamp, the light source is distinguished as the sunlight.

It is judged in step S143 whether or not a subject distance L is 5 m or more. As a result, when the focal length L is 5 m or more, the process shifts to step S144, and an aberration correction amount $g_{1s0}$ is input into the AF correction data $\Delta$AFD0S in accordance with the correction data of Table 5 described above. Thereafter, the process comes out of the present subroutine.

On the other hand, when the subject distance L is less than 5 m in step S143, the process shifts to step S145, and it is judged whether or not the subject distance L is between 2 m and 5 m. Here, when the focal length L is between 2 m and 5 m, the process shifts to step S146, and an aberration correction amount $g_{2s0}$ is input into the AF correction data $\Delta$AFD0S in accordance with the correction data of Table 5. Thereafter, the process comes out of the present subroutine.

Furthermore, when the subject distance L is less than 2 m in step S145, the process shifts to step S147, and it is judged whether or not the subject distance L is between 1 m and 2 m. Here, when the focal length L is between 1 m and 2 m, the process shifts to step S148, and an aberration correction amount $g_{3s0}$ is input into the AF correction data $\Delta$AFD0S in accordance with the correction data of Table 5. Thereafter, the process comes out of the present subroutine.

Additionally, when the subject distance L is less than 1 m in step S147, the process shifts to step S149, and an aberration correction amount $g_{4s0}$ is input into the AF correction data $\Delta$AFD0S in accordance with the correction data of Table 5. Thereafter, the process comes out of the present subroutine.

Table 6 below shows defocus correction data for the light source, stored in $\Delta$AFD1S 32b of a data storage section 32 in an interchangeable lens unit 12 in the same manner as in Table 5.

TABLE 6

| | Subject distance L (focus lens point) | | | |
|---|---|---|---|---|
| | Infinite to 5 m | 5-2 m | 2-1 m | 1-0.5 m |
| Fluorescent lamp | $g_{1f1}$ | $g_{2f1}$ | $g_{3f1}$ | $g_{4f1}$ |
| Sunlight | $g_{1s1}$ | $g_{2s1}$ | $g_{3s1}$ | $g_{4s1}$ |
| Incandescent lamp | $g_{1i1}$ | $g_{2i1}$ | $g_{3i1}$ | $g_{4i1}$ |
| Blue flood lamp | $g_{1b1}$ | $g_{2b1}$ | $g_{3b1}$ | $g_{4b1}$ |
| Auxiliary light | $g_{1h1}$ | $g_{2h1}$ | $g_{3h1}$ | $g_{4h1}$ |

This focus lens also has, for example, a closest photography distance of 0.5 m, 0.5 m to infinite subject distance is divided into four regions, and defocus correction data is held.

Figure 20A:
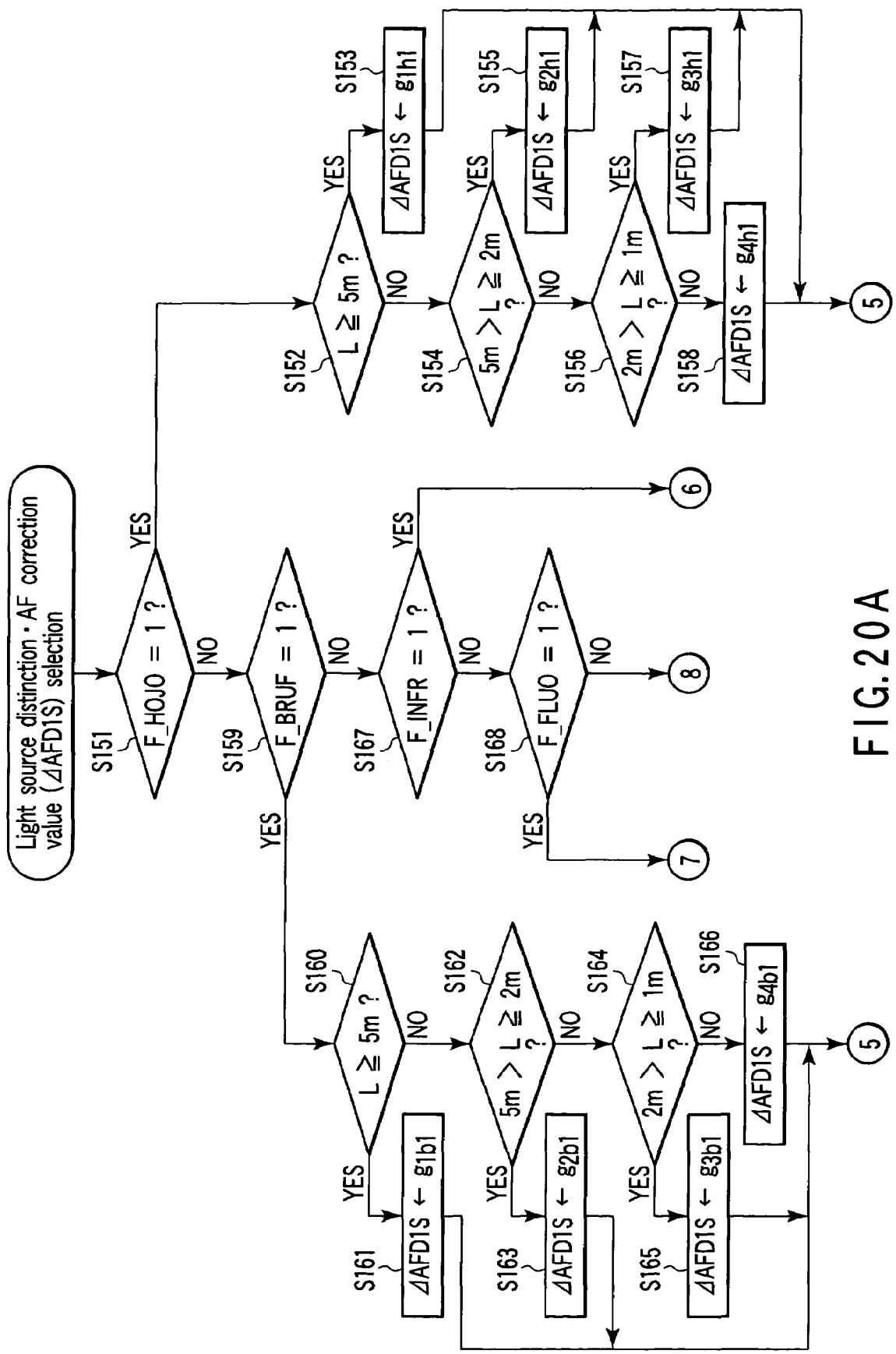
FIGS. 20A and 20B are flowcharts showing an operation of a subroutine "light source distinction•AF correction value ($\Delta$AFD1S) selection" of step S18 in the flowchart of FIG. 13 in the second embodiment of the present invention.
Figure 20B:
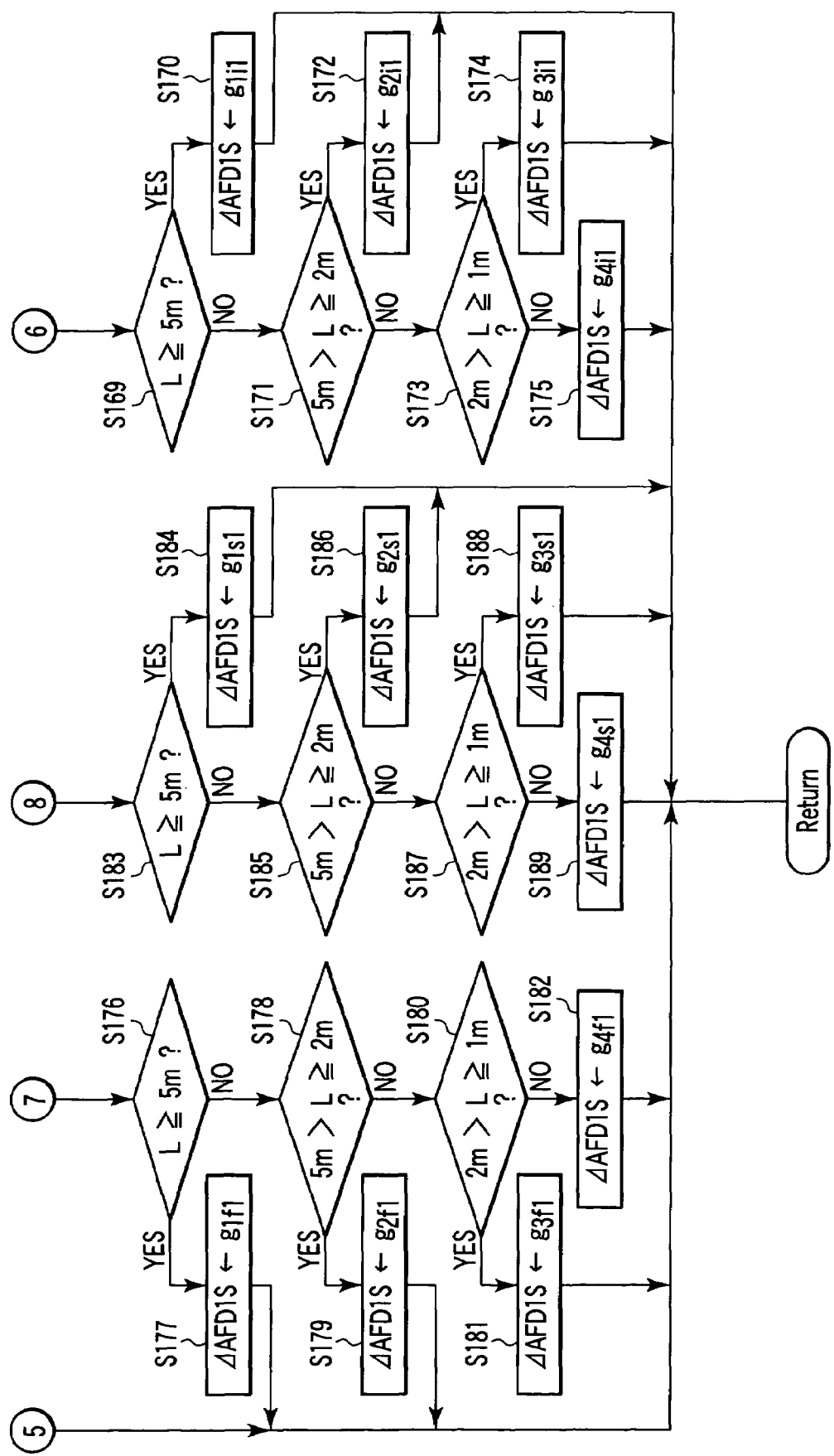

FIGS. 20A and 20B are flowcharts showing an operation of a subroutine "light source distinction•AF correction value ($\Delta$AFD1S) selection" in which defocus is corrected using the defocus correction data of Table 6 described above in the second embodiment.

This operation will be described hereinafter.

When entering a subroutine "light source distinction•AF correction value selection" of step S18 in the flowchart of FIG. 13, first in step S151, flag [F_HOJO] is distinguished. Here, when flag [F_HOJO] is set, the process shifts to step S152 to judge whether or not a subject distance L is 5 m or more. As a result, when the focal length L is 5 m or more, the process shifts to step S153, and an aberration correction amount $g_{1h1}$ is input into $\Delta$AFD1S which is AF correction data in accordance with correction data of Table 6 described above. Thereafter, the process comes out of the present subroutine.

On the other hand, when the subject distance L is less than 5 m in step S152, the process shifts to step S154, and it is judged whether or not the subject distance L is between 2 m and 5 m. Here, when the focal length L is between 2 m and 5 m, the process shifts to step S155, and aberration correction amount $g_{2h1}$ is input into the AF correction data $\Delta$AFD1S in accordance with the correction data of Table 6. Thereafter, the process comes out of the present subroutine.

Furthermore, when the subject distance L is less than 2 m in step S154, the process shifts to step S156, and it is judged whether or not the subject distance L is between 1 m and 2 m. Here, when the focal length L is between 1 m and 2 m, the process shifts to step S157, and an aberration correction amount $g_{3h1}$ is input into the AF correction data $\Delta$AFD1S in accordance with the correction data of Table 6. Thereafter, the process comes out of the present subroutine.

Additionally, when the subject distance L is less than 1 m in step S156, the process shifts to step S158, and an aberration correction amount $g_{4h1}$ is input into the AF correction data $\Delta$AFD1S in accordance with the correction data of Table 6. Thereafter, the process comes out of the present subroutine.

On the other hand, when the flag [F_HOJO] is not set in step S151, the process shifts to step S159, and it is judged whether or not flag [F_BRUF] has been set. Here, when the flag [F_BRUF] is set, the process shifts to step S160.

It is judged in step S160 whether or not a subject distance L is 5 m or more. As a result, when the focal length L is 5 m or more, the process shifts to step S161, and an aberration correction amount $g_{1b1}$ is input into the AF correction data $\Delta AFD1S$ in accordance with the correction data of Table 6 described above. Thereafter, the process comes out of the present subroutine.

On the other hand, when the subject distance L is less than 5 m in step S160, the process shifts to step S162, and it is judged whether or not the subject distance L is between 2 m and 5 m. Here, when the focal length L is between 2 m and 5 m, the process shifts to step S163, and an aberration correction amount $g_{2b1}$ is input into the AF correction data $\Delta AFD1S$ in accordance with the correction data of Table 6. Thereafter, the process comes out of the present subroutine.

Furthermore, when the subject distance L is less than 2 m in step S162, the process shifts to step S164, and it is judged whether or not the subject distance L is between 1 m and 2 m. Here, when the focal length L is between 1 m and 2 m, the process shifts to step S165, and an aberration correction amount $g_{3b1}$ is input into the AF correction data $\Delta AFD1S$ in accordance with the correction data of Table 6. Thereafter, the process comes out of the present subroutine.

Additionally, when the subject distance L is less than 1 m in step S164, the process shifts to step S166, and an aberration correction amount $g_{4b1}$ is input into the AF correction data $\Delta AFD1S$ in accordance with the correction data of Table 6. Thereafter, the process comes out of the present subroutine.

On the other hand, when the flag [F_BRUF] is not set in step S159, the process shifts to step S167, and it is judged whether or not flag [F_INFR] has been set. Here, when the flag [F_INFR] is set, the process shifts to step S169.

It is judged in step S169 whether or not a subject distance L is 5 m or more. As a result, when the focal length L is 5 m or more, the process shifts to step S170, and an aberration correction amount $g_{1i1}$ is input into the AF correction data $\Delta AFD1S$ in accordance with the correction data of Table 6 described above. Thereafter, the process comes out of the present subroutine.

On the other hand, when the subject distance L is less than 5 m in step S169, the process shifts to step S171, and it is judged whether or not the subject distance L is between 2 m and 5 m. Here, when the focal length L is between 2 m and 5 m, the process shifts to step S172, and an aberration correction amount $g_{2i1}$ is input into the AF correction data $\Delta AFD1S$ in accordance with the correction data of Table 6. Thereafter, the process comes out of the present subroutine.

Furthermore, when the subject distance L is less than 2 m in step S171, the process shifts to step S173, and it is judged whether or not the subject distance L is between 1 m and 2 m. Here, when the focal length L is between 1 m and 2 m, the process shifts to step S174, and an aberration correction amount $g_{3i1}$ is input into the AF correction data $\Delta AFD1S$ in accordance with the correction data of Table 6. Thereafter, the process comes out of the present subroutine.

Additionally, when the subject distance L is less than 1 m in step S173, the process shifts to step S175, and an aberration correction amount $g_{4i1}$ is input into the AF correction data $\Delta AFD1S$ in accordance with the correction data of Table 6. Thereafter, the process comes out of the present subroutine.

Moreover, when the flag [F_INFR] is not set in step S167, the process shifts to step S168, and it is judged whether or not flag [F_FLUO] has been set. Here, when the flag [F_FLUO] is set, the process shifts to step S176.

It is judged in step S176 whether or not a subject distance L is 5 m or more. As a result, when the focal length L is 5 m or more, the process shifts to step S177, and an aberration correction amount $g_{1f1}$ is input into the AF correction data $\Delta AFD1S$ in accordance with the correction data of Table 6 described above. Thereafter, the process comes out of the present subroutine.

On the other hand, when the subject distance L is less than 5 m in step S176, the process shifts to step S178, and it is judged whether or not the subject distance L is between 2 m and 5 m. Here, when the focal length L is between 2 m and 5 m, the process shifts to step S179, and an aberration correction amount $g_{2f1}$ is input into the AF correction data $\Delta AFD1S$ in accordance with the correction data of Table 6. Thereafter, the process comes out of the present subroutine.

Furthermore, when the subject distance L is less than 2 m in step S178, the process shifts to step S180, and it is judged whether or not the subject distance L is between 1 m and 2 m. Here, when the focal length L is between 1 m and 2 m, the process shifts to step S181, and an aberration correction amount $g_{3f1}$ is input into the AF correction data $\Delta AFD1S$ in accordance with the correction data of Table 6. Thereafter, the process comes out of the present subroutine.

Additionally, when the subject distance L is less than 1 m in step S180, the process shifts to step S182, and an aberration correction amount $g_{4f1}$ is input into the AF correction data $\Delta AFD1S$ in accordance with the correction data of Table 6. Thereafter, the process comes out of the present subroutine.

On the other hand, when the flag [F_FLUO] is not set in step S168, the process shifts to step S183. In this case, since the light source is not any of the auxiliary light, blue flood lamp, incandescent lamp, and fluorescent lamp, the light source is distinguished as the sunlight.

It is judged in step S183 whether or not a subject distance L is 5 m or more. As a result, when the focal length L is 5 m or more, the process shifts to step S184, and an aberration correction amount $g_{1s1}$ is input into the AF correction data $\Delta AFD1S$ in accordance with the correction data of Table 6 described above. Thereafter, the process comes out of the present subroutine.

On the other hand, when the subject distance L is less than 5 m in step S183, the process shifts to step S185, and it is judged whether or not the subject distance L is between 2 m and 5 m. Here, when the focal length L is between 2 m and 5 m, the process shifts to step S186, and an aberration correction amount $g_{2s1}$ is input into the AF correction data $\Delta AFD1S$ in accordance with the correction data of Table 6. Thereafter, the process comes out of the present subroutine.

Furthermore, when the subject distance L is less than 2 m in step S185, the process shifts to step S187, and it is judged whether or not the subject distance L is between 1 m and 2 m. Here, when the focal length L is between 1 m and 2 m, the process shifts to step S188, and an aberration correction amount $g_{3s1}$ is input into the AF correction data $\Delta AFD1S$ in accordance with the correction data of Table 6. Thereafter, the process comes out of the present subroutine.

Additionally, when the subject distance L is less than 1 m in step S187, the process shifts to step S189, and an aberration correction amount $g_{4s1}$ is input into the AF correction data $\Delta AFD1S$ in accordance with the correction data of Table 6. Thereafter, the process comes out of the present subroutine.

Table 7 below shows correction data for correcting the defocus correction data for the light source, stored in an adapter storage section 46 in a B-type intermediate adapter 14b in the same manner as in Tables 5, 6.

TABLE 7

| | Subject distance L (focus lens point) | | | |
|---|---|---|---|---|
| | Infinite to 5 m | 5-2 m | 2-1 m | 1-0.5 m |
| Fluorescent lamp | $\alpha_{1f}$ | $\alpha_{2f}$ | $\alpha_{3f}$ | $\alpha_{4f}$ |
| Sunlight | $\alpha_{1s}$ | $\alpha_{2s}$ | $\alpha_{3s}$ | $\alpha_{4s}$ |
| Incandescent lamp | $\alpha_{1i}$ | $\alpha_{2i}$ | $\alpha_{3i}$ | $\alpha_{4i}$ |
| Blue flood lamp | $\alpha_{1b}$ | $\alpha_{2b}$ | $\alpha_{3b}$ | $\alpha_{4b}$ |
| Auxiliary light | $\alpha_{1h}$ | $\alpha_{2h}$ | $\alpha_{3h}$ | $\alpha_{4h}$ |

This focus lens also has, for example, a closest photography distance of 0.5 m, 0.5 m to infinite subject distance is divided into four regions, and defocus correction data is held.

Figure 21A:
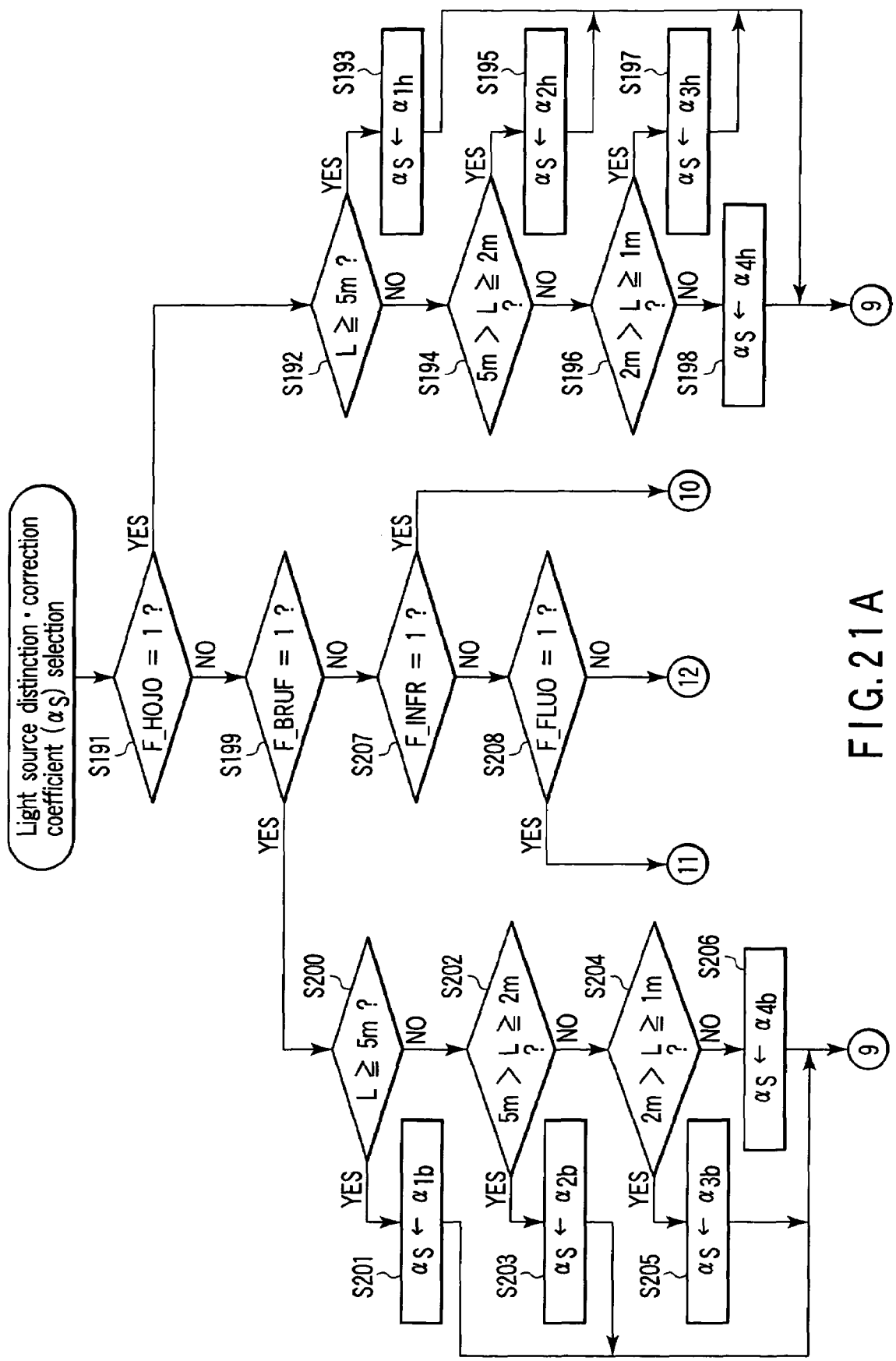
FIGS. 21A and 21B are flowcharts showing an operation of a subroutine "light source distinction•correction coefficient ($\alpha_S$) selection" of step S21 in the flowchart of FIG. 13 in the second embodiment of the present invention.
Figure 21B:
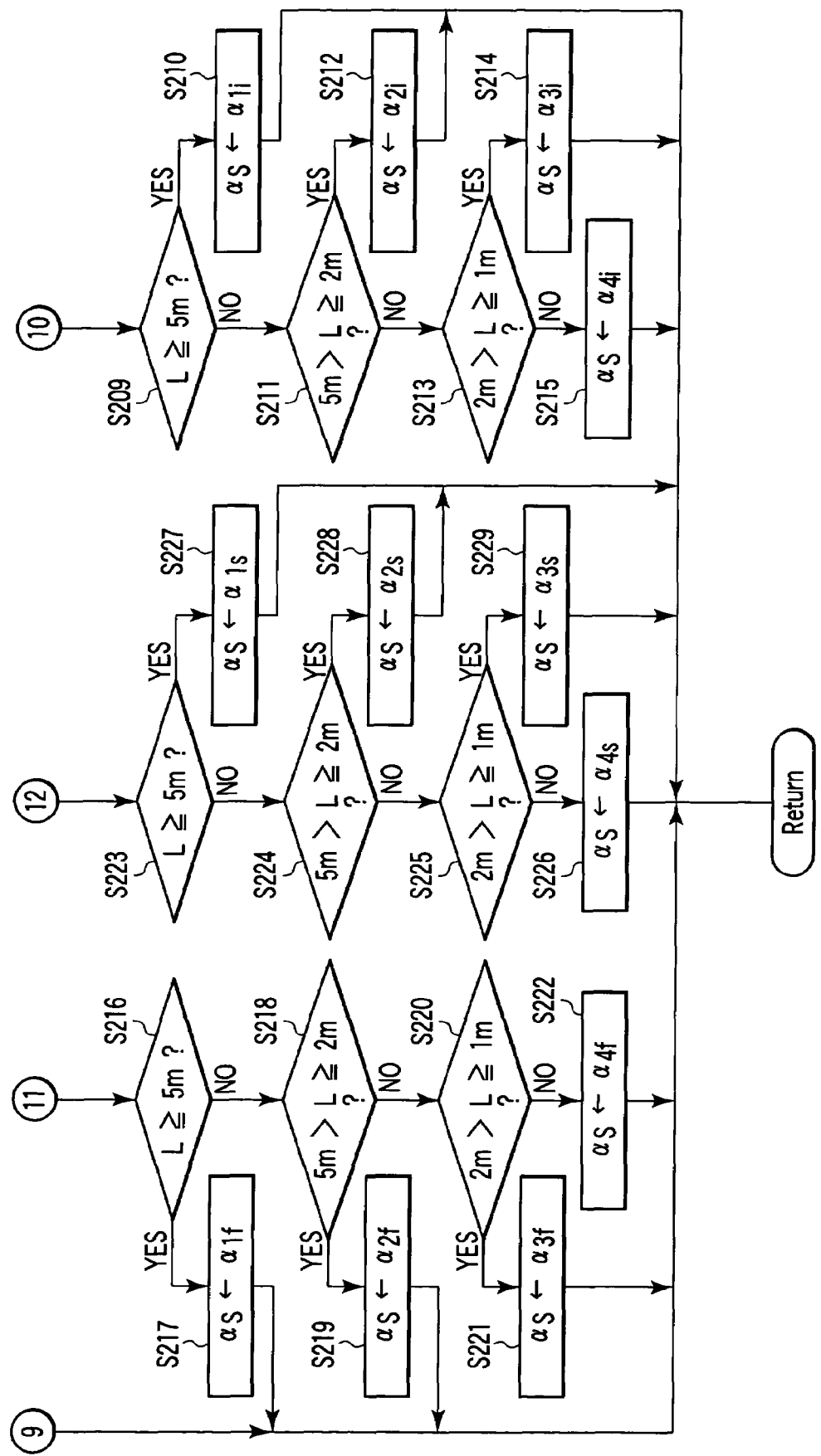

FIGS. 21A and 21B are flowcharts showing an operation of a subroutine "light source distinction•correction coefficient ($\alpha_S$) selection" in which defocus is corrected using the defocus correction data of Table 7 described above in the second embodiment.

This operation will be described hereinafter.

It is to be noted that the focus lens point (=distance) is obtained by communication by the lens CPU 30.

When entering a subroutine "light source distinction•correction coefficient ($\alpha_S$) selection" of step S21 in the flowchart of FIG. 13, first in step S191, flag [F_HOJO] is distinguished. Here, when flag [F_HOJO] is set, the process shifts to step S192 to judge whether or not a subject distance L is 5 m or more. As a result, when the focal length L is 5 m or more, the process shifts to step S193, and data $\alpha_{1h}$ for correction is input into a correction coefficient $\alpha_S$ in accordance with correction data of Table 7 described above. Thereafter, the process returns.

On the other hand, when the subject distance L is less than 5 m in step S192, the process shifts to step S194, and it is judged whether or not the subject distance L is between 2 m and 5 m. Here, when the focal length L is between 2 m and 5 m, the process shifts to step S195, and correction data $\alpha_S$ is input into the correction coefficient $\alpha_S$ in accordance with the correction data of Table 7. Thereafter, the process returns.

Furthermore, when the subject distance L is less than 2 m in step S194, the process shifts to step S196, and it is judged whether or not the subject distance L is between 1 m and 2 m. Here, when the focal length L is between 1 m and 2 m, the process shifts to step S197, and correction data $\alpha_{3h}$ is input into the correction coefficient $\alpha_S$ in accordance with the correction data of Table 7. Thereafter, the process returns.

Additionally, when the subject distance L is less than 1 m in step S196, the process shifts to step S198, and correction data $\alpha_{4h}$ is input into the correction coefficient $\alpha_S$ in accordance with the correction data of Table 7. Thereafter, the process returns.

On the other hand, when the flag [F_HOJO] is not set in step S191, the process shifts to step S199, and it is judged whether or not flag [F_BRUF] has been set. Here, when the flag [F_BRUF] is set, the process shifts to step S200.

It is judged in step S200 whether or not a subject distance L is 5 m or more. As a result, when the focal length L is 5 m or more, the process shifts to step S201, and correction data $\alpha_{1b}$ is input into the correction coefficient $\alpha_S$ in accordance with the correction data of Table 7 described above. Thereafter, the process returns.

On the other hand, when the subject distance L is less than 5 m in step S200, the process shifts to step S202, and it is judged whether or not the subject distance L is between 2 m and 5 m. Here, when the focal length L is between 2 m and 5 m, the process shifts to step S203, and correction data $\alpha_{2b}$ is input into the correction coefficient $\alpha_S$ in accordance with the correction data of Table 7. Thereafter, the process returns.

Furthermore, when the subject distance L is less than 2 m in step S202, the process shifts to step S204, and it is judged whether or not the subject distance L is between 1 m and 2 m. Here, when the focal length L is between 1 m and 2 m, the process shifts to step S205, and correction data $\alpha_{3b}$ is input into the correction coefficient $\alpha_S$ in accordance with the correction data of Table 7. Thereafter, the process returns.

Additionally, when the subject distance L is less than 1 m in step S204, the process shifts to step S206, and correction data $\alpha_{4b}$ is input into the correction coefficient $\alpha_S$ in accordance with the correction data of Table 7. Thereafter, the process returns.

On the other hand, when the flag [F_BRUF] is not set in step S199, the process shifts to step S207, and it is judged whether or not flag [F_INFR] has been set. Here, when the flag [F_INFR] is set, the process shifts to step S209.

It is judged in step S209 whether or not a subject distance L is 5 m or more. As a result, when the focal length L is 5 m or more, the process shifts to step S210, and correction data $\alpha g_{1i}$ is input into the correction coefficient $\alpha_S$ in accordance with the correction data of Table 7 described above. Thereafter, the process returns.

On the other hand, when the subject distance L is less than 5 m in step S209, the process shifts to step S211, and it is judged whether or not the subject distance L is between 2 m and 5 m. Here, when the focal length L is between 2 m and 5 m, the process shifts to step S212, and correction data $\alpha_{2i}$ is input into the correction coefficient $\alpha_S$ in accordance with the correction data of Table 7. Thereafter, the process returns.

Furthermore, when the subject distance L is less than 2 m in step S211, the process shifts to step S213, and it is judged whether or not the subject distance L is between 1 m and 2 m. Here, when the focal length L is between 1 m and 2 m, the process shifts to step S214, and correction data $\alpha_{3i}$ is input into the AF correction data $\alpha_S$ in accordance with the correction data of Table 7. Thereafter, the process returns.

Additionally, when the subject distance L is less than 1 m in step S213, the process shifts to step S215, and correction data $\alpha_{4i}$ is input into the correction data $\Delta AFD0S$ in accordance with the correction data of Table 7. Thereafter, the process returns.

Moreover, when the flag [F_INFR] is not set in step S207, the process shifts to step S208, and it is judged whether or not flag [F_FLUO] has been set. Here, when the flag [F_FLUO] is set, the process shifts to step S216.

It is judged in step S216 whether or not a subject distance L is 5 m or more. As a result, when the focal length L is 5 m or more, the process shifts to step S217, and correction data $\alpha_{1f}$ is input into the AF correction data $\alpha_S$ in accordance with the correction data of Table 7 described above. Thereafter, the process returns.

On the other hand, when the subject distance L is less than 5 m in step S216, the process shifts to step S218, and it is judged whether or not the subject distance L is between 2 m and 5 m. Here, when the focal length L is between 2 m and 5 m, the process shifts to step S219, and correction data $\alpha_{2f}$ is input into the correction coefficient $\alpha_S$ in accordance with the correction data of Table 7. Thereafter, the process returns.

Furthermore, when the subject distance L is less than 2 m in step S218, the process shifts to step S220, and it is judged whether or not the subject distance L is between 1 m and 2 m. Here, when the focal length L is between 1 m and 2 m, the process shifts to step S221, and correction amount data $\alpha_{3f}$ is input into the correction coefficient $\alpha_S$ in accordance with the correction data of Table 7. Thereafter, the process returns.

Additionally, when the subject distance L is less than 1 m in step S220, the process shifts to step S222, and correction data $\alpha_{4f}$ is input into the correction coefficient $\alpha_S$ in accordance with the correction data of Table 7. Thereafter, the process returns.

When the flag [F_FLUO] is not set in step S208, the process shifts to step S223. In this case, since the light source is not any of the auxiliary light, blue flood lamp, incandescent lamp, and fluorescent lamp, the light source is distinguished as the sunlight.

It is judged in step S223 whether or not a subject distance L is 5 m or more. As a result, when the focal length L is 5 m or more, the process shifts to step S224, and correction data $\alpha_{1s}$ is input into the correction coefficient $\alpha_S$ in accordance with the correction data of Table 7 described above. Thereafter, the process returns.

On the other hand, when the subject distance L is less than 5 m in step S224, the process shifts to step S225, and it is judged whether or not the subject distance L is between 2 m and 5 m. Here, when the focal length L is between 2 m and 5 m, the process shifts to step S226, and correction data $\alpha_{2s}$ is input into the correction coefficient $\alpha_S$ in accordance with the correction data of Table 7. Thereafter, the process returns.

Furthermore, when the subject distance L is less than 2 m in step S225, the process shifts to step S227, and it is judged whether or not the subject distance L is between 1 m and 2 m. Here, when the focal length L is between 1 m and 2 m, the process shifts to step S228, and correction data $\alpha_{3s}$ is input into the correction coefficient $\alpha_S$ in accordance with the correction data of Table 7. Thereafter, the process returns.

Additionally, when the subject distance L is less than 1 m in step S227, the process shifts to step S229, and correction data $\alpha_{4s}$ is input into the correction coefficient $\alpha_S$ in accordance with the correction data of Table 7. Thereafter, the process returns.

Thereafter, the process shifts to step S22 of the flowchart of FIG. 13, and accordingly an appropriate correction coefficient is obtained.

Since the defocus is corrected in accordance with the type of the light source by the focus lens point, that is, the distance as described above, higher-precision AF can be performed.

Third Embodiment

Next, a third embodiment of the present invention will be described.

Figure 22:
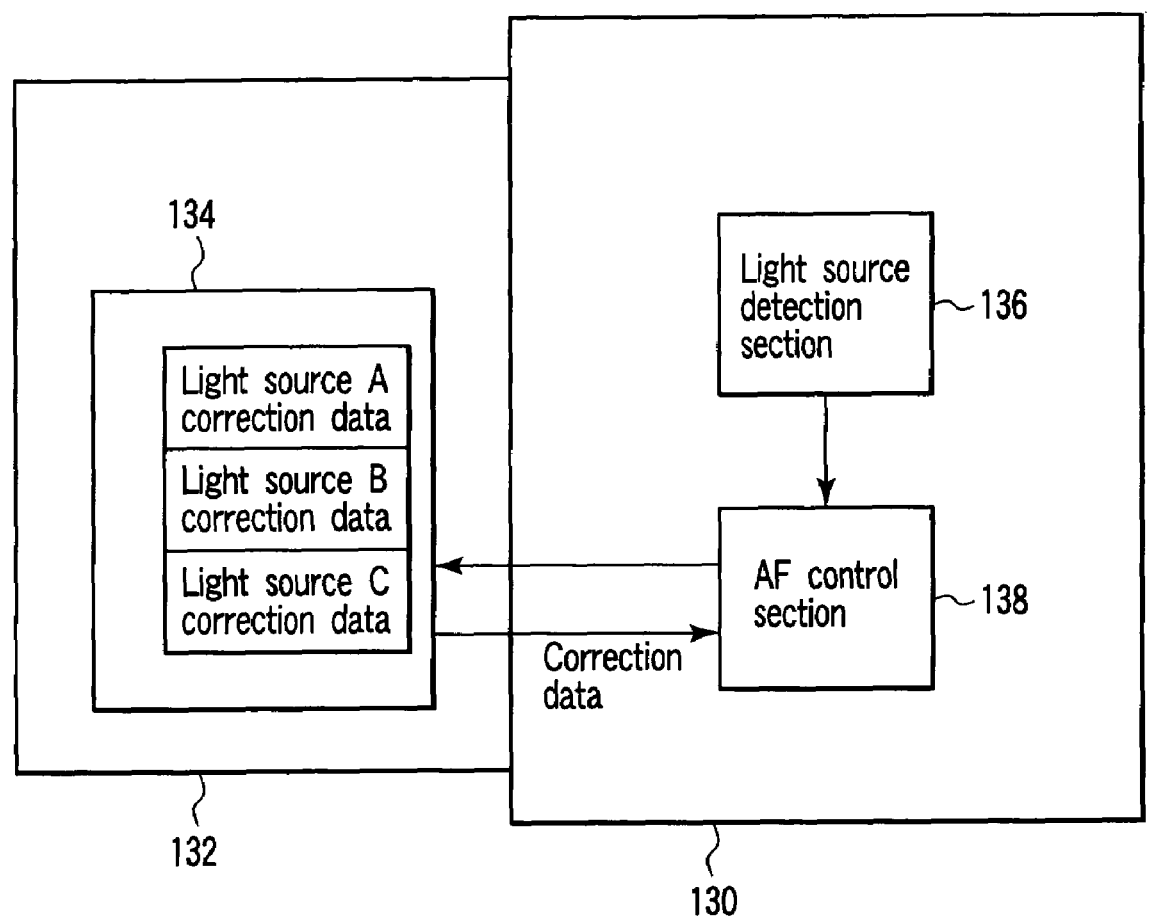
FIG. 22 is a block diagram showing a schematic constitution of a digital camera to which a focus detection device of the present invention is applied.

FIG. 22 is a block diagram showing a schematic constitution of a digital camera to which a focus detection device of the present invention is applied.

In FIG. 22, the present digital camera comprises a camera body 130 and an interchangeable lens 132. The interchangeable lens 132 has a memory 134 which stores a correction value for correcting a defocus in accordance with the type of the light source. On the other hand, the camera body 130 has a light source detection section 136 which outputs a signal in accordance with the light source, and an AF control section 138 which detects focus of the interchangeable lens 132.

When the light source illuminating a subject is detected by the light source detection section 136 in the camera body 130 in this constitution, the signal is output from the light source detection section 136 in accordance with the light source. The correction value for correcting the defocus in accordance with the type of the light source, stored in the memory 134, is read as correction data. In the AF control section 138, the focus is detected based on the signal from the light source detection section 136, and correction data read from the memory 134.

FIG. 23 is a perspective view schematically showing an inner constitution of a partially cut digital camera according to the third embodiment of the present invention.

In FIG. 23, a digital camera 140 of the present embodiment comprises a camera body 142 and a lens barrel 144 which are separately constituted. Moreover, the camera body 142 and the lens barrel 144 are mutually detachably/attachably constituted.

The lens barrel 144 holds an optical photography system 146 constituted of a plurality of photographic lenses, lens driving mechanism and the like in the interior thereof. This optical photography system 146 comprises, for example, a plurality of optical lenses in such a manner that a light beam from a subject is transmitted to thereby form an image of the subject by the subject light beam in a predetermined position (on a photoelectric conversion surface of an imaging element 216 described later). Moreover, the lens barrel 144 is disposed protruding toward the front surface of the camera body 142.

It is to be noted that this lens barrel 144 similar to that generally utilized in a conventional camera or the like is applied. Therefore, description of the detailed constitution is omitted.

The camera is so-called single lens reflex type camera in which the camera body 142 comprises various types of constituting members in the interior thereof, and comprises an optical photography system attaching portion (referred to also as the photographic lens attaching portion) 148 which is a connecting member for detachably attaching the lens barrel 144 holding the optical photography system 146 on the front surface thereof.

That is, an exposure opening having a predetermined aperture capable of guiding the subject light beam into the camera body 142 is formed in a substantial middle portion of the front surface of the camera body 142. An optical photography system attaching portion (not shown) is formed on the peripheral edge portion of the opening for exposure.

The above-described optical photography system attaching portion is disposed on the front surface of the camera body 142 on the side of the outer surface thereof. Moreover, in predetermined positions such as an upper surface portion and a back surface portion, there are disposed various operation members for operating the camera body 142, such as a release button 150 for producing an instruction signal or the like to start a photography operation, and a diffusion plate 90 in which a light source sensor 92 is disposed between a grip portion of the camera body 142 and the lens barrel 144. The diffusion plate 90 is disposed on the side of the optical photography system connecting portion of the camera body 142, and light of the subject to be photographed and peripheral light strike on the plate.

It is to be noted that since the above-described operation members are not directly related to the present invention, to avoid complicated drawing, the drawing and description of the operation members other than the release button 150 are omitted.

As shown in FIG. 23, inside the camera body 142, various types of constituting members are disposed in predetermined positions, such as a plurality of circuit substrates including a finder device 154, a shutter portion 162, an imaging unit 164, and a main circuit substrate 166 (the main circuit substrate 166 only is shown in FIG. 23).

The finder device 154 is disposed in such a manner that a desired subject image formed by the optical photography system 146 is formed in a predetermined position different from that on the photoelectric conversion surface of the imaging element 216 (see FIG. 24), and constitutes a so-called optical observation system.

The finder device 154 comprises a quick return mirror 156, a pentaprism 158, and an eyepiece lens 160.

In the quick return mirror 156, an optical axis of a subject light beam transmitted through the optical photography system 146 is bent and guidable toward the optical observation system. The pentaprism 158 receives the light beam emitted from the quick return mirror 156 to thereby form an erected positive image. The eyepiece lens 160 enlarges the image formed by the pentaprism 158 to thereby form an image having an optimum configuration for observation.

Moreover, the quick return mirror 156 is constituted to be movable between an exposure retreat position retreated from the optical axis of the optical photography system 146 and a predetermined position on the optical axis, and is disposed at a predetermined angle with respect to the optical axis on the optical axis of the optical photography system 146, for example, at an angle of 45 degrees in a usual state. Accordingly, the optical axis of the subject light beam transmitted through the optical photography system 146 is bent by the quick return mirror 156 in a case where the digital camera 140 is in a usual state, and the beam is reflected toward the pentaprism 158 disposed above the quick return mirror 156. That is, this is a finder observation position of the quick return mirror (movable mirror) 156.

On the other hand, during execution of the photography operation of the digital camera 140, in an actual exposure operation, the quick return mirror 156 retreats from the optical axis of the optical photography system 146, and moves to a predetermined position. Accordingly, the subject light beam is guided toward the imaging element 21 to thereby illuminate the photoelectric conversion surface.

The shutter portion 162 controls an irradiation time or the like of the subject light beam onto the photoelectric conversion surface of the imaging element 216, and comprises a shutter mechanism and the like.

The imaging unit 164 comprises an assembly including the shutter portion 162, and the imaging element 216 which obtains an image signal in accordance with the subject image formed based on the subject light beam transmitted through the optical photography system 146.

Moreover, on the main circuit substrate 166, various types of electric members are mounted constituting an electric circuit such as an image signal processing circuit (not shown) which subjects an image signal acquired by the imaging element 216 to various types of signal processing. Furthermore, a flash contact (not shown) is disposed in an upper portion of the camera body 142, an external flash is attachable, and flash light can be emitted with a predetermined light quantity and timing by communication with the external flash.

The shutter portion 162 similar to a portion generally utilized in a conventional camera or the like, such as a shutter mechanism of a focal plane system or a driving circuit which controls the operation of the shutter mechanism is applied. Therefore, description of detailed constitution is omitted.

Figure 24:
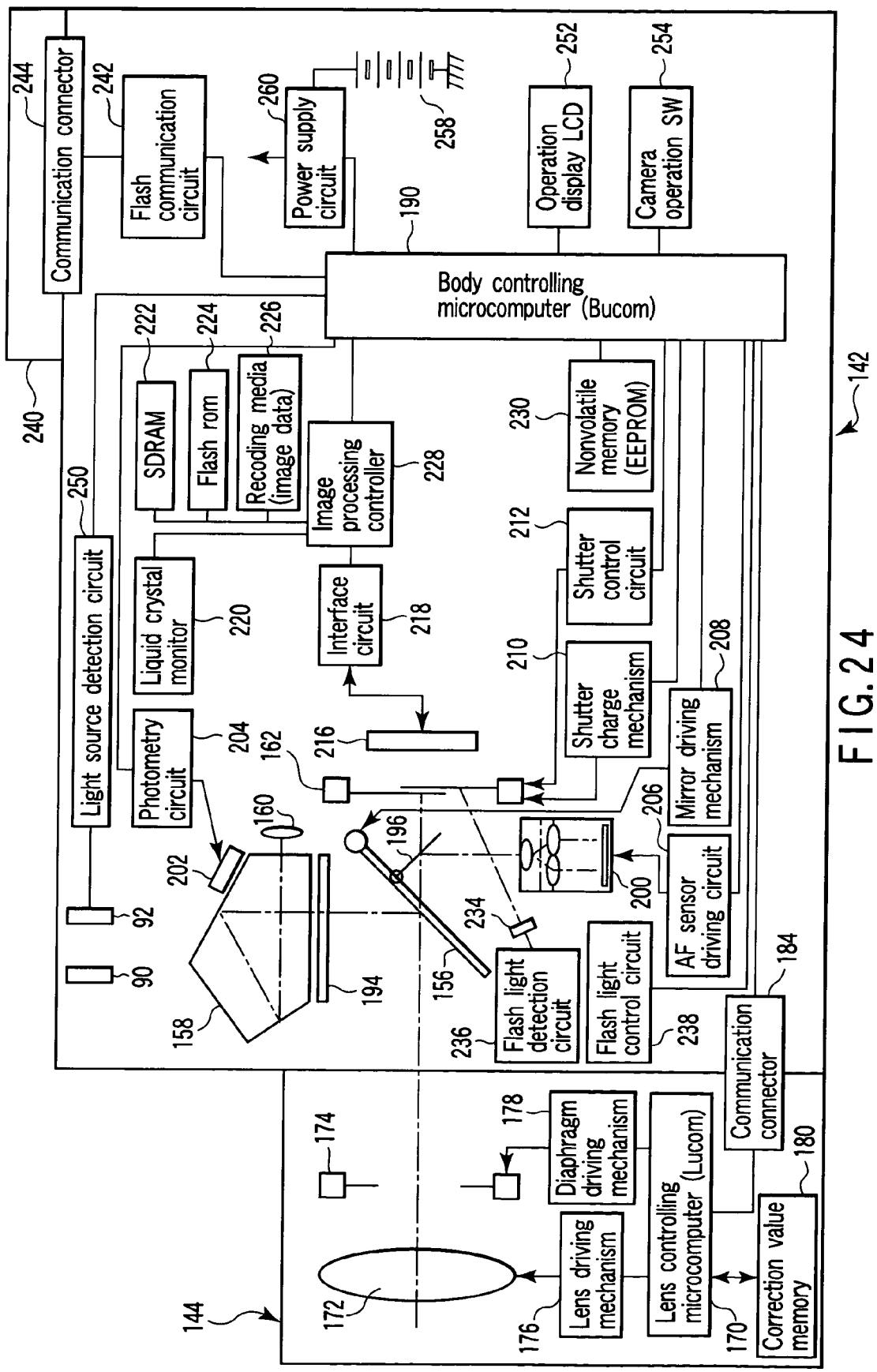
FIG. 24 is a block constitution diagram schematically showing mainly an electric constitution of the digital camera according to the third embodiment.

FIG. 24 is a block constitution diagram schematically showing mainly an electric constitution of the present digital camera.

In FIG. 24, as described above, this digital camera mainly comprises the camera body 142, and the lens barrel 144 which is an interchangeable lens, and the desired lens barrel 144 is detachably attached to the front surface of the camera body 142.

The lens barrel 144 is controlled by a lens controlling microcomputer (hereinafter referred to as L$\mu$com) 170. On the other hand, the camera body 142 is controlled by a body controlling microcomputer (hereinafter referred to as B$\mu$com) 190.

It is to be noted that the L$\mu$com 170 is electrically connected to the B$\mu$com 190 in such a manner as to be communicatable via a communication connector 184 when combined. Moreover, as a camera system, the L$\mu$com 170 cooperates with the B$\mu$com 190 in a dependent manner in the operation.

In the lens barrel 144, a photographic lens 172 and a diaphragm 174 are disposed. The photographic lens 172 is driven by a DC motor (not shown) existing in a lens driving mechanism 176. The diaphragm 174 is driven by a stepping motor (not shown) existing in a diaphragm driving mechanism 178. The L$\mu$com 170 controls these motors in accordance with an instruction of the B$\mu$com 190.

Moreover, in the lens barrel 144, a correction value memory 180 which stores correction data for correcting a defocus amount described later is disposed. The correction data stored in this correction value memory 180 is read by the L$\mu$com 170. Thereafter, the data is transmitted to the B$\mu$com 190 by communication.

On the other hand, in the camera body 142, the following constituting members are disposed as shown.

For example, there are disposed: constituting members (quick return mirror 156, pentaprism 158, eyepiece lens 160, focusing screen 194, sub-mirror 196) of a single lens reflex system which is an optical system; a shutter portion 162 of a focal plane type on the optical axis; and an AF sensor unit 200 which receives the reflected light beam from the sub-mirror 196 to thereby automatically measure distances.

Moreover, in the camera body 142, there are disposed: a photometry circuit 204 which performs a photometry process via a photometry sensor (light detection means) 202 based on the light beam from the pentaprism 158; an AF sensor driving circuit 206 for driving/controlling the AF sensor unit 200; a mirror driving mechanism 208 which drives/controls the quick return mirror 156; a shutter charge mechanism 210 which charges a spring to driving front and back curtains of the shutter portion 162; and a shutter control circuit 212 which controls movements of the front and back curtains.

Moreover, the CCD unit (imaging element) 216 which is imaging means for photoelectrically converting the subject image passed through the optical system is disposed as a photoelectric conversion element on the optical axis.

Furthermore, in the digital camera, there are disposed: a CCD interface circuit 218 connected to the CCD unit 216;

a liquid crystal monitor 220; a SDRAM 222 disposed as a storage region; and an image processing controller (image forming means) 228 which processes an image utilizing a flash ROM 224, recording media 226 and the like. Accordingly, the digital camera is constituted in such a manner as to be capable of providing an electronic imaging function together with an electronic recording display function.

As another storage region, for example, a nonvolatile memory 230 which stores a predetermined control parameter necessary for controlling the camera and which is constituted of an EEPROM is disposed as correction amount storage means in such a manner that the Bµcom 190 is accessible.

Moreover, the photometry sensor 202 is disposed in a position squintly facing the focusing screen 194 above the eyepiece lens 160. The photometry sensor 202 condenses the subject light obtained via the optical photography system 172, quick return mirror 156, focusing screen 194, and pentaprism 158 on the sensor by a lens for photometry to thereby measure brightness.

The photometry sensor 202 comprises a silicon photodiode, and an infrared cut filter is inserted between the sensor and the photometry lens (not shown). A spectral sensitivity of the photometry sensor 202 combined with the optical system is substantially equal to visibility.

Furthermore, a flash photometry sensor 234 for measuring a reflected light quantity with respect to a white or gray shutter curtain is disposed in a position squintly facing the shutter portion 162 (in a position squintly facing the shutter curtain from the side of the camera in a state in which the quick return mirror 156 retreats from a light path). On photography conditions for flash light emission, the diaphragm 174 ends a diaphragm operation, and the quick return mirror 156 retreats from the light path. Thereafter, prior to the photography, the brightness at the time of pre-emission of an external flash device 240 is detected by the flash photometry sensor 234, and an output is supplied to the Bµcom 190 via a flash light detection circuit 236 and a flash light control circuit 238.

The Bµcom 190 obtains a flash emission quantity in accordance with the output, transmits the quantity to the external flash device 240 via a flash communication circuit 242, and controls the flash emission quantity and timing at the time of the photography. The flash photometry sensor 234 also comprises a silicon photodiode, and an infrared cut filter (not shown) is inserted between the flash photometry sensor 234 and the photometry lens (not shown). The spectral sensitivity of the flash photometry sensor 234 combined with the optical system is substantially equal to visibility.

The light source sensor 92 is light source detection means comprising an external light type sensor in the present embodiment, and detects subject light which has not passed through the lens barrel 144 via the diffusion plate 90. As shown in FIGS. 7 and 8, the light source sensor 92 comprises the visible infrared sensor 116 and infrared light sensor 114. Because of a constitution in which the subject light enters the sensor via the diffusion plate 90, the sensors have the same view field, and a large field angle is held.

The visible infrared sensor 116 technically has visible and near-infrared spectral sensitivities, but an infrared cut filter (not shown) is inserted between the visible light sensor 116 and the diffusion plate 90, and finally only visible light is received. The light source sensor 92 compresses a light current in accordance with the sensor having each spectral sensitivity, converts the current into a voltage, and outputs the voltage. The output of the light source detection sensor is analog-to-digital converted by a light source detection circuit 250, and the brightness of a whole subject region is detectable in accordance with the spectral sensitivity of each sensor.

Moreover, the Bµcom 190 is provided with an operation displaying LCD 252 for notifying a user of an operative state of the camera by a display output, a camera operation switch (SW) 254, and the flash communication circuit 242. The camera operation switch 254 comprises a switch group including operation buttons necessary for operating the camera, such as a release switch, mode change switch, photometry mode change switch, and power switch.

The flash communication circuit 242 receives a signal based on the flash emission quantity obtained by the above-described flash photometry sensor 234 and calculated by the Bµcom 190. Moreover, a signal is output to the flash device 240 via a communication connector 244, and the flash device 240 emits a predetermined light quantity.

Furthermore, in the camera body 142, a battery 258 which is a power supply, and a power supply circuit 260 which converts a voltage of the power supply into a voltage required by each circuit unit constituting the digital camera to thereby supply the voltage are disposed.

Each section of the digital camera constituted as described above operates as follows.

The CCD interface circuit 218 is controlled by the image processing controller 228 following the instruction of the Bµcom 190, and image data is taken from the CCD unit 216. The image data is converted into a video signal by the image processing controller 228, and output/displayed in the liquid crystal monitor 220. The user can confirm a photographed image from the displayed image of the liquid crystal monitor 220.

The SDRAM 222 is a memory for temporarily storing the image data, and is used in a work area in converting the image data. The image data is set in such a manner as to be converted into JPEG data, and thereafter stored in the recording media 226.

The mirror driving mechanism 208 is a driving mechanism with respect to an up-position and a down-position of the quick return mirror 156. When the quick return mirror 156 is in the down-position, the light beam from the photographic lens 172 is split and guided toward the AF sensor unit 200 and the pentaprism 158.

The output from the AF sensor in the AF sensor unit 200 is transmitted to the Bµcom 190 from the AF sensor driving circuit 206, and a known distance measuring process is performed.

Here, distance measurement results are influenced by the AF sensor unit 200 depending on the type of the light source which illuminates the subject.

A wavelength characteristic for each light source is shown in FIG. 3, and a state in which an interval between two images formed by the light receiving section of the AF sensor unit 200 is shifted is shown in FIG. 4.

Moreover, as described above, if there is a shift in the focused position by the illuminative light source, a so-called out-of-focus picture is produced. Therefore, in the present invention, the type of the light source is distinguished by the light source sensor 92, and accordingly the shift is corrected using the correction value of the correction value memory 180 in the lens barrel 144.

The user can visually check the subject from the eyepiece lens 160 adjacent to the pentaprism 158. On the other hand, a part of the light beam which has passed through the pentaprism 158 is guided into the photometry sensor 202, and the known photometry process is performed based on a light quantity detected here.

The photometry sensor 202 compresses a light current, and converts the current into a voltage in accordance with each photometry pattern to thereby output the voltage. The output of the photometry sensor 202 is analog-to-digital converted by the photometry circuit 204, and subject luminance is detectable in accordance with each pattern.

Moreover, exposure values(shutter speed, diaphragm, ISO sensitivity) are determined based on photometry results by finder photometry.

This digital camera has a plurality of photometry modes (P; program mode, A; aperture-priority mode, S; shutter-speed-priority mode, M; manual mode), and the exposure value is calculated and determined in accordance with the photography mode selected by a photographer. Moreover, shutter speed control, diaphragm control, and sensitivity control are performed based on the determined exposure value.

Moreover, here, the emission is possible in a state in which the subject luminance is dark and the external flash device 240 is connected. In this case, the Bμcom 190 judges that flash emission is necessary, and flash emission control is performed.

The shutter speed is produced by a focal plane shutter of the shutter portion 162. The speed is 1/180 seconds at the time of flash emission of the flash device 240.

The diaphragm 174 is disposed in the lens barrel 144, and the diaphragm is driven following an instruction from the lens by communication between the Bμcom 190 and the Lμcom 170.

The sensitivity is controlled by the interface circuit 218, when an analog gain is applied to output data of the CCD unit 216.

Moreover, the emission quantity of the flash device 240 is measured by the flash photometry sensor 234.

As described above, the flash photometry sensor 234 is disposed in such a manner as to measure the reflected light of the white or gray shutter curtain in a position squintly facing the shutter portion 162. When the quick return mirror 156 is moved up, the flash photometry sensor 234 measures the light obtained by pre-emission of the flash device 240 and reflected by the shutter curtain. The Bμcom 190 calculates the emission quantity from the measured light quantity, and communicates with the flash device 240 via the flash communication circuit 242. Accordingly, the light quantity is reflected in the emission of the flash device 240 at the photography time.

A principle for detecting the type of the light source is described above with reference to FIGS. 5 and 6.

Furthermore, since the arrangement and constitution of the light source sensor 92 have been described with reference to FIGS. 7 and 8, the description is omitted here.

Next, an operation of the camera constituted in this manner will be described. It is to be noted that various operations described hereinafter are controlled by the Bμcom 190.

Figure 25:
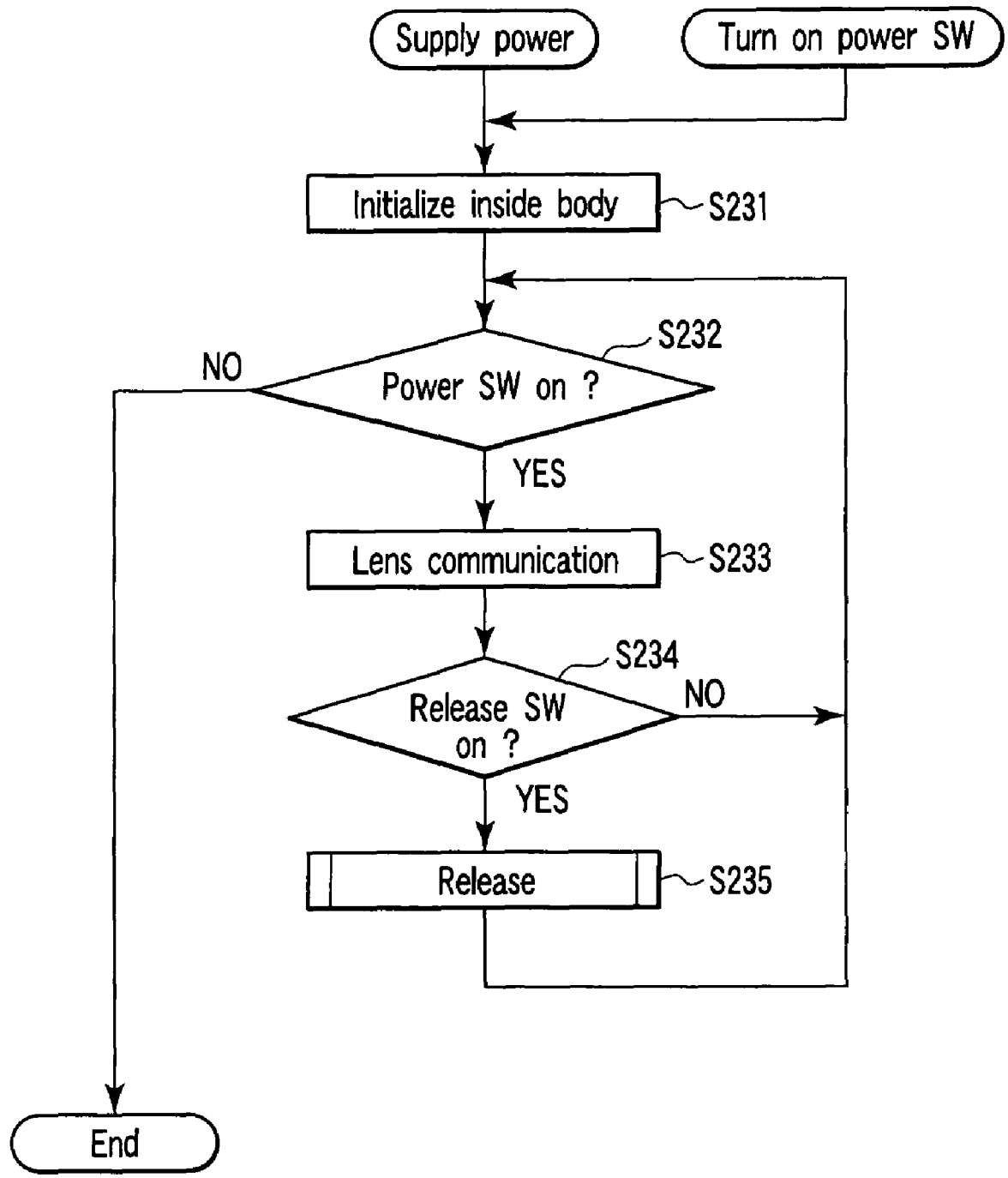
FIG. 25 is a flowchart showing an operation in charging a battery in a camera main body, supplying power of an analog-to-digital adapter, or turning on a power switch.

First, an operation in charging a battery in a camera main body, supplying power of an analog-to-digital adapter, or turning on a power switch will be described with reference to a flowchart of FIG. 25.

First, in step S231, in the camera body 142, the whole circuit is initialized by the Bμcom 190. Next, in step S232, a state of a power switch (SW) is judged. Here, when the power switch is off, the operation of the camera ends. On the other hand, when the power switch is on, the process shifts to step S233. The communication is performed between the Bμcom 190 and the Lμcom 170, and the initialization in the lens barrel 144, or transmission/reception of various data such as defocus correction data of the correction value memory 180 in the lens barrel 144 and focal length information of the length is performed.

Subsequently, the state of a release switch (SW) is judged in step S234. Here, when the release switch is off, the process shifts to step S232, and the state of the power switch is judged again. On the other hand, when the release switch is on, the process shifts to step S235, and a subroutine "release" is executed. Thereafter, the process shifts to step S232.

Figure 26:
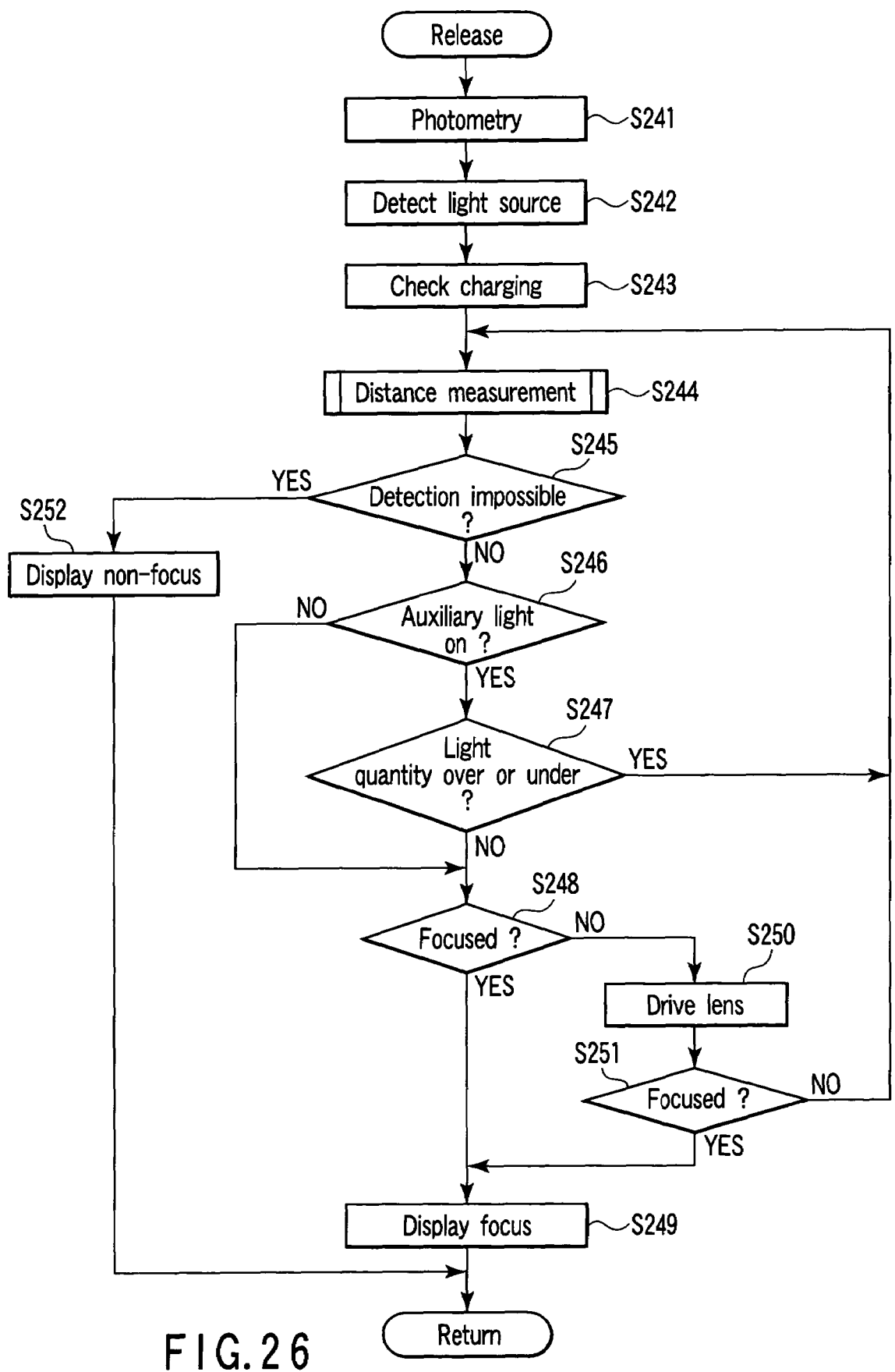
FIG. 26 is a flowchart showing an operation of a subroutine "release" performed in performing photography among functions of the camera of the third embodiment.

FIG. 26 is a flowchart showing an operation of the subroutine "release" performed in performing photography among functions of the camera of the third embodiment.

In an on-state of a power supply of the present camera, and in a photography preparation state capable of performing the photography operation, an operation member interlocking with a first release switch in the camera operation switch 254 is operated by the user. Then, a predetermined instruction signal (first release signal) is produced in response to the operation. Accordingly, the subroutine of the release operation of FIG. 26 is called, and the sequence is started.

First, in step S241, the first release signal is received by the Bμcom 190, the photometry sensor 202 is driven/controlled via the photometry circuit 204, and the photometry is performed. Accordingly, photometry data which is a photometry result is acquired. Next, in step S242, the light source is similarly detected by the light source detection circuit 250, and light source detection data which is the result is acquired by the Bμcom 190. The light source detection data acquired in this manner is stored in a predetermined region (BVA, BVB) of a RAM (not shown) contained in the Bμcom 190.

Subsequently, in step S243, a state of charge voltage of a flash capacitor (not shown) included in the flash device 240 is confirmed by the Bμcom 190, and it is judged whether or not the charging is performed to such an extent that a flash emission operation is performable (process of charging check). In the process of the charging check, when the sequence of the distance measurement operation of step S244, and the subject has the low luminance, the auxiliary light needs to be applied to the subject using a flash light emitting device including the flash device 240, and therefore the voltage of the flash capacitor is checked beforehand in this stage.

It is to be noted that judgment as to whether or not the subject has the low luminance at the distance measurement operation time, and judgment as to whether or not the auxiliary light needs to be applied at the distance measurement operation time are performed based on the photometry result in the above-described step S242.

In step S244, the focus detection device is driven/controlled by the Bμcom 190, and a sequence of a subroutine "distance measurement operation" is executed. It is to be noted that details of this subroutine "distance measurement operation" will be described later. Subsequently, in step S245, the distance measurement result of the distance measurement operation of step S244 is referred to, and it is judged whether or not the detection of a focal point is impossible.

Here, when the detection of the focal point is impossible, the process shifts to step S252. In this step S252, a process of non-focus display is executed in which display indicating that it has been impossible to detect the focal point is performed using a predetermined information display device (not shown) or the like. Therefore, the sequence of the present release process ends.

On the other hand, when it is confirmed that the focal point has been detected as a result of the distance measurement operation of step S244 in step S245, the process shifts to step S246. In step S246, it is confirmed whether or not the auxiliary light has been emitted using the flash light emitting device at the distance measurement operation time in step S244 (see the flowchart of FIG. 27 described later). Here, when it is judged that the auxiliary light has been emitted at the distance measurement operation time, the process shifts to step S247. When it is judged that the auxiliary light is not emitted, the process shifts to step S248.

In step S247, it is judged whether or not light quantity excess (over) or shortage (under) has occurred as compared with an appropriate exposure quantity by the emission of the auxiliary light at the distance measurement operation time. Here, when the light quantity over or under is judged, it is considered that the distance measurement result by the distance measurement operation executed under this situation has no reliability. Therefore, in this case, the process shifts to step S244, the quantity of the auxiliary light is changed in the subsequent process, and the distance measurement operation is similarly executed again.

It is to be noted that a predetermined operation such as light quantity adjustment of the auxiliary light at the distance measurement operation time has been described in detail in Jpn. Pat. Appln. KOKAI Publication No. 6-289281 by the present applicant. Even in the camera of the present embodiment, it is assumed that the auxiliary light is applied by means which have heretofore been used at the distance measurement operation time. Therefore, the detailed description is omitted in the present embodiment.

Next, it is judged in step S248 whether or not the subject image formed by the moved photographic lens is in a focused state based on the distance measurement result by the distance measurement operation. Here, when the focused state is judged, the process shifts to step S249. When it is judged that the image is not in the focused state, the process shifts to step S250.

In step S249, the image is in the focused state. Therefore, by the Bµcom 190, information indicating the focused state is notified to the user using a display•alarming device or the like (not shown) such as finder LED display or buzzer sounding (process of focus display). Thereafter, the present routine ends (return).

On the other hand, in step S250, the image is a non-focused state. Therefore, a predetermined length driving process is executed. In this case, the distance measurement result of step S244 is transmitted to the Lµcom 170 in the lens barrel 144. The photographic lens is driven/controlled by the Lµcom 170 in such a manner that the lens is moved to a predetermined position based on the distance measurement result.

Moreover, in step S251, as a result of the lens driving process of step S250, it is judged by the Bµcom 190 whether or not the focused state has been obtained. Here, when the focused state is judged, the process shifts to step S249. Moreover, after the focus display process is executed in step S249, a series of operation ends (return). When it is judged in step S251 that the image is still in the non-focused state, the process shifts to step S244, and the similar distance measurement operation is repeated again.

Next, an operation of a subroutine "distance measurement" in step S244 of the flowchart of FIG. 26 will be described with reference to a flowchart of FIG. 27.

When the sequence of the subroutine "distance measurement" is executed in step S244 of the flowchart of FIG. 26 as described above, first in step S261, integration is executed. It is to be noted that the integration operation at the distance measurement operation time has also heretofore been described in the Jpn. Pat. Appln. KOKAI Publication No. 6-289281. Therefore, the detailed description is omitted here.

Next, in step S262, distance measurement data which is a distance measurement result is read from the AF sensor unit 200 by the Bµcom 190. Subsequently, in step S263, photometry data is calculated by a predetermined calculation process based on sensor data red from the AF sensor unit 200 by the process of step S262. The photometry data is stored in a predetermined region (BVAF) of the RAM (not shown) in the Bµcom 190.

It is to be noted that the predetermined photometry calculation executed here is assumed to follow means described in the Jpn. Pat. Appln. KOKAI Publication No. 6-289281.

Next, in step S264, predetermined processes are performed such as judgment as to whether or not auxiliary light needs to be applied to a subject, and setting of an emission quantity of the auxiliary light in this case using the flash light emitting device in a case where the light quantity is short for a reason such as low luminance environment at the integration operation time of the AF sensor unit 200 in the process of step S261.

It is judged in step S265 whether or not the detection of the distance measurement result by the distance measurement operation is impossible. As a result, when the detection is judged to be impossible, the process shifts to step S280. In this step S280, after a non-focus flag is set, the sequence of a series of distance measurement operation ends, and returns to the predetermined process of the flowchart of FIG. 26 (return).

On the other hand, when the distance measurement result is detected in step S265, the process shifts to step S266. Moreover, it is judged in this step S266 whether or not the light quantity is excessive as a result of the irradiation of the auxiliary light by the flash light emitting device (flash device 240) and integration. Here, when it is judged that the light quantity is excessive, the sequence of a series of the distance measurement operation ends and returns to the predetermined process of the flowchart of FIG. 26 (return). Moreover, the distance measurement operation is performed again by a predetermined procedure.

When it is judged in step S266 that the light quantity is not excessive, the process shifts to step S267, and a process of illuminance distribution correction is executed. The illuminance distribution correction process is a process for correcting a sensitivity deviation of sensor data. Subsequently, in step S268, a process of correlation calculation is executed. Accordingly, a so-called two-image interval is detected.

It is to be noted that since details of the process of the correlation calculation has been described in the Jpn. Pat. Appln. KOKAI Publication No. 6-289281, it is assumed even in the present embodiment that the correlation calculation process is executed following the conventional means.

In step S269, the result of the correlation calculation process in step S268 is judged. Here, when it is judged that the process has correlation, the process shifts to step S270. When it is judged that there is not any correlation, the process shifts to step S277.

In step S270, a calculation process of an image shift amount is executed. Subsequently, in step S271, a shift amount of an image forming position with respect to the imaging element surface on the optical axis, that is, a defocus amount is calculated from the image shift amount calculated by the process of step S270.

Next, in step S272, a process (see a flowchart of FIG. 29; described later) of a subroutine "light source judgment" is executed based on the detection result (by the light source detection of step S242 of the flowchart of FIG. 26) by the light source sensor 92. It is to be noted that detailed operation of this subroutine "light source judgment" will be described later.

In step S273, based on the result of the process of the subroutine "light source judgment" in the process of step S272, a process of a subroutine "defocus correction" (see a flowchart of FIG. 28) is executed. It is to be noted that after the process of this subroutine "defocus correction", the process shifts to step S274.

It is judged in step S274 whether or not the calculated defocus amount is within a range of a focus depth, that is, whether or not the amount is in a focus allowable range. Here, when the amount is judged to be in the focus allowable range, the process shifts to step S276. When it is judged that the amount is not in the focus allowable range, the process shifts to step S275.

In step S275, the corrected defocus amount is transmitted to the Lμcom 170 by the Bμcom 190. Thereafter, the sequence of a series of distance measurement operation ends, and returns to the predetermined process of the flowchart of FIG. 26 (return). Moreover, the distance measurement operation is performed again by the predetermined procedure.

On the other hand, in step S276, a focus flag is set, and thereafter the sequence of a series of distance measurement operation ends. Accordingly, the process similarly returns to the predetermined process of the flowchart of FIG. 26 (return). Moreover, the distance measurement operation is performed again by the predetermined procedure.

When it is judged in step S269 that the result of the correlation calculation does not have correlation, the process shifts to step S277, and it is judged whether or not illumination by the auxiliary light has been performed at a sensor integration operation time. Here, when it is judged that the illumination of the auxiliary light has been performed, the process shifts to step S278. When it is judged that the illumination of the auxiliary light has not been performed, the process shifts to step S280.

In step S278, the auxiliary light quantity is increased to thereby execute an illumination process. Moreover, it is judged in step S279 whether or not the detection of the distance measurement result is impossible. Here, when it is judged that any improvement is not seen in the distance measurement result regardless of the increase of the auxiliary light quantity, the process shifts to step S280, and a non-focus flag is set. Thereafter, the sequence of a series of the distance measurement operation ends, and returns to the predetermined process of the flowchart of FIG. 27 (return).

On the other hand, when it is judged in step S279 that the improvement is seen in the distance measurement result by the increase of the auxiliary light quantity, that is, when the distance measurement result is detected, the sequence of a series of the distance measurement operation ends, and returns to the predetermined process of the flowchart of FIG. 26 (return).

It is to be noted that in step S264, the auxiliary light is used, and the distance measurement operation is performed. In this case, an auxiliary light flag (F_HOJO) is set. When any auxiliary light is not used, the auxiliary light flag is cleared.

Figure 27:
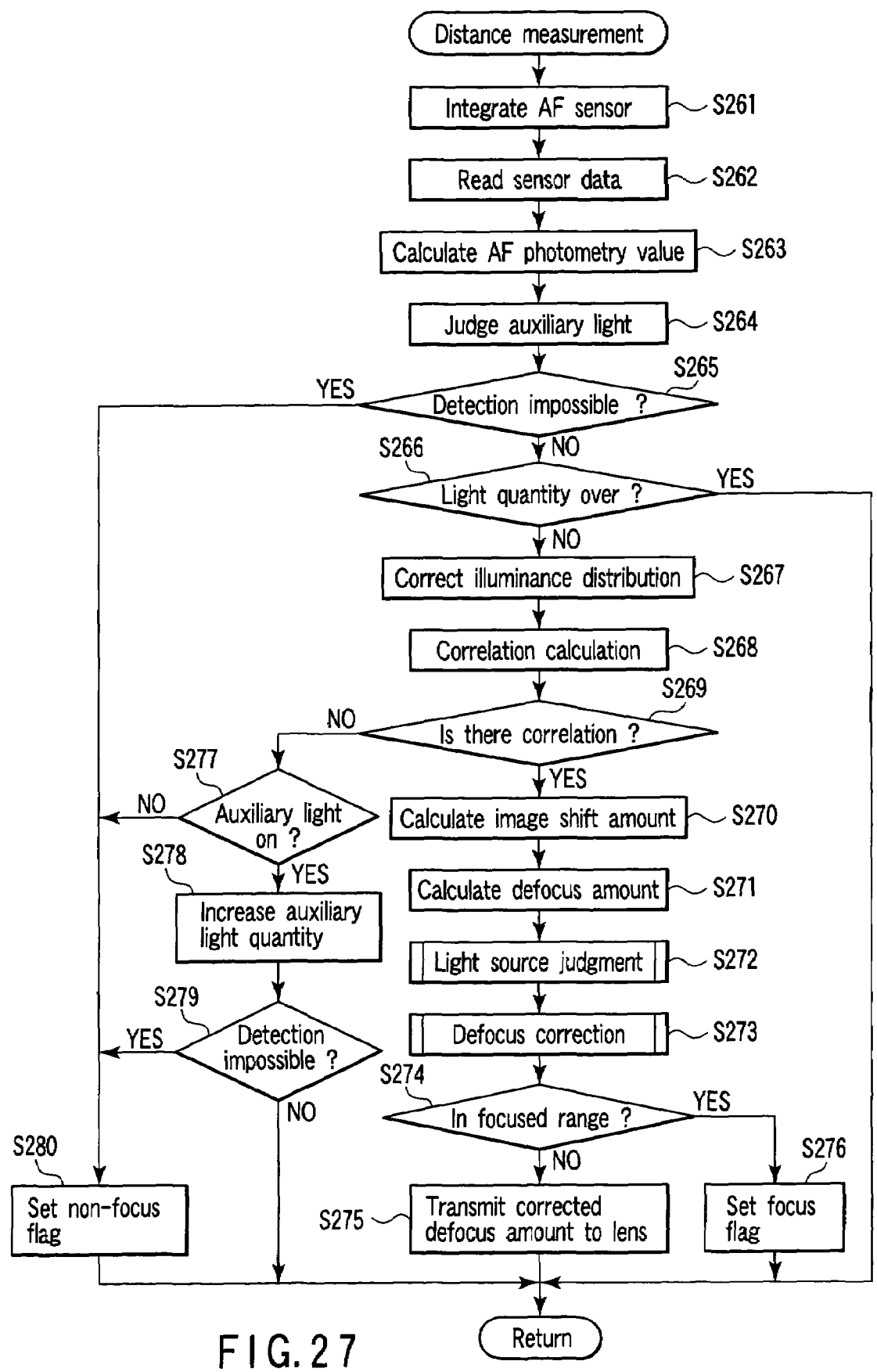
FIG. 27 is a flowchart showing an operation of a subroutine "distance measurement" in step S244 of the flowchart of FIG. 26.
Figure 28:
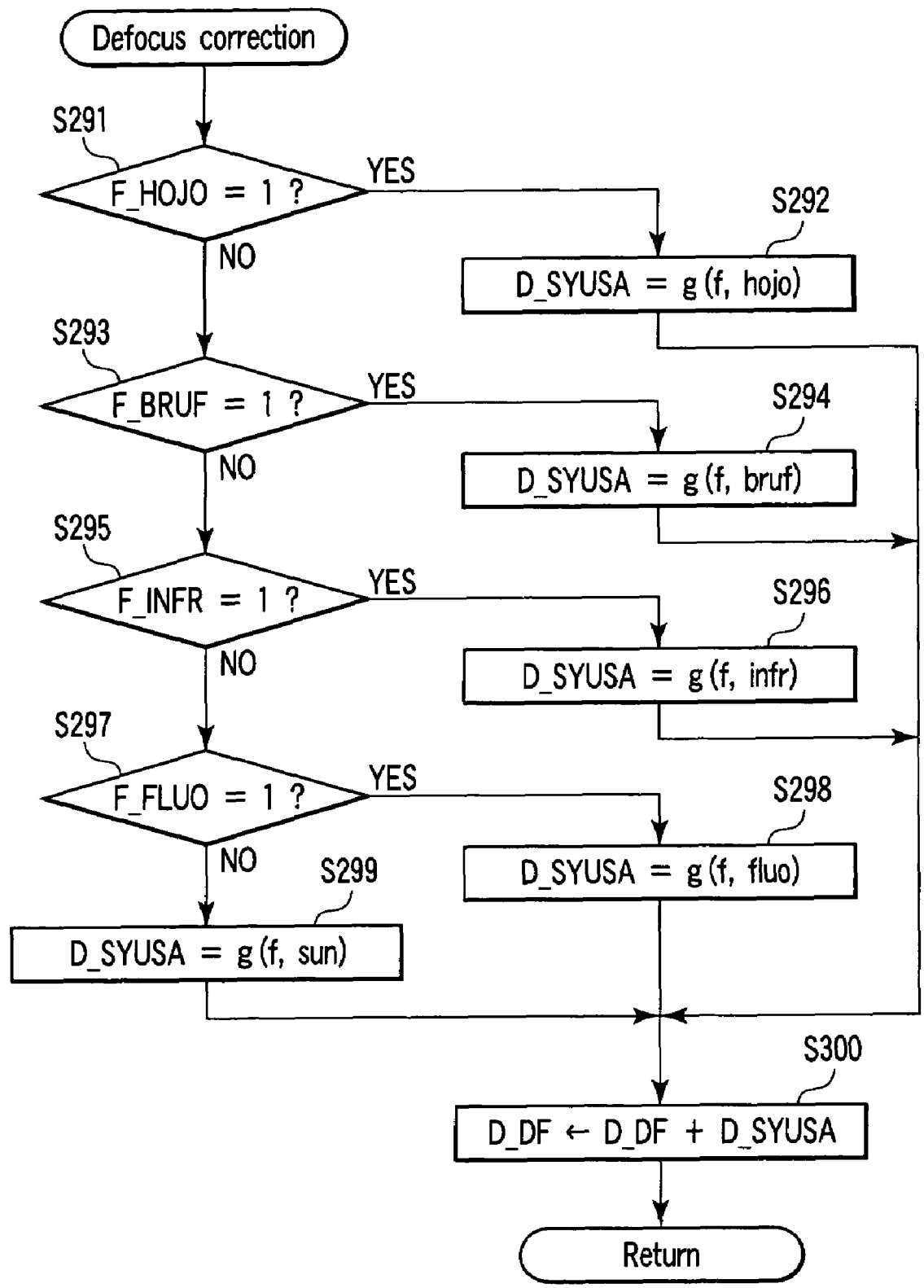
FIG. 28 is a flowchart showing a sequence of a subroutine "defocus correction" in step S273 of the flowchart of FIG. 27.

FIG. 28 is a flowchart showing a sequence of a subroutine "defocus correction" in step S273 of the flowchart of FIG. 27.

When entering the present routine, first in step S291, it is judged referring to the flag [F_HOJO] whether or not the distance has been measured using the auxiliary light by the flash device 240. Here, when the flag [F_HOJO] is set, the process shifts to step S292, and values of a spherical aberration amount [f] of the photographic lens and a chromatic aberration amount [hojo] generated by the auxiliary light, which are values determined by a function g that differs for each focal length described later, are stored in a memory [D_SYUSA] which stores an aberration correction amount.

Here, the function g is determined by the characteristic of the photographic lens, and stored in the correction value memory 180 in the interchangeable lens unit 12.

Table 8 shows defocus correction data stored beforehand in the correction value memory 180.

TABLE 8

| Focal length | Fun. | Sphe. abe. amount | Chromatic aberration amount | | | | |
| | | | Fluo. lamp | Day-light | Incan. lamp | Blue flood lamp | Aux. light |
|---|---|---|---|---|---|---|---|
| 1 | $g_1$ | $f_1$ | $fluo_1$ | $sun_1$ | $infr_1$ | $bruf_1$ | $hojo_1$ |
| 2 | $g_2$ | $f_2$ | $fluo_2$ | $sun_2$ | $infr_2$ | $bruf_2$ | $hojo_2$ |
| 3 | $g_3$ | $f_3$ | $fluo_3$ | $sun_3$ | $infr_3$ | $bruf_3$ | $hojo_3$ |
| . | . | . | . | . | . | . | . |
| . | . | . | . | . | . | . | . |
| n | $g_n$ | $f_n$ | $fluo_n$ | $sun_n$ | $infr_n$ | $bruf_n$ | $hojo_n$ |

Functions $g_n$, spherical aberration correction amounts $f_n$, and chromatic aberration correction amounts $fluo_n$ for a fluorescent lamp, $sun_n$ for daylight, $infr_n$ for an incandescent lamp, $bruf_n$ for a blue flood lamp, and $hojo_n$ for auxiliary light are stored corresponding to focal lengths of the photographic lens 172. These data are stored in a memory in the camera body 142, for example, the SDRAM 222 by communication between the Bμcom 190 and the Lμcom 170.

The focal length of the photographic lens 172 is also judged by the Bμcom 190 by the communication, and the function $g_n$ and spherical aberration amount $f_n$ are selected. The chromatic aberration amount is selected in accordance with light source judgment result, and the aberration correction amount D_SYUSA is prepared.

When the flag [F_HOJO] is not set in step S291, the process shifts to step S293.

In step S293, the result of the light source judgment process (step S272 of the flowchart of FIG. 26 or 27) is referred to, and it is confirmed whether or not the light source illuminating the subject is a blue flood lamp. That is, it is confirmed whether or not the flag [F_BRUF] has been set.

Here, when the flag [F_BRUF] is set, and the blue flood lamp is confirmed, the process shifts to step S294. In step S294, values of the spherical aberration amount [f] of the photographic lens and the chromatic aberration amount [bruf] generated by the blue flood lamp, determined by the function g which differs with each focal length, are stored in the memory [D_SYUSA] which stores the aberration correction amount. Here, the function g is determined by the characteristic of the photographic lens. Thereafter, the process shifts to step S300 described later.

On the other hand, when it is judged in step S293 that the light source is not the blue flood lamp, the process shifts to step S295. In this step S295, the result of the light source judgment process is referred to, and it is confirmed whether or not the light source illuminating the subject is an incandescent lamp. That is, it is confirmed whether or not flag [F_INFR] has been set.

Here, when the flag [F_INFR] is set, and the incandescent lamp is confirmed, the process shifts to step S296. Moreover, in this step S296, the values of the spherical aberration amount [f] of the photographic lens and the chromatic aberration amount [infr] generated by the incandescent lamp, determined by the function g which differs with each focal length, are stored in the memory [D_SYUSA] which stores the aberration correction amount. Thereafter, the process shifts to step S300 described later.

Moreover, when it is judged in step S295 that the light source is not the incandescent lamp, the process shifts to step S297. In this step S297, the result of the light source judgment process is referred to, and it is confirmed whether or not the light source illuminating the subject is a fluorescent lamp. That is, it is confirmed whether or not flag [F_FLUO] has been set.

Here, when the flag [F_FLUO] is set, and the fluorescent lamp is identified, the process shifts to step S298. Moreover, in this step S298, the values of the spherical aberration amount [f] of the photographic lens and the chromatic aberration amount [fluo] generated by the fluorescent lamp, determined by the function g which differs with each focal length, are stored in the memory [D_SYUSA] which stores the aberration correction amount. Thereafter, the process shifts to step S300 described later.

On the other hand, when it is judged in step S297 that the light source is not the fluorescent lamp, the light source illuminating the subject is not any of the incandescent lamp, fluorescent lamp, and blue flood lamp. Therefore, the light source is sunlight (daylight). Therefore, the values of the spherical aberration amount [f] of the photographic lens and the chromatic aberration amount [sun] generated by the daylight, determined by the function g which differs with each focal length, are stored in the memory [D_SYUSA] which stores the aberration correction amount. Thereafter, the process shifts to step S300 described later.

Moreover, in step S300, the data stored in the memory [D_SYUSA] is added to a memory [D_DF]. Thereafter, a series of defocus correction process ends (return).

Thus, the Bµcom 190 also has a function of correcting various information on the calculated focused position as a result of a predetermined calculation process. Moreover, the corrected information is output to the Lµcom 170. Accordingly, the photographic lens 172 is moved by a predetermined lens driving amount.

Figure 29:
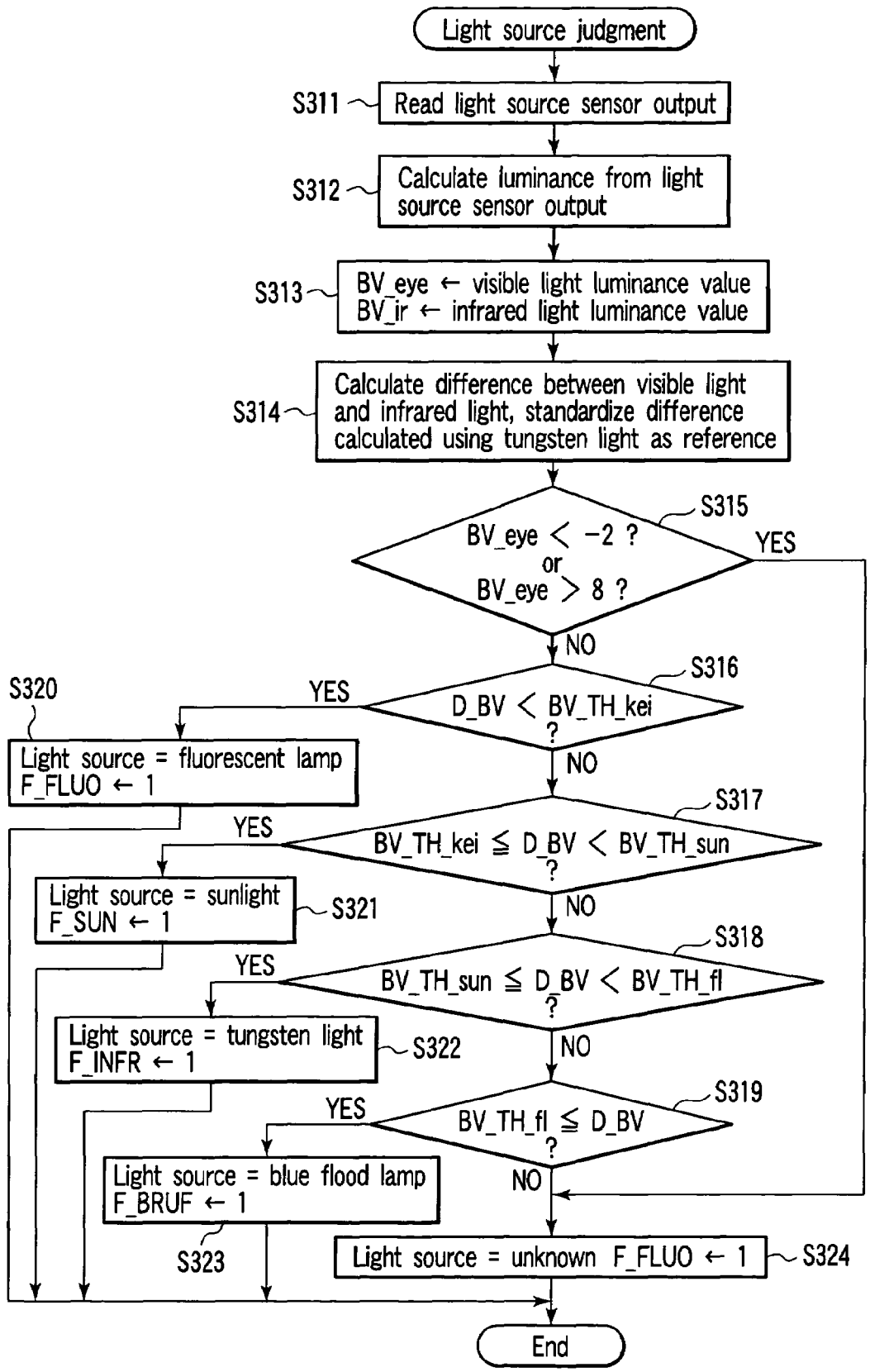
FIG. 29 is a flowchart showing a detailed operation of a subroutine "light source distinction" of step S272 in the flowchart of FIG. 27.

A detailed operation of a subroutine "light source judgment" of step S272 in the flowchart of FIG. 27 will be described with reference to a flowchart of FIG. 29.

When entering this routine, in step S311, first, flags F_FLUO, F_SUN, F_INFR, F_BRUF indicating types of light sources are cleared, and an output of the light source sensor 92 is read. Next, in step S312, the luminance of the light source is calculated from the output of the light source sensor 92. Furthermore, in step S313, luminance values of visible light and infrared light are calculated.

In step S314, a difference between the visible light (BV_eye) and the infrared light (BV_ir) is calculated in accordance with the following equation:

$$D\_BV \leftarrow BV\_ir - BV\_eye;$$

$$D\_BV \leftarrow D\_BV - DBV\_REF,$$

where DBV_REF is a luminance difference between the visible light and the infrared light at the time of irradiation of reference tungsten light (incandescent lamp). This difference is obtained as a value which differs with individual cameras, and stored as an adjusted value in the Bµcom 190. Thus, the difference calculated using the tungsten light (incandescent lamp) as a reference is standardized.

Next, it is judged in step S315 whether or not the above-described luminance value of the visible light is a usable value. This is because light source detection precision of the light source sensor deteriorates in a case where the luminance is excessively bright or dark, and therefore an output of light source detection is not very reliable. In this case, it is judged in step S315 whether the luminance value of the visible light is smaller than −2 or larger than 8.

Here, when the luminance value of the visible light is smaller than −2 or larger than 8, the process shifts to step S324, and it is assumed that the light source is unknown. On the other hand, when the luminance value is −2 or more and 8 or less, the process shifts to step S316.

In step S316, the luminance difference D_BV calculated in step S314 is compared with a threshold value BV_TH_kei of the fluorescent lamp. Here, when the luminance difference D_BV is smaller than the threshold value BV_TH_kei of the fluorescent lamp, the process shifts to step S320. When the difference is larger, the process shifts to step S317.

It is judged in step S317 whether or not the luminance difference D_BV calculated in step S314 is between the threshold value BV_TH_kei of the fluorescent lamp and a threshold value BV_TH_sun of the sunlight. Here, when the luminance difference D_BV is in a range of both the threshold values, the process shifts to step S321. When the difference is out of the threshold value range, the process shifts to step S318.

Moreover, it is judged in step S318 whether or not the luminance difference D_BV calculated in step S314 is between the threshold value BV_TH_sun of the sunlight and a threshold value BV_TH_fl of the tungsten light. Here, when the luminance difference D_BV is in a range of both the threshold values, the process shifts to step S322. When the difference is out of the range of both the threshold values, the process shifts to step S319.

In step S319, the luminance difference D_BV calculated in step S314 is compared with the threshold value BV_TH_fl of the tungsten light. Here, when the luminance difference D_BV is larger than the threshold value BV_TH_fl of the tungsten light, the process shifts to step S323. When the difference is smaller, the process shifts to step S324.

As to the above-described threshold values of the respective light sources, for example, the threshold value BV_TH_kei of the fluorescent lamp is set to −3, the threshold value BV_TH_sun of the sunlight is set to −0.5, and the threshold value BV_TH_fl of the tungsten light is set to +0.5.

Moreover, in step S320, the fluorescent lamp is regarded as the light source (1 is set to flag [F_FLUO]). Similarly, in step S321, the sunlight is regarded as the light source, and in step S322, the tungsten light is regarded as the light source. Furthermore, in step S323, the blue flood lamp is regarded as the light source. In step S324, as described above, it is assumed that the light source is unknown. When the light source is unknown, the correction value of the fluorescent lamp which is a reference light source in adjusting a defocus correction value in the lens is used, and therefore flag [F_FLUO] is set.

When the light source is detected in this manner, the process comes out of the present routine.

Thus, the third embodiment can contribute to enhancement of focus adjustment precision of the camera.

Fourth Embodiment

Next, a fourth embodiment will be described.

In the above-described third embodiment, a case where one type of light source is selected has been described as an example. In actual, there is not few photography situation in which a plurality of light sources exist as in the photography near a window in a fluorescent lamp room. The following fourth embodiment is constituted to provide an appropriate exposure amount even in a case where there is a mixture of a plurality of types of light sources.

It is to be noted that the fourth embodiment is different from the third embodiment only in a control operation, a constitution, basic operation and the like of the camera are basically similar to those shown in FIGS. 1 to 29, therefore the same parts are denoted with the same reference numerals, and drawing and description are omitted.

First, calculation of a correction amount, which is a characteristic of the fourth embodiment, will be described with reference to FIG. 30.

The fourth embodiment is characterized in that to calculate the correction amount, correction is performed in accordance with a mixture ratio of the light source based on an amount (hereinafter referred to as mixture level) corresponding to a mixture ratio of the light source obtained in the subroutine "light source judgment" of step S272 in the flowchart of FIG. 27.

In the case of a certain light source, for example, sunlight, even when the same sunlight is the light source, the vicinity of a fluorescent lamp and the vicinity of tungsten light are considered. Therefore, in the present embodiment, a close decree of the light source with respect to another light source is represented as the mixture level of the light sources.

Figure 30:
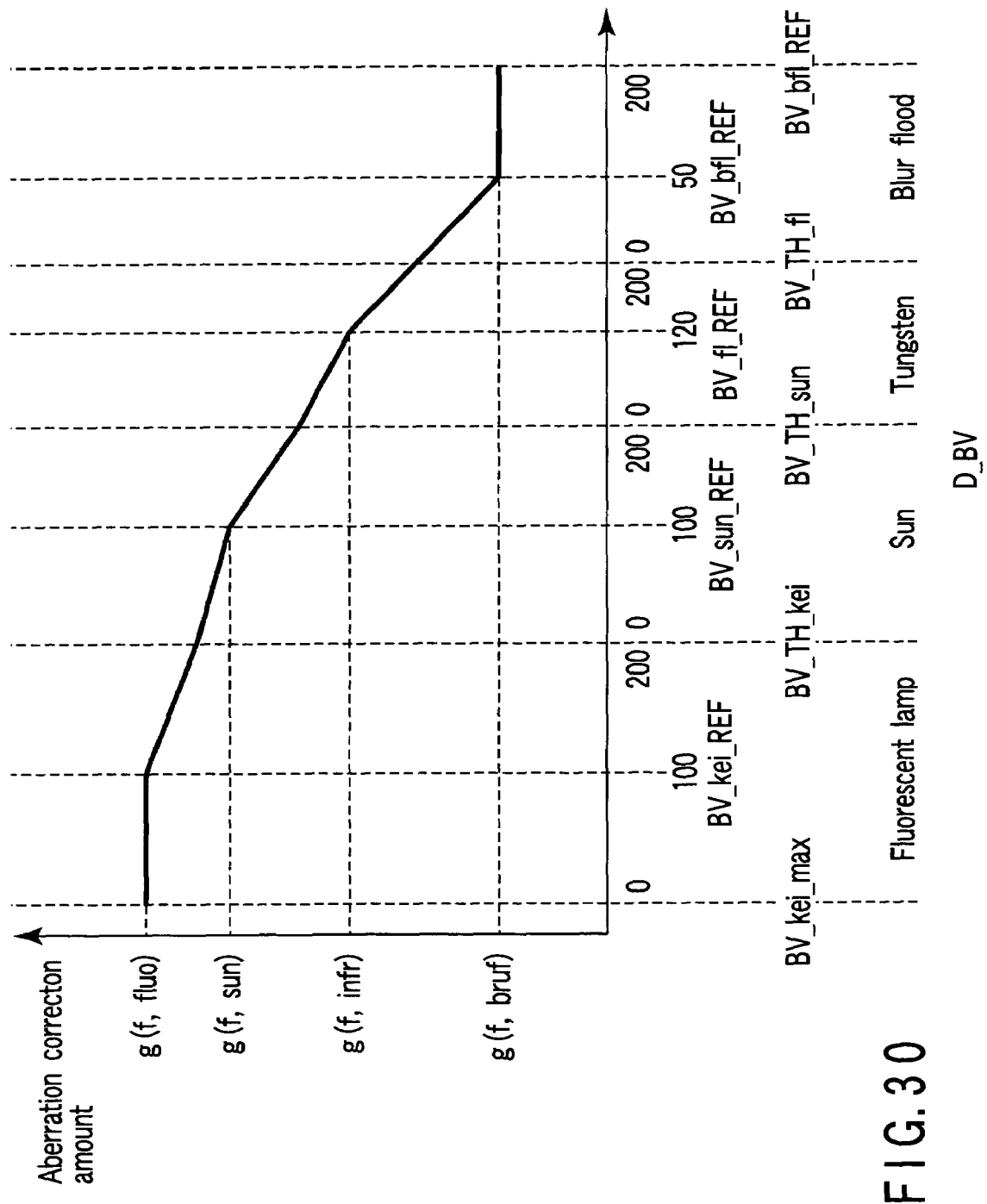
FIG. 30 is an explanatory view of correction amount calculation in accordance with a mixture ratio of light sources according to a fourth embodiment of the present invention.

In FIG. 30, the abscissa indicates D_BV which is a value obtained by standardizing a luminance difference between infrared light and visible light by reference light as described above, and the ordinate indicates an aberration correction amount. Numeric values such as 0, 100, 200 indicate values of mixture level amounts in the respective light sources.

For example, a mixture level calculation equation for the sunlight is as follows:

$$\text{Mixture level} = (D\_BV - BV\_kei) / (BV\_TH\_sun - BV\_TH\_kei)) \times 200$$

In this mixture level, a luminance of ½ of a judgment threshold value with another light source is assumed as 100. Moreover, for example, when the sunlight is a major light source, and close to the tungsten, the level is larger than 100. When the light source is in the vicinity of the fluorescent lamp, the value is smaller than 100.

That is, assuming that a reference value BV_sun_REF of the sunlight is 100, the mixture level of a threshold value BV_TH_sun of tungsten and sunlight is 200, and the mixture level of the threshold value BV_TH_kei of the sunlight and fluorescent lamp is 0. Moreover, the values linearly change. That is, the mixture level of 50 indicates that the major light source is the sunlight and little light of the fluorescent lamp is mixed.

The aberration correction amount g of each light source is obtained based on the mixture level obtained in this manner.

For example, when the mixture level of the sunlight is 100, a value of g(f, sun) is an aberration correction amount. Moreover, when the mixture level of the fluorescent lamp is 100, the value of g(f, fluo) is an aberration correction amount.

Moreover, when the mixture level of the sunlight is 0, that is, in the case of BV_TH_kei, a value of (g(f, fluo)+g(f, sun))/2 is an aberration correction amount. Furthermore, as described above, when the mixture level of the sunlight is 50, the correction value of BV_TH_kei and that in a case where the mixture level of the sunlight is 100 are linearly interpolated to thereby obtain the aberration correction amount.

To calculate the correction amount for each light source in this manner, the correction amount is calculated from the mixture level of the light source utilizing linear interpolation.

Figure 31:
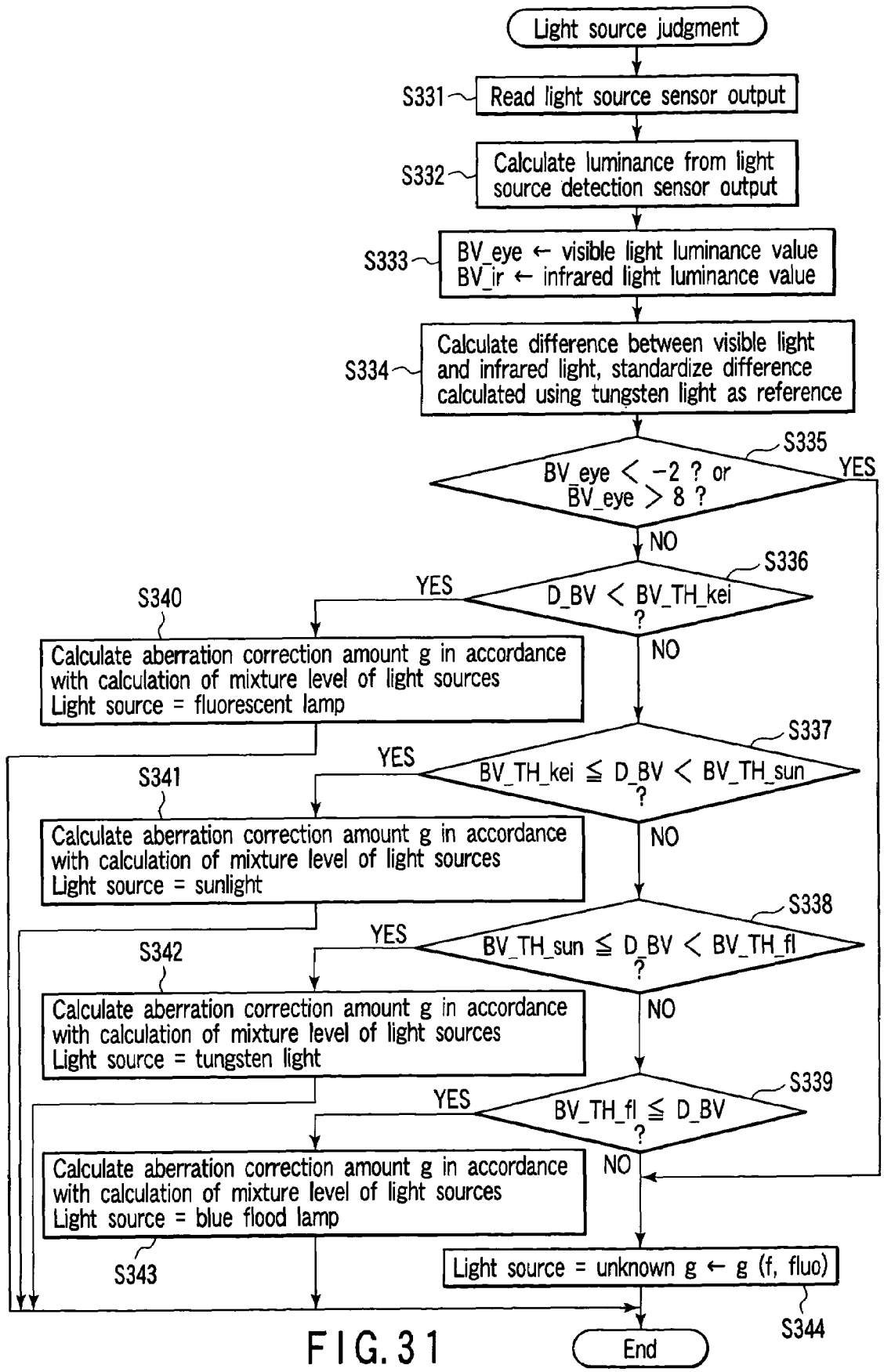
FIG. 31 is a flowchart showing a detailed operation of a subroutine "light source distinction" of step S272 in the flowchart of FIG. 27 according to the fourth embodiment.

A detailed operation of a subroutine "light source judgment" of step S272 in the flowchart of FIG. 27 will be described with reference to a flowchart of FIG. 31.

When entering this routine, first in step S331, an output of the light source sensor 92 is read. Next, in step S332, the luminance of the light source is calculated from the output of the light source sensor 92. Furthermore, in step S333, luminance values of visible light and infrared light are calculated, respectively.

In step S334, a difference between the visible light (BV_eye) and the infrared light (BV_ir) is calculated, and the calculated difference is standardized using tungsten light as a reference.

Next, it is judged in step S335 whether or not the above-described luminance value of the visible light is a usable value. This is because precision of the light source sensor deteriorates in a case where the luminance is excessively bright or dark, and therefore an output value is not very reliable. In this case, it is judged in step S335 whether the luminance value of the visible light is smaller than −2 or larger than 8.

Here, when the luminance value of the visible light is smaller than −2 or larger than 8, the process shifts to step S344, and it is assumed that the light source is unknown. On the other hand, when the luminance value is −2 or more and 8 or less in step S335, the process shifts to step S336.

In step S336, the luminance difference D_BV calculated in step S334 is compared with a threshold value BV_TH_kei of the fluorescent lamp. Here, when the luminance difference D_BV is smaller than the threshold value BV_TH_kei of the fluorescent lamp, the process shifts to step S340. When the difference is larger, the process shifts to step S337.

It is judged in step S337 whether or not the luminance difference D_BV calculated in step S334 is between the threshold value BV_TH_kei of the fluorescent lamp and a threshold value BV_TH_sun of the sunlight. Here, when the luminance difference D_BV is in a range of both the threshold values, the process shifts to step S341. When the difference is out of the threshold value range, the process shifts to step S338.

Moreover, it is judged in step S338 whether or not the luminance difference D_BV calculated in step S334 is between the threshold value BV_TH_sun of the sunlight and a threshold value BV_TH_fl of the tungsten light. Here, when the luminance difference D_BV is in a range of both the threshold values, the process shifts to step S342. When the difference is out of the range of both the threshold values, the process shifts to step S339.

In step S339, the luminance difference D_BV calculated in step S334 is compared with the threshold value BV_TH_fl of the tungsten light. Here, when the luminance difference D_BV is larger than the threshold value BV_TH_fl of the tungsten light, the process shifts to step S343. When the difference is smaller, the process shifts to step S344.

It is to be noted that the threshold values of the respective light sources are similar to those of the above-described example.

In step S340, an amount indicating the mixture ratio of the light sources including the fluorescent lamp, that is, the mixture level is calculated. Moreover, the aberration correction amount g is calculated corresponding to the mixture level (see FIG. 30). A calculation equation or way of thinking of the mixture level has been described above. Similarly in step S341, the mixture level of the light sources including the sunlight is calculated, and in step S342, that of the light sources including the tungsten light is calculated. Further in step S343, the mixture level of the light sources including the blue flood lamp is calculated, and the aberration correction amount g is similarly calculated.

Figure 32:
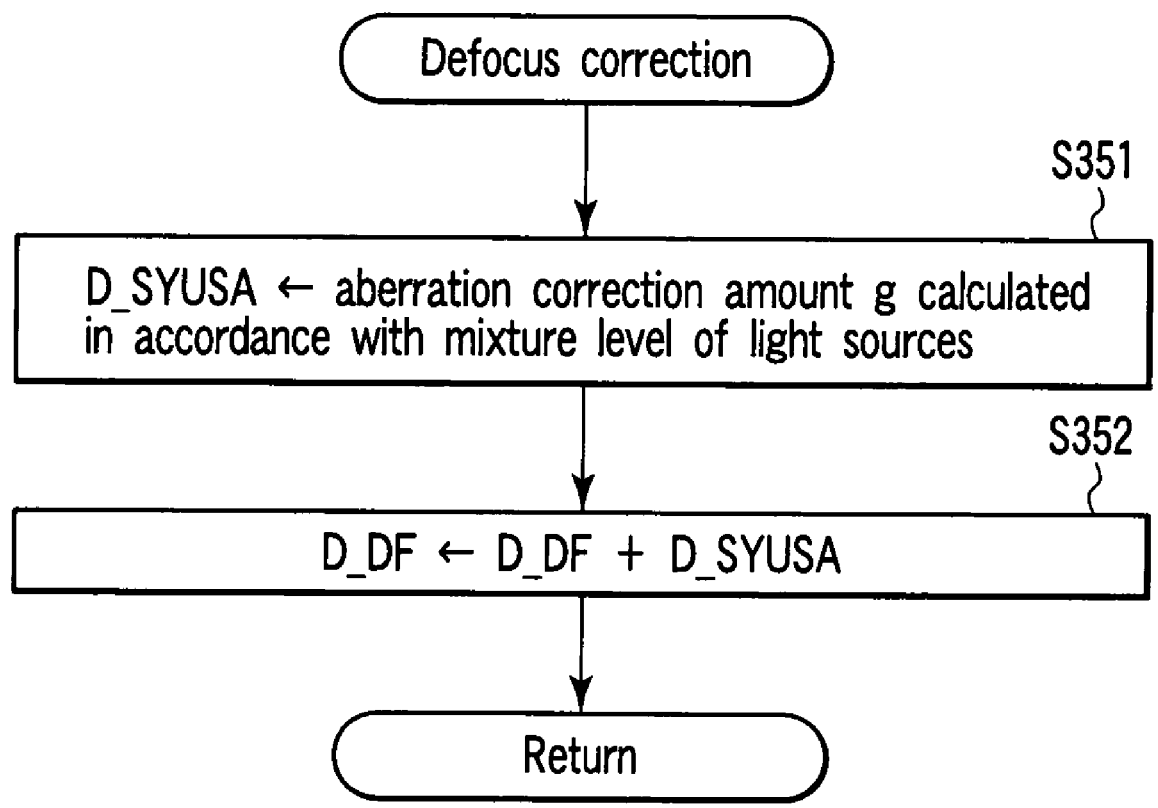
FIG. 32 is a flowchart showing an operation of a subroutine "defocus correction" in the fourth embodiment.

When the light source detection and the aberration correction amount g are obtained in this manner, the process shifts to step S27 of the flowchart of FIG. 27, and a subroutine "defocus correction" in the fourth embodiment shown in FIG. 32 is executed.

FIG. 32 is a flowchart showing an operation of the subroutine "defocus correction" in the fourth embodiment.

When entering the present subroutine, in step S351, the aberration correction amount g calculated in accordance with the mixture level of the light source is input into flag [D_SYUSA]. Next, in step S352, D_SYUSA which is the aberration correction amount g is added to the detected defocus amount D_DF, and input into D_DF. Accordingly, the aberration-corrected defocus amount is calculated. Thereafter, the process comes out of the present routine.

Thus, according to the fourth embodiment, even with the same light source, the correction amount is changed in accordance with the output luminance difference of the light source sensor 92. Therefore, even when the value is remarkably close to the threshold value of light source judgment as in the mixed light of the fluorescent lamp with the sunlight, for example, in a case where the light source is by the window indoors, the correction is possible in accordance with the mixture ratio of the light sources. Furthermore, since the correction amount continuously changes with the output of the light source sensor 92, stable exposure is obtained without rapidly changing the correction amount in accordance with the light source judgment result even during continuous photography.

As described above, appropriate AF is performed in accordance with the light source, and the photography is performed.

It is to be noted that in the above-described third and fourth embodiments, the example applied to the single lens reflex type digital camera has been described, but the present invention is not limited to this example, and the present invention may be applied to a lens integral type camera.

Fifth Embodiment

Next, a fifth embodiment of the present invention will be described.

This fifth embodiment is an example in which correction by a subject distance is added.

It has been described with reference to FIG. 18 that the defocus amount generated by the light source differs with the position of the focus lens. It is to be noted that the focus lens point is detected by a focus encoder (not shown) in a lens driving mechanism 176.

Table 9 shows defocus correction data for the light source, stored in a correction value memory 180 in a lens barrel 144.

TABLE 9

| | Subject distance L (focus lens point) | | | |
|---|---|---|---|---|
| | Infinite to 5 m | 5-2 m | 2-1 m | 1-0.5 m |
| Fluorescent lamp | $g_{1f}$ | $g_{2f}$ | $g_{3f}$ | $g_{4f}$ |
| Sunlight | $g_{1s}$ | $g_{2s}$ | $g_{3s}$ | $g_{4s}$ |
| Incandescent lamp | $g_{1i}$ | $g_{2i}$ | $g_{3i}$ | $g_{4i}$ |
| Blue flood lamp | $g_{1b}$ | $g_{2b}$ | $g_{3b}$ | $g_{4b}$ |
| Auxiliary light | $g_{1h}$ | $g_{2h}$ | $g_{3h}$ | $g_{4h}$ |

This focus lens has, for example, a closest photography distance of 0.5 m, 0.5 m to infinite subject distance is divided into four regions, and defocus correction data is held.

Figure 33A:
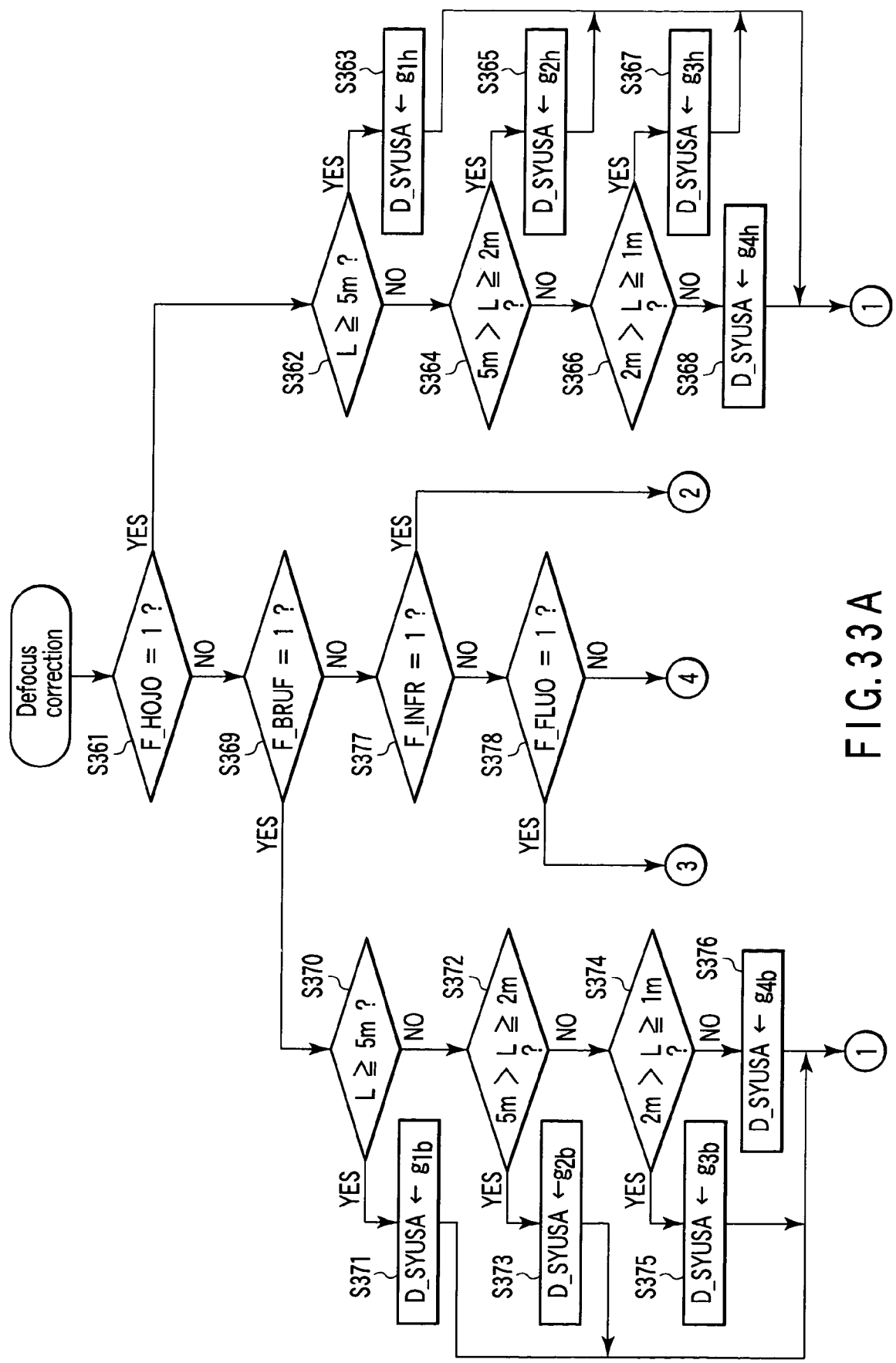
FIGS. 33A and 33B are flowcharts showing an operation of a subroutine "defocus correction" to correct defocus using defocus correction data of Table 9 in a fifth embodiment.
Figure 33B:
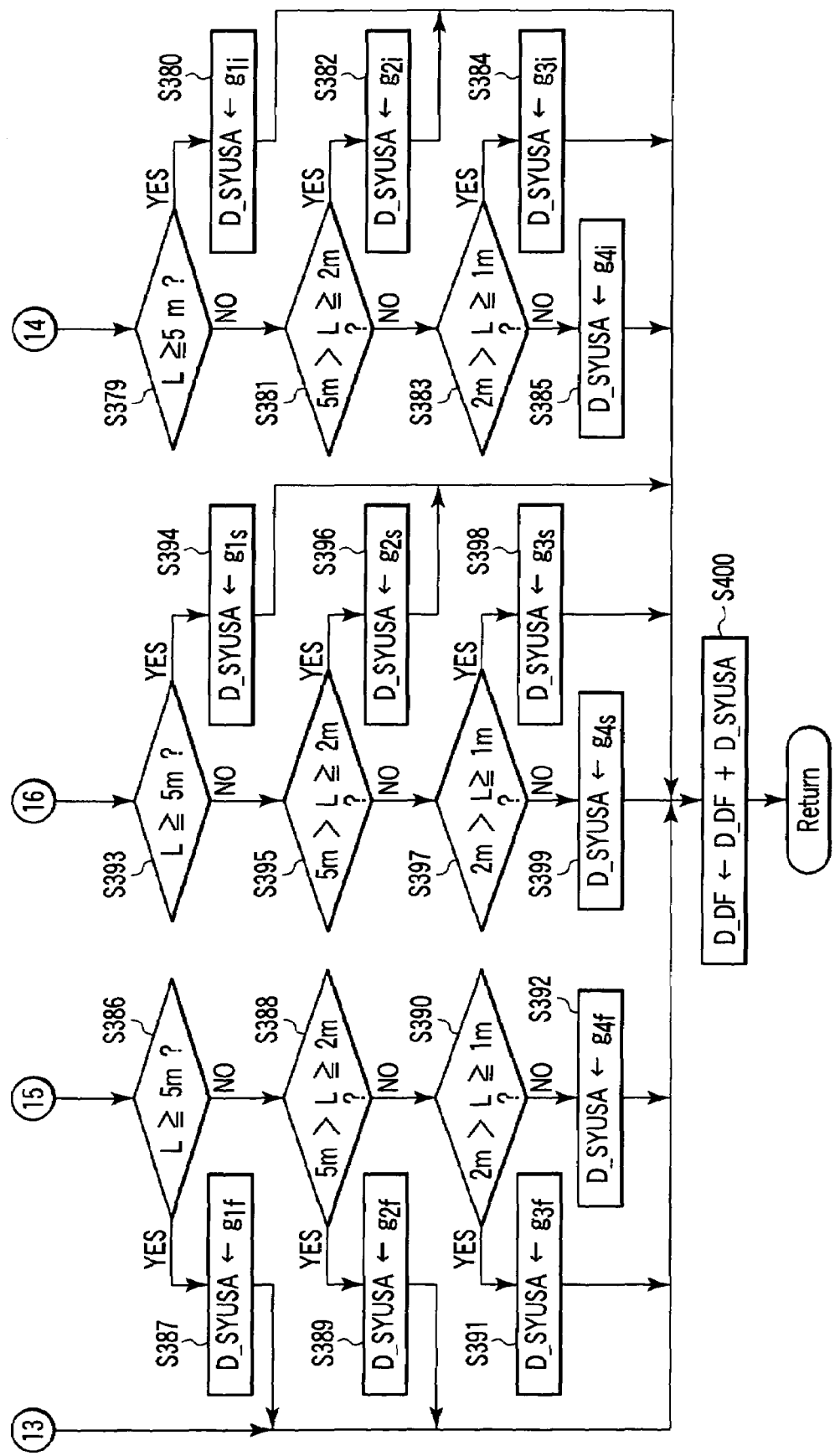

FIGS. 33A and 33B are flowcharts showing an operation of a subroutine "defocus correction" in which defocus is corrected using the defocus correction data of Table 9 described above in the fifth embodiment.

This operation will be described hereinafter.

When entering a subroutine "defocus correction" of step S273 in the flowchart of FIG. 27, first in step S361 of the flowchart of FIGS. 33A and 33B, flag [F_HOJO] is judged. Here, when the flag [F_HOJO] is set, the process shifts to step S362 to judge whether or not a subject distance L is 5 m or more. As a result, when the subject distance L is 5 m or more, the process shifts to step S363, and an aberration correction amount $g_{1h}$ is input into flag [D_SYUSA] in accordance with correction data of Table 9 described above. Thereafter, the process shifts to step S400.

On the other hand, when the subject distance L is less than 5 m in step S362, the process shifts to step S364, and it is judged whether or not the subject distance L is between 2 m and 5 m. Here, when the subject distance L is between 2 m and 5 m, the process shifts to step S365, and an aberration correction amount $g_{2h}$ is input into the flag [D_SYUSA] in accordance with the correction data of Table 9. Thereafter, the process shits to step S400.

Furthermore, when the subject distance L is less than 2 m in step S364, the process shifts to step S366, and it is judged whether or not the subject distance L is between 1 m and 2 m. Here, when the focal length L is between 1 m and 2 m, the process shifts to step S367, and an aberration correction amount $g_{3h}$ is input into the flag [D_SYUSA] in accordance with the correction data of Table 9. Thereafter, the process shifts to step S400.

Additionally, when the subject distance L is less than 1 m in step S366, the process shifts to step S368, and an aberration correction amount $g_{4h}$ is input into the flag [D_SYUSA] in accordance with the correction data of Table 9. Thereafter, the process shifts to step S400.

On the other hand, when the flag [F_HOJO] is not set in step S361, the process shifts to step S369, and it is judged whether or not flag [F_BRUF] has been set. Here, when the flag [F_BRUF] is set, the process shifts to step S370.

It is judged in step S370 whether or not a subject distance L is 5 m or more. As a result, when the focal length L is 5 m or more, the process shifts to step S371, and an aberration correction amount $g_{1b}$ is input into the flag [D_SYUSA] in accordance with the correction data of Table 9 described above. Thereafter, the process shifts to step S400.

On the other hand, when the subject distance L is less than 5 m in step S370, the process shifts to step S372, and it is judged whether or not the subject distance L is between 2 m and 5 m. Here, when the focal length L is between 2 m and 5 m, the process shifts to step S373, and an aberration correction amount $g_{2b}$ is input into the flag [D_SYUSA] in accordance with the correction data of Table 9. Thereafter, the process shifts to step S400.

Furthermore, when the subject distance L is less than 2 m in step S372, the process shifts to step S374, and it is judged whether or not the subject distance L is between 1 m and 2 m. Here, when the focal length L is between 1 m and 2 m, the process shifts to step S375, and an aberration correction amount $g_{3b}$ is input into the flag [D_SYUSA] in accordance with the correction data of Table 9. Thereafter, the process shifts to step S400.

Additionally, when the subject distance L is less than 1 m in step S374, the process shifts to step S376, and an aberration correction amount $g_{4b}$ is input into the flag [D_SYUSA] in accordance with the correction data of Table 9. Thereafter, the process shifts to step S400.

On the other hand, when the flag [F_BRUF] is not set in step S369, the process shifts to step S377, and it is judged whether or not flag [F_INFR] has been set. Here, when the flag [F_INFR] is set, the process shifts to step S379.

It is judged in step S379 whether or not a subject distance L is 5 m or more. As a result, when the focal length L is 5 m or more, the process shifts to step S380, and an aberration correction amount $g_{1i}$ is input into the flag [D_SYUSA] in accordance with the correction data of Table 9 described above. Thereafter, the process shifts to step S400.

On the other hand, when the subject distance L is less than 5 m in step S379, the process shifts to step S381, and it is judged whether or not the subject distance L is between 2 m and 5 m. Here, when the focal length L is between 2 m and 5 m, the process shifts to step S382, and an aberration correction amount $g_{2i}$ is input into the flag [D_SYUSA] in accordance with the correction data of Table 9. Thereafter, the process shifts to step S400.

Furthermore, when the subject distance L is less than 2 m in step S381, the process shifts to step S383, and it is judged whether or not the subject distance L is between 1 m and 2 m. Here, when the focal length L is between 1 m and 2 m, the process shifts to step S384, and an aberration correction amount $g_{3i}$ is input into the flag [D_SYUSA] in accordance with the correction data of Table 9. Thereafter, the process shifts to step S400.

Additionally, when the subject distance L is less than 1 m in step S383, the process shifts to step S385, and an aberration correction amount $g_{4i}$ is input into the flag [D_SYUSA] in accordance with the correction data of Table 9. Thereafter, the process shifts to step S400.

Moreover, when the flag [F_INFR] is not set in step S377, the process shifts to step S378, and it is judged whether or not flag [F_FLUO] has been set. Here, when the flag [F_FLUO] is set, the process shifts to step S386.

It is judged in step S386 whether or not a subject distance L is 5 m or more. As a result, when the focal length L is 5 m or more, the process shifts to step S387, and an aberration correction amount $g_{1f}$ is input into the flag [D_SYUSA] in accordance with the correction data of Table 9 described above. Thereafter, the process shifts to step S400.

On the other hand, when the subject distance L is less than 5 m in step S386, the process shifts to step S388, and it is judged whether or not the subject distance L is between 2 m and 5 m. Here, when the focal length L is between 2 m and 5 m, the process shifts to step S389, and an aberration correction amount $g_{2f}$ is input into the flag [D_SYUSA] in accordance with the correction data of Table 9. Thereafter, the process shifts to step S400.

Furthermore, when the subject distance L is less than 2 m in step S388, the process shifts to step S390, and it is judged whether or not the subject distance L is between 1 m and 2 m. Here, when the focal length L is between 1 m and 2 m, the process shifts to step S391, and an aberration correction amount $g_{3f}$ is input into the flag [D_SYUSA] in accordance with the correction data of Table 9. Thereafter, the process shifts to step S400.

Additionally, when the subject distance L is less than 1 m in step S390, the process shifts to step S392, and an aberration correction amount $g_{4f}$ is input into the flag [D_SYUSA] in accordance with the correction data of Table 9. Thereafter, the process shifts to step S400.

When the flag [F_FLUO] is not set in step S378, the process shifts to step S393. In this case, since the light source is not any of the auxiliary light, blue flood lamp, incandescent lamp, and fluorescent lamp, the light source is distinguished as the sunlight.

It is judged in step S393 whether or not a subject distance L is 5 m or more. As a result, when the focal length L is 5 m or more, the process shifts to step S394, and an aberration correction amount $g_{1s}$ is input into the flag [D_SYUSA] in accordance with the correction data of Table 9 described above. Thereafter, the process shifts to step S400.

On the other hand, when the subject distance L is less than 5 m in step S394, the process shifts to step S395, and it is judged whether or not the subject distance L is between 2 m and 5 m. Here, when the focal length L is between 2 m and 5 m, the process shifts to step S396, and an aberration correction amount $g_{2s}$ is input into the flag [D_SYUSA] in accordance with the correction data of Table 9. Thereafter, the process shifts to step S400.

Furthermore, when the subject distance L is less than 2 m in step S395, the process shifts to step S397, and it is judged whether or not the subject distance L is between 1 m and 2 m. Here, when the focal length L is between 1 m and 2 m, the process shifts to step S398, and an aberration correction amount $g_{3s}$ is input into the flag [D_SYUSA] in accordance with the correction data of Table 9. Thereafter, the process shifts to step S400.

Additionally, when the subject distance L is less than 1 m in step S397, the process shifts to step S399, and an aberration correction amount $g_{4s}$ is input into the flag [D_SYUSA] in accordance with the correction data of Table 9. Thereafter, the process shifts to step S400.

In step S400, D_SYUSA is added to the defocus amount D_DF detected in accordance with the type of the light source and the subject distance L in this manner, and input into D_DF. Accordingly, the aberration-corrected defocus amount is calculated. Thereafter, the process comes out of the present routine.

It is to be noted that in the above-described first to fifth embodiments, four types of light sources including the sunlight, fluorescent lamp, tungsten light (incandescent lamp), blue flood lamp have been detected, but this is not limited to these four types, and a finer light source may be detected to thereby perform the correction with good precision.

Moreover, the present invention is not limited to the above-described embodiments, and can, needless to say, be variously modified and performed without departing from the scope.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A camera system including a camera body and an interchangeable lens attachable/detachable with respect to the camera body, comprising:
   an intermediate adapter detachably attachable between the interchangeable lens and the camera body and capable of changing a focal length of the interchangeable lens;
   focus detection means, disposed in the camera body, for detecting a defocus amount of the interchangeable lens; and
   storage means, disposed in the interchangeable lens, for storing AF correction data which corrects the defocus amount of the interchangeable lens detected by the focus detection means,
   wherein the AF correction data stored in the storage means includes: first AF correction data determined by an optical characteristic of the interchangeable lens and constituted in accordance with a type of a light source to illuminate a subject; and second AF correction data determined by an optical characteristic of the interchangeable lens combined with the intermediate adapter and constituted in accordance with the type of the light source to illuminate the subject.

2. The camera system according to claim 1, wherein the camera body comprises:
   light source detection means for detecting the light source which illuminates the subject;
   reading means for reading the first and second AF correction data stored in the storage means; and
   correction means for disjunctively selecting the first and second AF correction data depending on whether or not the intermediate adapter is attached between the interchangeable lens and the camera body, and correcting the defocus amount detected by the focus detection means based on an output of the light source detection means.

3. A camera system including a camera body, an interchangeable lens attachable/detachable with respect to the camera body, and a first intermediate adapter or a second intermediate adapter different from the first intermediate adapter, attachable between the interchangeable lens and the camera body, the system comprising:
   focus detection means for detecting a defocus amount of the interchangeable lens;
   light source detection means for detecting the light source which illuminates the subject;
   first storage means for storing first AF correction data determined by an optical characteristic of the interchangeable lens and constituted in accordance with a type of the light source which illuminates the subject, and second AF correction data determined by an optical characteristic of the interchangeable lens combined with the intermediate adapter and constituted in accordance with the type of the light source which illuminates the subject;
   second storage means for storing correction data which corrects the second AF correction data and which is constituted in accordance with the type of the light source to illuminate the subject; and
   correction means for correcting an output of the focus detection means in response to an output of the light source detection means using the first AF correction data in a case where either of the first and second intermediate adapters is not attached, using the second AF correction data in a case where the first intermediate adapter is attached, and using the second AF correction data corrected by the correction data in a case where the second intermediate adapter is attached.

4. The camera system according to claim 3, wherein the first storage means is disposed in the interchangeable lens, and the second storage means is disposed in the intermediate adapter.

5. A changeable-lens camera including a camera body, and an interchangeable lens attachable/detachable with respect to the camera body, comprising:
   an intermediate adapter detachably attachable between the camera body and the interchangeable lens and capable of changing a focal length of the interchangeable lens;
   focus detection means, disposed in the camera body, for detecting a defocus amount of the interchangeable lens;
   judgment means for judging whether or not the intermediate adapter is attached between the camera body and the interchangeable lens;
   reading means for reading first AF correction data determined by an optical characteristic of the interchangeable lens and constituted in accordance with a type of a light source which illuminates a subject, and second AF correction data determined by an optical characteristic of the interchangeable lens combined with the intermediate adapter and constituted in accordance with the light source which illuminates the subject;
   light source detection means for detecting the light source which illuminates the subject; and
   correction means for selecting the first AF correction data in a case where the judgment means judges that the intermediate adapter is not attached, and selecting the second AF correction data in a case where it is judged that the intermediate adapter is attached to thereby correct an output of the focus detection means in accordance with an output of the light source detection means.

6. The camera according to claim 5, wherein the judgment means includes adapter judgment means which judges whether the intermediate adapter is of a first type or a second type, and
   the correction means converts the second AF correction data in such a manner as to be adapted to a combination of the second intermediate adapter, and thereafter corrects an output of the focus detection means in a case where the adapter judgment means judges that the intermediate adapter is the second type of intermediate adapter.

7. A camera system comprising:
   a camera body;
   an interchangeable lens attachable/detachable with respect to the camera body;
   an intermediate adapter detachably attachable between the interchangeable lens and the camera body and capable of changing a focal length of the interchangeable lens;
   light source detection means, disposed in the camera body, for detecting a light source which illuminates a subject;

focus detection means, disposed in the camera body, for detecting a defocus amount of the interchangeable lens; and storage means, disposed in the interchangeable lens, for storing AF correction data which corrects the defocus amount of the interchangeable lens detected by the focus detection means, wherein the AF correction data stored in the storage means includes: first AF correction data determined by an optical characteristic of the interchangeable lens and constituted in accordance with a type of a light source detected by the light source detection means; and second AF correction data determined by an optical characteristic of the interchangeable lens combined with the intermediate adapter and constituted in accordance with the type of the light source detected by the light source detection means.

8. The camera system according to claim 7, wherein the camera body comprises:

reading means for reading the first and second AF correction data stored in the storage means;

an intermediate adapter attaching judgment section which judges whether or not the intermediate adapter is attached between the interchangeable lens and the camera body;

selection means for disjunctively selecting the first and second AF correction data in accordance with the judgment result of the intermediate adapter attaching judgment section; and correction means for correcting the defocus amount detected by the focus detection means based on the AF correction data selected by the selection means.

9. A camera system including a camera body, an interchangeable lens attachable/detachable with respect to the camera body, and a first intermediate adapter or a second intermediate adapter different from the first intermediate adapter, attachable between the interchangeable lens and the camera body, the system comprising:

focus detection means for detecting a defocus amount of the interchangeable lens;

light source detection means for detecting the light source which illuminates the subject;

storage means for storing first AF correction data determined by an optical characteristic of the interchangeable lens and constituted in accordance with a type of the light source detected by the light source detection means, second AF correction data determined by an optical characteristic of the interchangeable lens combined with the intermediate adapter and constituted in accordance with the type of the light source detected by the light source detection means, and correction data which corrects the second AF correction data and which is constituted in accordance with the type of the light source detected by the light source detection means;

an intermediate adapter attaching judgment section which judges whether or not the intermediate adapter is attached between the interchangeable lens and the camera body; and correction means for correcting an output of the focus detection means in response to an output of the light source detection means using the first AF correction data in a case where the intermediate adapter attaching judgment section judges that the intermediate adapter is not attached, using the second AF correction data in a case where it is judged that the first intermediate adapter is attached, and using the second AF correction data corrected by the correction data in a case where it is judged that the second intermediate adapter is attached.

10. The camera system according to claim 9, wherein the storage means comprises: first storage means for storing the first AF correction data and the second AF correction data; and second storage means for storing the correction data.

11. The camera system according to claim 10, wherein the first storage means is disposed in the interchangeable lens, and the second storage means is disposed in the intermediate adapter.

* * * * *